US010530838B1

(12) United States Patent
Bicka

(10) Patent No.: US 10,530,838 B1
(45) Date of Patent: Jan. 7, 2020

(54) SYSTEM ORIENTED PROGRAMMING AND IMPLEMENTATION INFRASTRUCTURE, SYSTEM AND METHOD

(71) Applicant: YOUPROGRAM SOFTWARE SOLUTIONS INC., Toronto, Ontario (CA)

(72) Inventor: Xhili Bicka, Toronto (CA)

(73) Assignee: YOUPROGRAM SOFTWARE SOLUTIONS INC., Toronto (CA)

( * ) Notice: Subject to any disclaimer, the term of this patent is extended or adjusted under 35 U.S.C. 154(b) by 480 days.

(21) Appl. No.: 15/177,863

(22) Filed: Jun. 9, 2016

Related U.S. Application Data

(60) Provisional application No. 62/174,702, filed on Jun. 12, 2015.

(51) Int. Cl.
*G06F 9/44* (2018.01)
*H04L 29/08* (2006.01)
*H04L 29/06* (2006.01)

(52) U.S. Cl.
CPC .............. *H04L 67/10* (2013.01); *H04L 67/42* (2013.01)

(58) Field of Classification Search
CPC ....................................................... H04L 67/10
USPC ........................................................ 717/106
See application file for complete search history.

(56) References Cited

U.S. PATENT DOCUMENTS

| | | | | |
|---|---|---|---|---|
| 2009/0094373 | A1* | 4/2009 | Lepeska | G06F 15/16 709/230 |
| 2011/0225599 | A1 | 9/2011 | Lue-Sang et al. | |

FOREIGN PATENT DOCUMENTS

| | | | |
|---|---|---|---|
| EP | 0483037 | A2 | 4/1992 |
| EP | 0546683 | A2 | 6/1993 |

* cited by examiner

*Primary Examiner* — Evral E Bodden
(74) *Attorney, Agent, or Firm* — Merizzi Ramsbottom & Forster

(57) ABSTRACT

Described are various embodiments of a system-oriented programming and implementation infrastructure, system and method.

6 Claims, 45 Drawing Sheets

FIG. 20
Input
Output
Deposit To
From Account
Ready

| SYSTEMID | SYSTEMNAME | CREATIONDATE | UPDATEDATE | ACLNAME | DSYSTEMID |
|---|---|---|---|---|---|
| 2 | _EmbeddedScript. | 20150524120855 | 20150524120855 | private | 1 |
| 3 | EmbeddedTestOthers. | 20150524120900 | 20150524120900 | public | 1 |
| 4 | Security. | 20150524120906 | 20150524120906 | public | 1 |
| 5 | Locations. | 20150524120914 | 20150524120914 | public | 1 |
| 5 | Locations. | 20150524120914 | 20150524120914 | public | 4 |
| 6 | Clients. | 20150524120925 | 20150524120925 | public | 1 |
| 6 | Clients. | 20150524120925 | 20150524120925 | public | 4 |
| 6 | Clients. | 20150524120925 | 20150524120925 | public | 5 |
| 7 | Accounting. | 20150524120934 | 20150524120934 | public | 1 |
| 7 | Accounting. | 20150524120934 | 20150524120934 | public | 4 |
| 7 | Accounting. | 20150524120934 | 20150524120934 | public | 5 |

FIG. 29

| SYSTEMID | SECTIONID | SECTIONNAME | SECTIONTYPE | PARENTID | EVENTDOMAINID | DEEP | LOCSECNAI | CHILDINDEX | ACLNAME | SECFUNCTIONID |
|---|---|---|---|---|---|---|---|---|---|---|
| 5 | 1 | Locations. | 0 | 0 | 1 | 1 | Locations. | 1 | public | 0 |
| 5 | 2 | Locations.SecurityPanel. | 0 | 1 | 2 | 2 | SecurityPanel. | 1 | public | 1 |
| 5 | 13 | Locations.SecurityPanel.Login. | 0 | 2 | 13 | 4 | Login. | 1 | public | 1 |
| 5 | 14 | Locations.SecurityPanel.Login.Authenticate. | 0 | 13 | 14 | 5 | Authenticate. | 1 | private | 1 |
| 5 | 15 | Locations.SecurityPanel.Logout. | 0 | 2 | 15 | 4 | Logout. | 2 | public | 1 |
| 5 | 16 | Locations.Currency. | 0 | 1 | 16 | 2 | Currency. | 3 | private | 0 |
| 5 | 17 | Locations.Currencies. | 0 | 1 | 17 | 2 | Currencies. | 4 | public | 1 |
| 5 | 37 | Locations.Currencies.Add. | 0 | 17 | 37 | 4 | Add. | 1 | public | 1 |
| 5 | 38 | Locations.Currencies.LoadFromFile. | 0 | 17 | 38 | 4 | LoadFromFile. | 2 | public | 1 |
| 5 | 39 | Locations.Currencies.LoadFromFile.ReadData. | 0 | 38 | 39 | 5 | ReadData. | 1 | private | 1 |
| 5 | 40 | Locations.Currencies._Edit. | 0 | 17 | 40 | 4 | _Edit. | 3 | public | 1 |
| 5 | 41 | Locations.Currencies._Delete. | 0 | 17 | 41 | 4 | _Delete. | 4 | public | 1 |
| 5 | 42 | Locations.Language. | 0 | 1 | 42 | 2 | Language. | 6 | private | 0 |
| 5 | 43 | Locations.Languages. | 0 | 1 | 43 | 2 | Languages. | 7 | public | 1 |
| 5 | 63 | Locations.Languages.Add. | 0 | 43 | 63 | 4 | Add. | 1 | public | 1 |
| 5 | 64 | Locations.Languages.LoadFromFile. | 0 | 43 | 64 | 4 | LoadFromFile. | 2 | public | 1 |

FIG. 30

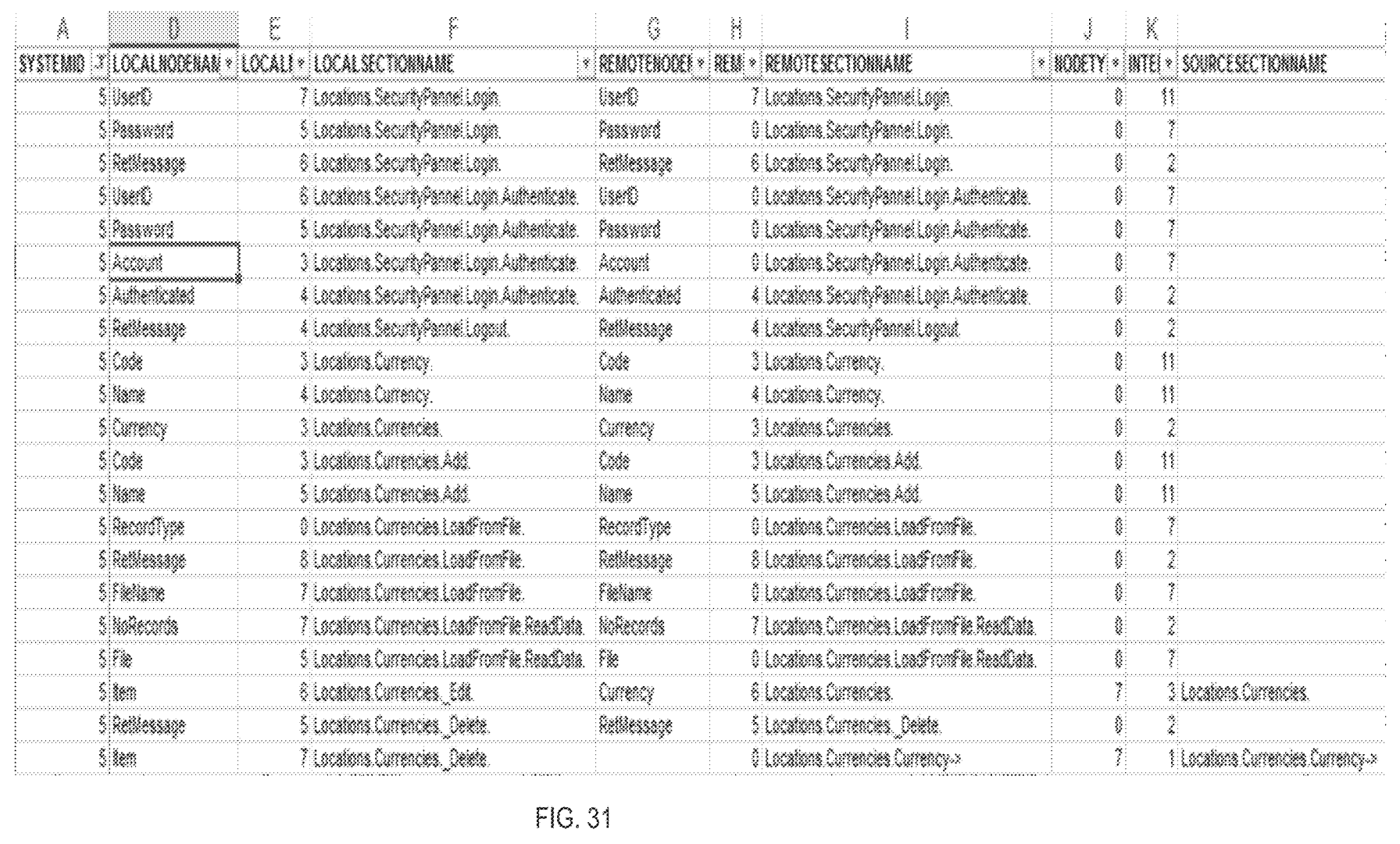

| A | D | E | F | G | H | I | J | K | |
|---|---|---|---|---|---|---|---|---|---|
| SYSTEMID | LOCALNODENAI | LOCALI | LOCALSECTIONNAME | REMOTENODEI | REMI | REMOTESECTIONNAME | NODETY | INTEI | SOURCESECTIONNAME |
| 5 | UserID | 7 | Locations.SecurityPannel.Login. | UserID | 7 | Locations.SecurityPannel.Login. | 0 | 11 | |
| 5 | Password | 5 | Locations.SecurityPannel.Login. | Password | 0 | Locations.SecurityPannel.Login. | 0 | 7 | |
| 5 | RetMessage | 6 | Locations.SecurityPannel.Login. | RetMessage | 6 | Locations.SecurityPannel.Login. | 0 | 2 | |
| 5 | UserID | 6 | Locations.SecurityPannel.Login.Authenticate. | UserID | 0 | Locations.SecurityPannel.Login.Authenticate. | 0 | 7 | |
| 5 | Password | 5 | Locations.SecurityPannel.Login.Authenticate. | Password | 0 | Locations.SecurityPannel.Login.Authenticate. | 0 | 7 | |
| 5 | Account | 3 | Locations.SecurityPannel.Login.Authenticate. | Account | 0 | Locations.SecurityPannel.Login.Authenticate. | 0 | 7 | |
| 5 | Authenticated | 4 | Locations.SecurityPannel.Login.Authenticate. | Authenticated | 4 | Locations.SecurityPannel.Login.Authenticate. | 0 | 2 | |
| 5 | RetMessage | 4 | Locations.SecurityPannel.Logout. | RetMessage | 4 | Locations.SecurityPannel.Logout. | 0 | 2 | |
| 5 | Code | 3 | Locations.Currency. | Code | 3 | Locations.Currency. | 0 | 11 | |
| 5 | Name | 4 | Locations.Currency. | Name | 4 | Locations.Currency. | 0 | 11 | |
| 5 | Currency | 3 | Locations.Currencies. | Currency | 3 | Locations.Currencies. | 0 | 2 | |
| 5 | Code | 3 | Locations.Currencies.Add. | Code | 3 | Locations.Currencies.Add. | 0 | 11 | |
| 5 | Name | 5 | Locations.Currencies.Add. | Name | 5 | Locations.Currencies.Add. | 0 | 11 | |
| 5 | RecordType | 0 | Locations.Currencies.LoadFromFile. | RecordType | 0 | Locations.Currencies.LoadFromFile. | 0 | 7 | |
| 5 | RetMessage | 8 | Locations.Currencies.LoadFromFile. | RetMessage | 8 | Locations.Currencies.LoadFromFile. | 0 | 2 | |
| 5 | FileName | 7 | Locations.Currencies.LoadFromFile. | FileName | 0 | Locations.Currencies.LoadFromFile. | 0 | 7 | |
| 5 | NoRecords | 7 | Locations.Currencies.LoadFromFile.ReadData. | NoRecords | 7 | Locations.Currencies.LoadFromFile.ReadData. | 0 | 2 | |
| 5 | File | 5 | Locations.Currencies.LoadFromFile.ReadData. | File | 0 | Locations.Currencies.LoadFromFile.ReadData. | 0 | 7 | |
| 5 | Item | 6 | Locations.Currencies._Edit. | Currency | 6 | Locations.Currencies. | 7 | 3 | Locations.Currencies. |
| 5 | RetMessage | 5 | Locations.Currencies._Delete. | RetMessage | 5 | Locations.Currencies._Delete. | 0 | 2 | |
| 5 | Item | 7 | Locations.Currencies._Delete. | | 0 | Locations.Currencies.Currency-> | 7 | 1 | Locations.Currencies.Currency-> |

FIG. 31

| SYSTEMID | EVENTDOMAINID | NODE | SECTIONNAME | NODENAME | ROLEID | NODEROLE | NODETYPE | NODETYPENAME | SECTIONID | SECTIONSYSTEMID | SSECID | SSYSTEMID | CHILDNODE | CONTROLTYPE |
|---|---|---|---|---|---|---|---|---|---|---|---|---|---|---|
| 5 | 16 | -8 | Locations.Currency. | Parmint_I3 | 4 | Intermediate | 8 | longint | 16 | 5 | 0 | 0 | 0 | 0 |
| 5 | 16 | -7 | Locations.Currency. | Parmint_I2 | 4 | Intermediate | 8 | longint | 16 | 5 | 0 | 0 | 0 | 0 |
| 5 | 16 | -6 | Locations.Currency. | Parmint_I1 | 4 | Intermediate | 2 | integer | 16 | 5 | 0 | 0 | 0 | 0 |
| 5 | 16 | -5 | Locations.Currency. | Parmint_I0 | 4 | Intermediate | 2 | integer | 16 | 5 | 0 | 0 | 0 | 0 |
| 5 | 16 | 1 | Locations.Currency. | _Mode | 4 | Intermediate | 2 | integer | 16 | 5 | 0 | 0 | 0 | 0 |
| 5 | 16 | 2 | Locations.Currency. | _Save | 4 | Intermediate | 3 | boolean | 16 | 5 | 0 | 0 | 0 | 0 |
| 5 | 16 | 3 | Locations.Currency | Code | 7 | InputOutput | 6 | wstring | 16 | 5 | 0 | 0 | 0 | 3 |
| 5 | 16 | 4 | Locations.Currency | Name | 7 | InputOutput | 6 | wstring | 16 | 5 | 0 | 0 | 0 | 3 |
| 5 | 17 | -16 | Locations.Currencies. | Parmint_I5 | 4 | Intermediate | 8 | longint | 17 | 5 | 0 | 0 | 0 | 0 |
| 5 | 17 | -15 | Locations.Currencies. | Parmint_I4 | 4 | Intermediate | 8 | longint | 17 | 5 | 0 | 0 | 0 | 0 |
| 5 | 17 | -14 | Locations.Currencies. | Parmint_I3 | 4 | Intermediate | 8 | longint | 17 | 5 | 0 | 0 | 0 | 0 |
| 5 | 17 | -13 | Locations.Currencies. | Parmint_I2 | 4 | Intermediate | 8 | longint | 17 | 5 | 0 | 0 | 0 | 0 |
| 5 | 17 | -12 | Locations.Currencies. | Parmint_I1 | 4 | Intermediate | 2 | integer | 17 | 5 | 0 | 0 | 0 | 0 |
| 5 | 17 | -11 | Locations.Currencies. | Parmint_I0 | 4 | Intermediate | 2 | integer | 17 | 5 | 0 | 0 | 0 | 0 |
| 5 | 17 | 1 | Locations.Currencies. | _Mode | 4 | Intermediate | 2 | integer | 17 | 5 | 0 | 0 | 0 | 0 |
| 5 | 17 | 2 | Locations.Currencies. | _Save | 4 | Intermediate | 3 | boolean | 17 | 5 | 0 | 0 | 0 | 0 |
| 5 | 17 | 3 | Locations.Currencies. | Currency | 2 | Output | 7 | SystemNode | 17 | 5 | 16 | 5 | 5 | 0 |
| 5 | 17 | 4 | Locations.Currencies. | _DisplayName | 4 | Intermediate | 6 | wstring | 17 | 5 | 0 | 0 | 0 | 0 |
| 5 | 37 | -28 | Locations.Currencies.Add. | SS20N-21I4 | 6 | Constant | 6 | wstring | 37 | 5 | 0 | 0 | 0 | 0 |
| 5 | 37 | -27 | Locations.Currencies.Add. | SS20N-20I3 | 6 | Constant | 8 | longint | 37 | 5 | 0 | 0 | 0 | 0 |
| 5 | 37 | -26 | Locations.Currencies.Add. | SS20N-19I2 | 6 | Constant | 13 | bin | 37 | 5 | 0 | 0 | 0 | 0 |
| 5 | 37 | -25 | Locations.Currencies.Add. | SS20N-18I1 | 4 | Intermediate | 2 | integer | 37 | 5 | 0 | 0 | 0 | 0 |
| 5 | 37 | -24 | Locations.Currencies.Add. | SS20N-17I4 | 6 | Constant | 13 | bin | 37 | 5 | 0 | 0 | 0 | 0 |
| 5 | 37 | -23 | Locations.Currencies.Add. | SS20N-16I3 | 6 | Constant | 2 | integer | 37 | 5 | 0 | 0 | 0 | 0 |
| 5 | 37 | -22 | Locations.Currencies.Add. | SS20N-15I2 | 6 | Constant | 2 | integer | 37 | 5 | 0 | 0 | 0 | 0 |
| 5 | 37 | -21 | Locations.Currencies.Add. | SS20N-14I1 | 6 | Constant | 2 | integer | 37 | 5 | 0 | 0 | 0 | 0 |
| 5 | 37 | -20 | Locations.Currencies.Add. | SS20N-13I1 | 4 | Intermediate | 7 | SystemNode | 37 | 5 | 16 | 5 | 2 | 0 |
| 5 | 37 | -19 | Locations.Currencies.Add. | Parmint_I5 | 4 | Intermediate | 8 | longint | 37 | 5 | 0 | 0 | 0 | 0 |
| 5 | 37 | -18 | Locations.Currencies.Add. | Parmint_I4 | 4 | Intermediate | 8 | longint | 37 | 5 | 0 | 0 | 0 | 0 |
| 5 | 37 | -17 | Locations.Currencies.Add. | Parmint_I3 | 4 | Intermediate | 8 | longint | 37 | 5 | 0 | 0 | 0 | 0 |
| 5 | 37 | -16 | Locations.Currencies.Add. | Parmint_I2 | 4 | Intermediate | 8 | longint | 37 | 5 | 0 | 0 | 0 | 0 |
| 5 | 37 | -15 | Locations.Currencies.Add. | Parmint_I1 | 4 | Intermediate | 2 | integer | 37 | 5 | 0 | 0 | 0 | 0 |
| 5 | 37 | -14 | Locations.Currencies.Add. | Parmint_I0 | 4 | Intermediate | 2 | integer | 37 | 5 | 0 | 0 | 0 | 0 |
| 5 | 37 | -13 | Locations.Currencies.Add. | 1S6N-12I1 | 6 | Constant | 3 | boolean | 37 | 5 | 0 | 0 | 0 | 0 |
| 5 | 37 | 1 | Locations.Currencies.Add. | _Mode | 4 | Intermediate | 2 | integer | 37 | 5 | 0 | 0 | 0 | 0 |
| 5 | 37 | 2 | Locations.Currencies.Add. | _Save | 4 | Intermediate | 3 | boolean | 37 | 5 | 0 | 0 | 0 | 0 |
| 5 | 37 | 3 | Locations.Currencies.Add. | Code | 7 | InputOutput | 6 | wstring | 37 | 5 | 0 | 0 | 0 | 3 |
| 5 | 37 | 4 | Locations.Currencies.Add. | Item | 4 | Intermediate | 7 | SystemNode | 37 | 5 | 16 | 5 | 1 | 0 |
| 5 | 37 | 5 | Locations.Currencies.Add. | Name | 7 | InputOutput | 6 | wstring | 37 | 5 | 0 | 0 | 0 | 3 |
| 5 | 37 | 6 | Locations.Currencies.Add. | ret | 4 | Intermediate | 2 | integer | 37 | 5 | 0 | 0 | 0 | 0 |
| 5 | 38 | -60 | Locations.Currencies.LoadFromFile | Parmint_I5 | 4 | Intermediate | 8 | longint | 38 | 5 | 0 | 0 | 0 | 0 |
| 5 | 38 | -59 | Locations.Currencies.LoadFromFile | Parmint_I4 | 4 | Intermediate | 8 | longint | 38 | 5 | 0 | 0 | 0 | 0 |

FIG. 33

| SYSTEMID | EVENTDOMAINID | SECTIONNAME | SEQUENCENO | ELEMENTID | ELEMENTNAME | NODENAME | ELEMENTSYMBOL | ELEMENTTOKEN | ELEMENTLINE | ELEMENTCOL | NODENO | ELEMENTNO | NODEIMAGE | NODESYMBOL | NODEID | MODELLINE | NODECOL | FUNCTIONID | OVERRIDEID | NODETYPE | ELEMENTCLASS |
|---|---|---|---|---|---|---|---|---|---|---|---|---|---|---|---|---|---|---|---|---|---|
| 5 | 16 | Locations.Currency. | 1 | 0 | Parameter initialization | ParmInit_1 | | ParmInit | 19 | 28 | 1 | 10 | | | -6 | 19 | 28 | 7143424 | 0 | 2 | 109 |
| 5 | 16 | Locations.Currency. | 1 | 0 | Parameter initialization | ParmInit_2 | | ParmInit | 19 | 28 | 2 | 10 | | | -7 | 19 | 28 | 7143424 | 0 | 8 | 109 |
| 5 | 16 | Locations.Currency. | 1 | 0 | Parameter initialization | ParmInit_3 | | ParmInit | 19 | 28 | 3 | 10 | | | -8 | 19 | 28 | 7143424 | 0 | 8 | 109 |
| 5 | 16 | Locations.Currency. | 1 | 0 | Parameter initialization | ParmInit_4 | | ParmInit | 19 | 28 | 4 | 10 | | | -9 | 19 | 28 | 7143424 | 0 | 8 | 109 |
| 5 | 16 | Locations.Currency. | 1 | 0 | Parameter initialization | ParmInit_5 | | ParmInit | 19 | 28 | 5 | 10 | | | -10 | 19 | 28 | 7143424 | 0 | 8 | 109 |
| 5 | 17 | Locations.Currencies. | 1 | 0 | Parameter initialization | ParmInit_0 | | ParmInit | 26 | 85 | 0 | 10 | | | -11 | 26 | 85 | 7143424 | 0 | 2 | 109 |
| 5 | 17 | Locations.Currencies. | 1 | 0 | Parameter initialization | ParmInit_1 | | ParmInit | 26 | 85 | 1 | 10 | | | -12 | 26 | 85 | 7143424 | 0 | 2 | 109 |
| 5 | 17 | Locations.Currencies. | 1 | 0 | Parameter initialization | ParmInit_2 | | ParmInit | 26 | 85 | 2 | 10 | | | -13 | 26 | 85 | 7143424 | 0 | 8 | 109 |
| 5 | 17 | Locations.Currencies. | 1 | 0 | Parameter initialization | ParmInit_3 | | ParmInit | 26 | 85 | 3 | 10 | | | -14 | 26 | 85 | 7143424 | 0 | 8 | 109 |
| 5 | 17 | Locations.Currencies. | 1 | 0 | Parameter initialization | ParmInit_4 | | ParmInit | 26 | 85 | 4 | 10 | | | -15 | 26 | 85 | 7143424 | 0 | 8 | 109 |
| 5 | 17 | Locations.Currencies. | 1 | 0 | Parameter initialization | ParmInit_5 | | ParmInit | 26 | 85 | 5 | 10 | | | -16 | 26 | 85 | 7143424 | 0 | 8 | 109 |
| 5 | 37 | Locations.Currencies.Add. | 1 | 1 | Parameter initialization | ParmInit_0 | | ParmInit | 32 | 15 | 0 | 10 | | | -14 | 32 | 15 | 7143424 | 0 | 2 | 109 |
| 5 | 37 | Locations.Currencies.Add. | 1 | 1 | Parameter initialization | ParmInit_1 | | ParmInit | 32 | 15 | 1 | 10 | | | -15 | 32 | 15 | 7143424 | 0 | 2 | 109 |
| 5 | 37 | Locations.Currencies.Add. | 1 | 1 | Parameter initialization | ParmInit_2 | | ParmInit | 32 | 15 | 2 | 10 | | | -16 | 32 | 15 | 7143424 | 0 | 8 | 109 |
| 5 | 37 | Locations.Currencies.Add. | 1 | 1 | Parameter initialization | ParmInit_3 | | ParmInit | 32 | 15 | 3 | 10 | | | -17 | 32 | 15 | 7143424 | 0 | 8 | 109 |
| 5 | 37 | Locations.Currencies.Add. | 1 | 1 | Parameter initialization | ParmInit_4 | | ParmInit | 32 | 15 | 4 | 10 | | | -18 | 32 | 15 | 7143424 | 0 | 8 | 109 |
| 5 | 37 | Locations.Currencies.Add. | 1 | 1 | Parameter initialization | ParmInit_5 | | ParmInit | 32 | 15 | 5 | 10 | | | -19 | 32 | 15 | 7143424 | 0 | 8 | 109 |
| 5 | 37 | Locations.Currencies.Add. | 2 | 0 | Identity Function | _Save | = | OpAssign | 37 | 10 | 0 | 6 | _Save | ID | 2 | 37 | 10 | 65554 | 18 | 3 | 1 |
| 5 | 37 | Locations.Currencies.Add. | 2 | 0 | Identity Function | 15SN-121 | = | OpAssign | 37 | 10 | 1 | 6 | BoolLiteral | BoolLiteral | -13 | 37 | 10 | 65554 | 18 | 3 | 1 |
| 5 | 37 | Locations.Currencies.Add. | 3 | 3 | New ED instance | 5S20N-131 | NewED | NewED1 | 41 | 11 | 0 | 6 | NewED | NewED | -20 | 41 | 11 | 8160384 | 0 | 7 | 94 |
| 5 | 37 | Locations.Currencies.Add. | 3 | 3 | New ED instance | 5S20N-140 | NewED | NewED1 | 41 | 11 | 1 | 6 | NewED | NewED | -21 | 41 | 11 | 8160384 | 0 | 2 | 94 |
| 5 | 37 | Locations.Currencies.Add. | 3 | 3 | New ED instance | 5S20N-152 | NewED | NewED1 | 41 | 11 | 2 | 6 | NewED | NewED | -22 | 41 | 11 | 8160384 | 0 | 2 | 94 |
| 5 | 37 | Locations.Currencies.Add. | 3 | 3 | New ED instance | 5S20N-160 | NewED | NewED1 | 41 | 11 | 3 | 6 | NewED | NewED | -23 | 41 | 11 | 8160384 | 0 | 2 | 94 |
| 5 | 37 | Locations.Currencies.Add. | 3 | 3 | New ED instance | 5S20N-174 | NewED | NewED1 | 41 | 11 | 4 | 6 | | | -24 | 41 | 11 | 8160384 | 0 | 13 | 94 |
| 5 | 37 | Locations.Currencies.Add. | 4 | 2 | Identity Function | Item | = | OpAssign | 41 | 9 | 0 | 6 | Item | ID | 4 | 41 | 9 | 65573 | 37 | 7 | 1 |
| 5 | 37 | Locations.Currencies.Add. | 4 | 2 | Identity Function | 5S20N-131 | = | OpAssign | 41 | 9 | 1 | 6 | NewED | NewED | -20 | 41 | 9 | 65573 | 37 | 7 | 1 |
| 5 | 37 | Locations.Currencies.Add. | 5 | 7 | Save ED instance | 5S20N-183 | SaveED | SaveED1 | 45 | 10 | 0 | 6 | SaveED | SaveED | -25 | 45 | 10 | 6750208 | 0 | 2 | 103 |
| 5 | 37 | Locations.Currencies.Add. | 5 | 7 | Save ED instance | Item | SaveED | SaveED1 | 45 | 10 | 1 | 6 | Item | ID | 4 | 45 | 10 | 6750208 | 0 | 7 | 103 |
| 5 | 37 | Locations.Currencies.Add. | 5 | 7 | Save ED instance | 5S20N-192 | SaveED | SaveED1 | 45 | 10 | 2 | 6 | | | -26 | 45 | 10 | 6750208 | 0 | 13 | 103 |
| 5 | 37 | Locations.Currencies.Add. | 5 | 7 | Save ED instance | 5S20N-200 | SaveED | SaveED1 | 45 | 10 | 3 | 6 | | | -27 | 45 | 10 | 6750208 | 0 | 8 | 103 |
| 5 | 37 | Locations.Currencies.Add. | 5 | 7 | Save ED instance | 5S20N-214 | SaveED | SaveED1 | 45 | 10 | 4 | 6 | StringLiteral | StringLiteral | -28 | 45 | 10 | 6750208 | 0 | 8 | 103 |
| 5 | 37 | Locations.Currencies.Add. | 6 | 6 | Identity Function | ret | = | OpAssign | 45 | 8 | 0 | 6 | ret | ID | 8 | 45 | 8 | 65545 | 9 | 2 | 1 |
| 5 | 37 | Locations.Currencies.Add. | 6 | 6 | Identity Function | 5S20N-181 | = | OpAssign | 45 | 8 | 1 | 6 | SaveED | SaveED | -25 | 45 | 8 | 65545 | 9 | 2 | 1 |
| 5 | 38 | Locations.Currencies.LoadFromFile. | 1 | 31 | Identity Function | RecordType | | OpAssign | 70 | 25 | 0 | 2 | | | 3 | 70 | 25 | 65570 | 34 | 8 | 1 |
| 5 | 38 | Locations.Currencies.LoadFromFile. | 1 | 31 | Identity Function | _IV_RecordType | | OpAssign | 70 | 25 | 1 | 2 | | | 4 | 70 | 25 | 65570 | 34 | 8 | 1 |
| 5 | 38 | Locations.Currencies.LoadFromFile. | 2 | 32 | Identity Function | FileName | | OpAssign | 67 | 28 | 0 | 2 | | | 7 | 67 | 28 | 65570 | 34 | 8 | 1 |
| 5 | 38 | Locations.Currencies.LoadFromFile. | 2 | 32 | Identity Function | _IV_FileName | | OpAssign | 67 | 28 | 1 | 2 | | | 5 | 67 | 28 | 65570 | 34 | 8 | 1 |
| 5 | 38 | Locations.Currencies.LoadFromFile. | 3 | 33 | Parameter initialization | ParmInit_0 | | ParmInit | 65 | 24 | 0 | 10 | | | -55 | 65 | 24 | 7143424 | 0 | 2 | 109 |
| 5 | 38 | Locations.Currencies.LoadFromFile. | 3 | 33 | Parameter initialization | ParmInit_1 | | ParmInit | 65 | 24 | 1 | 10 | | | -56 | 65 | 24 | 7143424 | 0 | 2 | 109 |
| 5 | 38 | Locations.Currencies.LoadFromFile. | 3 | 33 | Parameter initialization | ParmInit_2 | | ParmInit | 65 | 24 | 2 | 10 | | | -57 | 65 | 24 | 7143424 | 0 | 8 | 109 |
| 5 | 38 | Locations.Currencies.LoadFromFile. | 3 | 33 | Parameter initialization | ParmInit_3 | | ParmInit | 65 | 24 | 3 | 10 | | | -58 | 65 | 24 | 7143424 | 0 | 8 | 109 |
| 5 | 38 | Locations.Currencies.LoadFromFile. | 3 | 33 | Parameter initialization | ParmInit_4 | | ParmInit | 65 | 24 | 4 | 10 | | | -59 | 65 | 24 | 7143424 | 0 | 8 | 109 |
| 5 | 38 | Locations.Currencies.LoadFromFile. | 3 | 33 | Parameter initialization | ParmInit_5 | | ParmInit | 65 | 24 | 5 | 10 | | | -60 | 65 | 24 | 7143424 | 0 | 8 | 109 |
| 5 | 38 | Locations.Currencies.LoadFromFile. | 4 | 0 | Identity Function | _Save | = | OpAssign | 55 | 11 | 0 | 6 | _Save | ID | 2 | 55 | 11 | 65554 | 18 | 3 | 1 |
| 5 | 38 | Locations.Currencies.LoadFromFile. | 4 | 0 | Identity Function | 15TN-161 | = | OpAssign | 55 | 11 | 1 | 6 | BoolLiteral | BoolLiteral | -17 | 55 | 11 | 65554 | 18 | 3 | 1 |
| 5 | 38 | Locations.Currencies.LoadFromFile. | 5 | 2 | Open File | 15TN-171 | FileOpen | FileOpen | 57 | 10 | 0 | 6 | FileOpen | FileOpen | -18 | 57 | 10 | 3145728 | 0 | 2 | 48 |
| 5 | 38 | Locations.Currencies.LoadFromFile. | 5 | 2 | Open File | 15TN-181 | FileOpen | FileOpen | 57 | 10 | 1 | 6 | StringLiteral | StringLiteral | -19 | 57 | 10 | 3145728 | 0 | 8 | 48 |

FIG. 34

| SYSTEM | PARENT | SECTIONNAME | EVENTSERIALNO | EVENTCONSTRAINTTYPE | SECTIONCNT | TIM | DEE | LOCSECNAME | CHILDINDEX | ACCNAME | SECTIONS | 12 |
|---|---|---|---|---|---|---|---|---|---|---|---|---|
| 5 | 0 | Locations. | 1 | 0 | 1 | 0 | 0 | Locations. | 1 | public | 5 | |
| 5 | 1 | Locations.SecurityPannel. | 2 | 0 | 2 | 0 | 0 | SecurityPannel. | 1 | public | 5 | 0100 |
| 5 | 2 | Locations.SecurityPannel.Login. | 13 | 0 | 13 | 0 | 0 | Login. | 1 | public | 5 | 01000100 |
| 5 | 13 | Locations.SecurityPannel.Login.Authenticate. | 14 | 0 | 14 | 0 | 0 | Authenticate. | 1 | private | 6 | 010001000100 |
| 5 | 2 | Locations.SecurityPannel.Logout. | 15 | 0 | 15 | 0 | 0 | Logout. | 2 | public | 5 | 01000200 |
| 5 | 1 | Locations.Currency. | 16 | 0 | 16 | 0 | 1 | Currency. | 3 | private | 6 | 0300 |
| 5 | 1 | Locations.Currencies. | 17 | 0 | 17 | 0 | 1 | Currencies. | 4 | public | 5 | 0400 |
| 5 | 17 | Locations.Currencies.Add. | 37 | 0 | 37 | 0 | 1 | Add. | 1 | public | 5 | 04000100 |
| 5 | 17 | Locations.Currencies.LoadFromFile. | 38 | 0 | 38 | 0 | 2 | LoadFromFile. | 2 | public | 5 | 04000200 |
| 5 | 38 | Locations.Currencies.LoadFromFile.ReadData. | 39 | 0 | 39 | 0 | 2 | ReadData. | 1 | private | 6 | 040002000100 |
| 5 | 17 | Locations.Currencies._Edit. | 40 | 0 | 40 | 0 | 2 | _Edit. | 3 | public | 5 | 04000300 |
| 5 | 17 | Locations.Currencies._Delete. | 41 | 0 | 41 | 0 | 2 | _Delete. | 4 | public | 5 | 04000400 |
| 5 | 1 | Locations.Language. | 42 | 0 | 42 | 0 | 1 | Language. | 6 | private | 6 | 0600 |
| 5 | 1 | Locations.Languages. | 43 | 0 | 43 | 0 | 1 | Languages. | 7 | public | 5 | 0700 |
| 5 | 43 | Locations.Languages.Add. | 63 | 0 | 63 | 0 | 1 | Add. | 1 | public | 5 | 07000100 |
| 5 | 43 | Locations.Languages.LoadFromFile. | 64 | 0 | 64 | 0 | 2 | LoadFromFile. | 2 | public | 5 | 07000200 |
| 5 | 64 | Locations.Languages.LoadFromFile.ReadData. | 65 | 0 | 65 | 0 | 2 | ReadData. | 1 | private | 6 | 070002000100 |
| 5 | 43 | Locations.Languages._Edit. | 66 | 0 | 66 | 0 | 2 | _Edit. | 3 | public | 5 | 07000300 |
| 5 | 43 | Locations.Languages._Delete. | 67 | 0 | 67 | 0 | 2 | _Delete. | 4 | public | 5 | 07000400 |
| 5 | 1 | Locations.Continent. | 68 | 0 | 68 | 0 | 1 | Continent. | 9 | private | 6 | 0900 |
| 5 | 1 | Locations.Continents. | 69 | 0 | 69 | 0 | 1 | Continents. | 10 | public | 5 | 0A00 |
| 5 | 69 | Locations.Continents.Add. | 89 | 0 | 89 | 0 | 1 | Add. | 1 | public | 5 | 0A000100 |
| 5 | 69 | Locations.Continents.LoadFromFile. | 90 | 0 | 90 | 0 | 2 | LoadFromFile. | 2 | public | 5 | 0A000200 |
| 5 | 90 | Locations.Continents.LoadFromFile.ReadData. | 91 | 0 | 91 | 0 | 2 | ReadData. | 1 | private | 6 | 0A0002000100 |
| 5 | 69 | Locations.Continents._Edit. | 92 | 0 | 92 | 0 | 2 | _Edit. | 3 | public | 5 | 0A000300 |
| 5 | 69 | Locations.Continents._Delete. | 93 | 0 | 93 | 0 | 2 | _Delete. | 4 | public | 5 | 0A000400 |
| 5 | 1 | Locations.Country. | 94 | 0 | 94 | 0 | 1 | Country. | 12 | private | 6 | 0C00 |
| 5 | 1 | Locations.Countries. | 95 | 0 | 95 | 0 | 1 | Countries. | 13 | public | 5 | 0D00 |
| 5 | 95 | Locations.Countries.Add. | 96 | 0 | 96 | 0 | 1 | Add. | 1 | public | 5 | 0D000100 |
| 5 | 95 | Locations.Countries._Edit. | 97 | 0 | 97 | 0 | 2 | _Edit. | 2 | public | 5 | 0D000200 |
| 5 | 95 | Locations.Countries._Delete. | 98 | 0 | 98 | 0 | 2 | _Delete. | 3 | public | 5 | 0D000300 |
| 5 | 95 | Locations.Countries.LoadFromFile. | 103 | 0 | 103 | 0 | 2 | LoadFromFile. | 5 | public | 5 | 0D000500 |
| 5 | 103 | Locations.Countries.LoadFromFile.ReadData. | 104 | 0 | 104 | 0 | 2 | ReadData. | 1 | private | 6 | 0D0005000100 |
| 5 | 13 | Security.Account. | 33000 | 1 | 6 | 0 | 0 | Account. | 2 | private | 4 | 010001000200 |
| 5 | 14 | Security.Account. | 33001 | 1 | 6 | 0 | 3 | Account. | 1 | private | 4 | 0100010001000100 |
| 5 | 15 | Security.Account. | 33002 | 1 | 6 | 0 | 4 | Account. | 1 | private | 4 | 010002000100 |
| 5 | 6 | Security.Account. | 33003 | 1 | 6 | 0 | 3 | Account. | 2 | private | 4 | 0200020001000200 |
| 5 | 7 | Security.Account. | 33004 | 1 | 6 | 0 | 4 | Account. | 1 | private | 4 | 02000200010001000100 |
| 5 | 8 | Security.Account. | 33005 | 1 | 6 | 0 | 5 | Account. | 1 | private | 4 | 0200020002000100 |
| 5 | 10 | Security.Account. | 33006 | 1 | 6 | 0 | 4 | Account. | 2 | private | 4 | 0200030001000200 |
| 5 | 11 | Security.Account. | 33007 | 1 | 6 | 0 | 4 | Account. | 1 | private | 4 | 02000300010001000100 |
| 5 | 12 | Security.Account. | 33008 | 1 | 6 | 0 | 5 | Account. | 1 | private | 4 | 0200030002000100 |
| 5 | 17 | Locations.Currency. | 33009 | 1 | 16 | 0 | 4 | Currency. | 5 | public | 5 | 04000500 |
| 5 | 37 | Locations.Currency. | 33010 | 1 | 16 | 0 | 2 | Currency. | 1 | private | 6 | 040001000100 |
| 5 | 39 | Locations.Currency. | 33011 | 1 | 16 | 0 | 3 | Currency. | 1 | private | 6 | 0400020001000100 |

FIG. 35

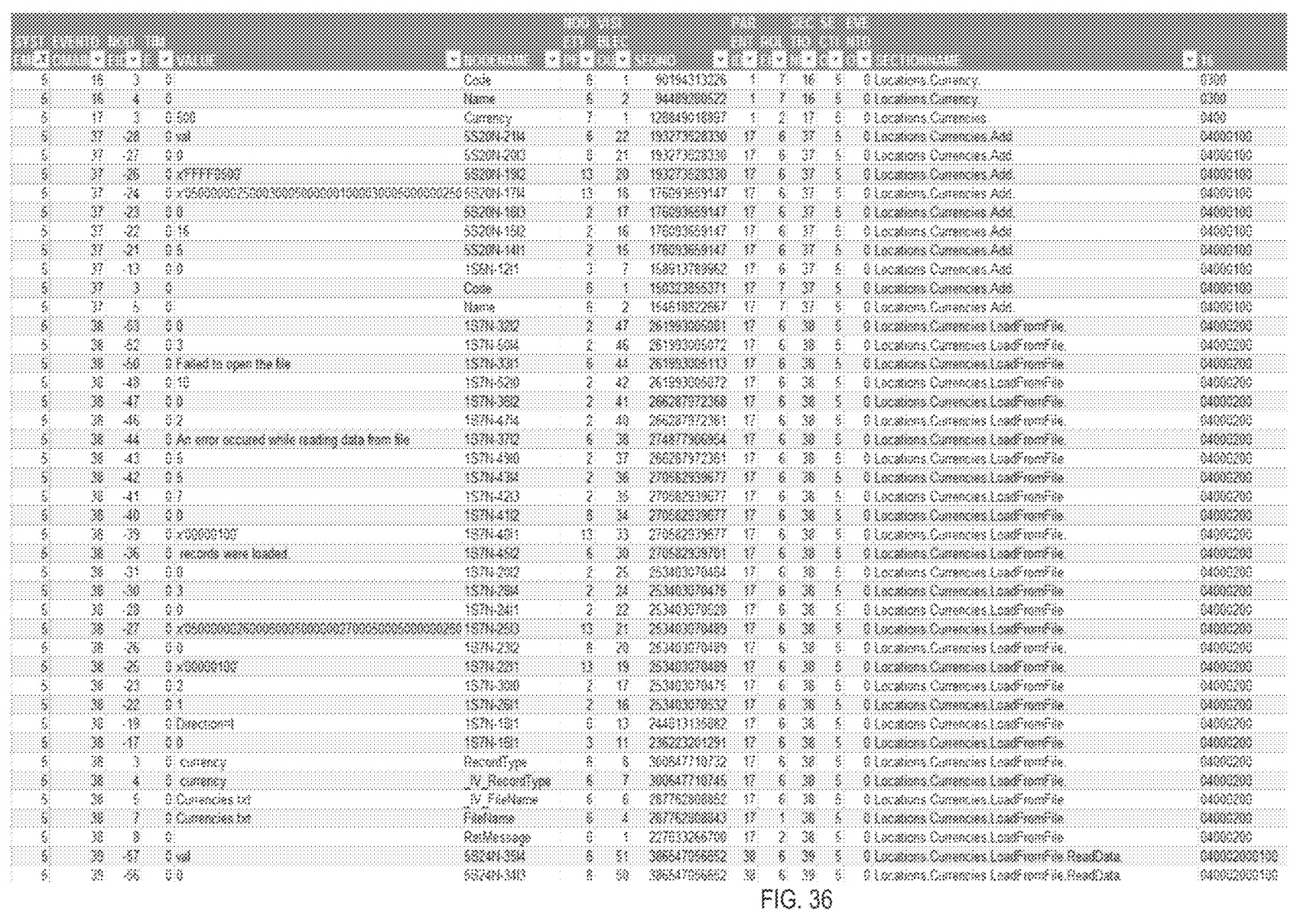

| | | | | | | | | | | | | | |
|---|---|---|---|---|---|---|---|---|---|---|---|---|---|
| 6 | 16 | 3 | 0 | Code | 6 | 1 | 9019431322 | 1 | 7 | 16 | 5 | 0 Locations.Currency. | 0300 |
| 6 | 16 | 4 | 0 | Name | 6 | 2 | 9448928522 | 1 | 7 | 16 | 5 | 0 Locations.Currency. | 0300 |
| 6 | 17 | 3 | 0 508 | Currency | 7 | 1 | 12884910897 | 1 | 2 | 17 | 6 | 0 Locations.Currencies. | 0400 |
| 6 | 37 | -28 | 0 val | 5S20N-2114 | 6 | 22 | 19327352833 | 17 | 6 | 37 | 5 | 0 Locations.Currencies.Add. | 04000100 |
| 6 | 37 | -27 | 0 0 | 5S20N-2103 | 8 | 21 | 19327352833 | 17 | 6 | 37 | 5 | 0 Locations.Currencies.Add. | 04000100 |
| 6 | 37 | -26 | 0 xFFFF0500 | 6S20N-1102 | 13 | 20 | 19327352833 | 17 | 6 | 37 | 5 | 0 Locations.Currencies.Add. | 04000100 |
| 6 | 37 | -24 | 0 x0500000025000300050000001000030005000000250 | 6S20N-1714 | 13 | 18 | 17609369147 | 17 | 6 | 37 | 5 | 0 Locations.Currencies.Add. | 04000100 |
| 6 | 37 | -23 | 0 0 | 6S20N-1103 | 2 | 17 | 17609369147 | 17 | 6 | 37 | 5 | 0 Locations.Currencies.Add. | 04000100 |
| 6 | 37 | -22 | 0 16 | 5S20N-1102 | 2 | 16 | 17609369147 | 17 | 6 | 37 | 5 | 0 Locations.Currencies.Add. | 04000100 |
| 6 | 37 | -21 | 0 6 | 5S20N-1411 | 2 | 15 | 17609369147 | 17 | 6 | 37 | 5 | 0 Locations.Currencies.Add. | 04000100 |
| 6 | 37 | -13 | 0 0 | 1S8N-1211 | 3 | 7 | 15891378962 | 17 | 6 | 37 | 5 | 0 Locations.Currencies.Add. | 04000100 |
| 6 | 37 | 3 | 0 | Code | 6 | 1 | 16032385371 | 17 | 7 | 37 | 5 | 0 Locations.Currencies.Add. | 04000100 |
| 6 | 37 | 5 | 0 | Name | 6 | 2 | 16461822667 | 17 | 7 | 37 | 5 | 0 Locations.Currencies.Add. | 04000100 |
| 6 | 38 | -53 | 0 0 | 1S7N-3202 | 2 | 47 | 26199300081 | 17 | 6 | 38 | 5 | 0 Locations.Currencies.LoadFromFile. | 04000200 |
| 6 | 38 | -52 | 0 3 | 1S7N-5004 | 2 | 46 | 26199300072 | 17 | 6 | 38 | 5 | 0 Locations.Currencies.LoadFromFile. | 04000200 |
| 6 | 38 | -50 | 0 Failed to open the file | 1S7N-3301 | 6 | 44 | 26199300113 | 17 | 6 | 38 | 5 | 0 Locations.Currencies.LoadFromFile. | 04000200 |
| 6 | 38 | -48 | 0 10 | 1S7N-5200 | 2 | 42 | 26199300072 | 17 | 6 | 38 | 5 | 0 Locations.Currencies.LoadFromFile. | 04000200 |
| 6 | 38 | -47 | 0 0 | 1S7N-3602 | 2 | 41 | 26626797236 | 17 | 6 | 38 | 5 | 0 Locations.Currencies.LoadFromFile. | 04000200 |
| 6 | 38 | -46 | 0 2 | 1S7N-4714 | 2 | 40 | 26626797236 | 17 | 6 | 38 | 5 | 0 Locations.Currencies.LoadFromFile. | 04000200 |
| 6 | 38 | -44 | 0 An error occured while reading data from file | 1S7N-3702 | 6 | 38 | 27487790064 | 17 | 6 | 38 | 5 | 0 Locations.Currencies.LoadFromFile. | 04000200 |
| 6 | 38 | -43 | 0 6 | 1S7N-4300 | 2 | 37 | 26626797236 | 17 | 6 | 38 | 5 | 0 Locations.Currencies.LoadFromFile. | 04000200 |
| 6 | 38 | -42 | 0 6 | 1S7N-4304 | 2 | 36 | 27058293977 | 17 | 6 | 38 | 5 | 0 Locations.Currencies.LoadFromFile. | 04000200 |
| 6 | 38 | -41 | 0 7 | 1S7N-4203 | 2 | 35 | 27058293977 | 17 | 6 | 38 | 5 | 0 Locations.Currencies.LoadFromFile. | 04000200 |
| 6 | 38 | -40 | 0 0 | 1S7N-4102 | 8 | 34 | 27058293977 | 17 | 6 | 38 | 5 | 0 Locations.Currencies.LoadFromFile. | 04000200 |
| 6 | 38 | -39 | 0 x00000100 | 1S7N-4011 | 13 | 33 | 27058293977 | 17 | 6 | 38 | 5 | 0 Locations.Currencies.LoadFromFile. | 04000200 |
| 6 | 38 | -36 | 0 records were loaded. | 1S7N-4502 | 6 | 30 | 27058293701 | 17 | 6 | 38 | 5 | 0 Locations.Currencies.LoadFromFile. | 04000200 |
| 6 | 38 | -31 | 0 0 | 1S7N-2002 | 2 | 25 | 25340307048 | 17 | 6 | 38 | 5 | 0 Locations.Currencies.LoadFromFile. | 04000200 |
| 6 | 38 | -30 | 0 3 | 1S7N-2004 | 2 | 24 | 25340307047 | 17 | 6 | 38 | 5 | 0 Locations.Currencies.LoadFromFile. | 04000200 |
| 6 | 38 | -29 | 0 0 | 1S7N-2411 | 2 | 22 | 25340307052 | 17 | 6 | 38 | 5 | 0 Locations.Currencies.LoadFromFile. | 04000200 |
| 6 | 38 | -27 | 0 x0500000026000600050000002700050005000000260 | 1S7N-2503 | 13 | 21 | 25340307048 | 17 | 6 | 38 | 5 | 0 Locations.Currencies.LoadFromFile. | 04000200 |
| 6 | 38 | -26 | 0 0 | 1S7N-2302 | 8 | 20 | 25340307048 | 17 | 6 | 38 | 5 | 0 Locations.Currencies.LoadFromFile. | 04000200 |
| 6 | 38 | -25 | 0 x00000100 | 1S7N-2201 | 13 | 19 | 25340307048 | 17 | 6 | 38 | 5 | 0 Locations.Currencies.LoadFromFile. | 04000200 |
| 6 | 38 | -23 | 0 2 | 1S7N-3000 | 2 | 17 | 25340307047 | 17 | 6 | 38 | 5 | 0 Locations.Currencies.LoadFromFile. | 04000200 |
| 6 | 38 | -22 | 0 1 | 1S7N-2901 | 2 | 16 | 25340307053 | 17 | 6 | 38 | 5 | 0 Locations.Currencies.LoadFromFile. | 04000200 |
| 6 | 38 | -19 | 0 Direction=1 | 1S7N-1801 | 0 | 13 | 24401313508 | 17 | 6 | 38 | 5 | 0 Locations.Currencies.LoadFromFile. | 04000200 |
| 6 | 38 | -17 | 0 0 | 1S7N-1601 | 3 | 11 | 23622320129 | 17 | 6 | 38 | 5 | 0 Locations.Currencies.LoadFromFile. | 04000200 |
| 6 | 38 | 3 | 0 currency | RecordType | 6 | 8 | 30064771073 | 17 | 6 | 38 | 5 | 0 Locations.Currencies.LoadFromFile. | 04000200 |
| 6 | 38 | 4 | 0 currency | _IV_RecordType | 6 | 7 | 30064771074 | 17 | 6 | 38 | 5 | 0 Locations.Currencies.LoadFromFile. | 04000200 |
| 6 | 38 | 5 | 0 Currencies.txt | _IV_FileName | 6 | 6 | 28776290086 | 17 | 6 | 38 | 5 | 0 Locations.Currencies.LoadFromFile. | 04000200 |
| 6 | 38 | 7 | 0 Currencies.txt | FileName | 6 | 4 | 28776290084 | 17 | 1 | 38 | 5 | 0 Locations.Currencies.LoadFromFile. | 04000200 |
| 6 | 38 | 8 | 0 | RetMessage | 0 | 1 | 22703326670 | 17 | 2 | 38 | 5 | 0 Locations.Currencies.LoadFromFile. | 04000200 |
| 6 | 39 | -57 | 0 val | 6S24N-3504 | 6 | 51 | 38654705665 | 38 | 6 | 39 | 5 | 0 Locations.Currencies.LoadFromFile.ReadData. | 04000200100 |
| 6 | 39 | -56 | 0 0 | 6S24N-3403 | 8 | 50 | 38654705665 | 38 | 6 | 39 | 5 | 0 Locations.Currencies.LoadFromFile.ReadData. | 04000200100 |

FIG. 36

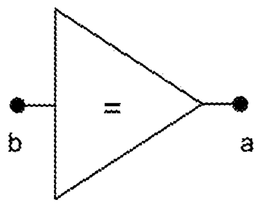
FIG. 47A
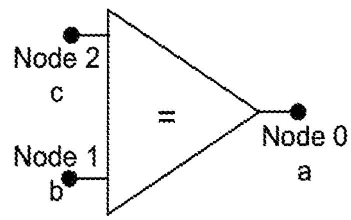
FIG. 47B
FIG. 48
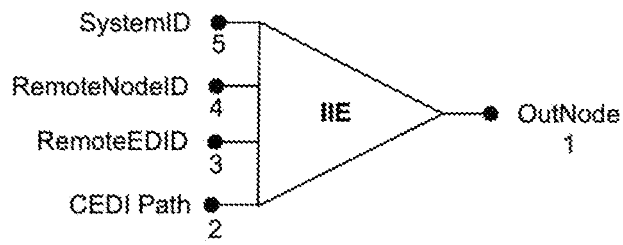
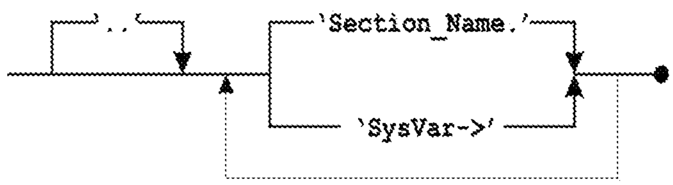
FIG. 49
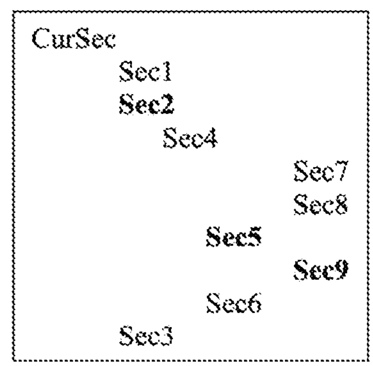
FIG. 50
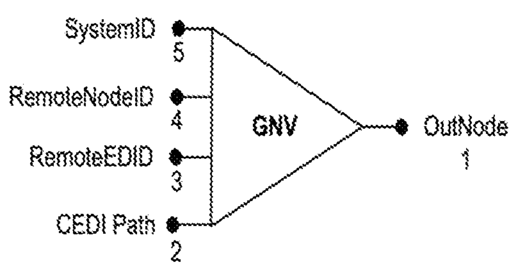
FIG. 51
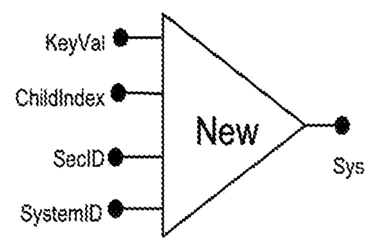
FIG. 52
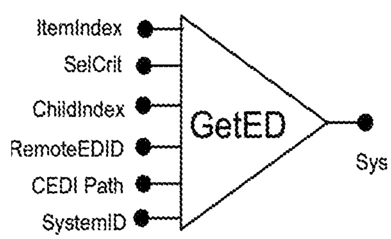
FIG. 53
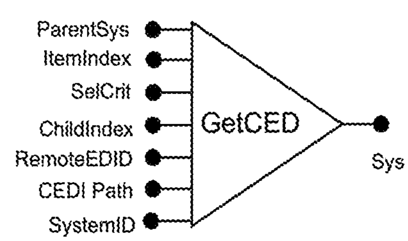
FIG. 54

SYSTEM ORIENTED PROGRAMMING AND IMPLEMENTATION INFRASTRUCTURE, SYSTEM AND METHOD

RELATED APPLICATION

This patent claims benefit of Provisional Patent Application No. 62/174,702 filed Jun. 12, 2015, entitled System Oriented Programming and Implementation Infrastructure, System and Method.

FIELD OF THE DISCLOSURE

The present disclosure relates to computer programming, and, in particular, to a system oriented programming and implementation infrastructure, system and method.

BACKGROUND

It can be easily observed that the number of technologies involved in business application development has been constantly and dramatically increased from the earlier monolithic applications to today's service oriented architectures. For example, IBM's technology stack (FIG. 1) increased from about 6 technologies used in the days of structured programming architectures (110) to about 15 for 3-tier client-server architectures (120) to more than 30 in the modern service-oriented architectures (130). As seen in FIG. 2, more than 30 technologies can also be counted in Microsoft's technology stack used in the development of service-oriented applications. Similar complexity can also be observed in the technology stack used in the Zend Framework, as illustrated in FIG. 15, which framework is an open source modern framework whose purpose is to simplify and speed up the development of web and mobile applications.

This dramatic increase in the number of technologies involved in the business application development has compounding negative effects, which include but are not limited to the following: the skillset required for developing today's business applications can't be found in a single individual but rather in a growing team of expensive resources specialized in many areas of technology; only large development groups and companies can afford to maintain the required pools of resources; the development is moving away even from the large enterprises and getting closer to the technology developers to keep up with ever evolving technologies; and the separation of the business analyses skill, which is within the enterprise, from the development skill, which is largely outsourced to a technology provider, results in longer response times for delivering new applications, enhancement and fixes and longer time to market of new products.

Layered application architecture refers to logical separation of application code that performs different functions, such as business logic, presentation, data storage and retrieval etc. Layering introduces independence between functionally different application areas and makes it easier to code and change one of the layers without affecting the entire application.

Tiered application architecture refers to the physical separation of one or more application layers and the capability of running those as separate entities in possibly different computer hardware. This physical separation introduces advantages for security, performance, scalability etc.

Service oriented architecture refers to constructing the application using service providers and service consumers that interact to each other via standard and platform independent interfaces. The service providers can be internally of any design, including layered and tiered architectures. They hide their implementation from the rest of the world and just advertise the services they provide and how to use them.

While today's most trendy architecture is service oriented, the service providers or consumers are constructed as layered or tiered applications using a variety of technologies and typically using object-oriented programming. Each application tier is coded using building blocks that are specialized for the particular tier. With illustrative reference to FIG. 3, these building blocks can represent data 362, 364 or business logic 360 and generally have a life span within their application tier. In order for a tiered application to function, the data is translated from one form to another and transported between different tiers using a variety of interfaces, i.e. respective interfaces 370, 372, 374 and 376. For instance the database tier 340 uses relational tables 362 or XML structures 364 to store data, whereas the business logic tier 330 uses objects 360 or object collections. The data from the database 340 are retrieved using SQL 372 or XQuery 374 commands, and passed to an object 360 in the logic layer 330 using for instance an ODBC interface. In another situation the presentation layer 320 retrieves the data from its own objects (356, 358) and uses serialization 354 to represent them to a web service client 310 using a web service interface 370. The web service client de-serializes the data and represents them as a different type of object 350 that in turn is used to populate the properties of a control object 352 that will show these data in the computer screen. The same situation applies for coding the processing logic. In the database tier, the SQL query language can be used, whereas the XQuery or PL/SQL language can be used to process the data. In the business logic, an object oriented or structured language like C++, C#, COBOL, etc., is typically used. In the presentation layer, a combination of object-oriented, scripted or hypertext languages can be used that operate on the tier specific data objects to implement the processing logic. Accordingly, models of this type can be readily characterized as supporting tierful coding.

With reference to FIG. 5, applications typically have a direct dependency on the technology used to develop them. In an enterprise application you can easily count 20-30 applicable technologies and growing. Every time a technology layer changes (510) every company that is using this technology must absorb that change by executing a corresponding update 520 to related applications 530. This results in huge number of changes in global scale that can affect hundreds or thousands of companies and thousands or millions of applications. An enterprise that does not propagate the technology change to its applications will be missing the new features and technology advances or security updates; the unchanged applications will be outdated and out of support.

Enterprise applications depend not only on the underlying technologies but also on application architectures that also change and become obsolete over years. The client-server architecture that was a modern one 10-15 years ago today is considered inferior against service oriented applications, for example.

The worst-case scenario is when the underlying technology becomes obsolete. In this case the enterprise faces the challenge of migrating the application to another technology, which is an expensive project that often results in re-engineering and re-writing the entire application or abandoning it and purchasing a new one. The data migration can also become a costly exercise.

In an enterprise environment, a variety of technology providers can typically be found for hardware (HW), operating systems (OS), application servers, databases, etc. Known server systems include MS Windows servers, UNIX servers, AS/400, mainframe, etc., whereas known database systems include MS SQL Servers, Oracle, IBM DB2, etc. Generally, the enterprise must face the cost of maintaining the different hardware infrastructures in datacenters, the cost of licenses of different software products that serve the same purpose and the cost of resources specialized in all these technologies. The enterprise's goal is to consolidate the technology providers, hardware platforms, databases and other middleware software. However, a major problem for consolidation subsists where certain required or desired applications are dependent on one technology or another and thus cannot readily be ported from one platform to another.

Coding for Business can be defined as the shortest form of statement or expression that describes the business function. For instance:

display picture x in the screen;

perform transaction T using user input I and account A;

store and display the balance B.

In comparison, Coding for Technology can be defined as technology instructions that are needed to implement the described business function. For instance:

```
- code for web service, i.e.:
  WS2007HttpBinding binding = new WS2007HttpBinding( );
  EndpointAddress address = new EndpointAddress(m_address);
  ChannelFactory1 = new ChannelFactory<HiLDDE.IHiLDDE>(binding,
  address);
  Channel1 = HiChannelFactroy.CreateChannel( );
  - code for user interface, i.e:
  public delegate void PickEventHandler(object sender, CustomSelect
  CustSelectObject);
  //Event
  public event PickEventHandler Pick;
  // Raise event
  protected virtual void RaiseEvent_Pick(CustomSelect CustSelectObject)
  {
    if (Pick != null)
      Pick(this, CustSelectObjec);
  }
- code for database, i.e:
  // declare cursor
  EXEC SQL DECLARE cursor1 CURSOR FOR
  <select statement>
  // open cursor
  EXEC SQL OPEN cursor1;
  // fetch data
  EXEC SQL FETCH cursor1 INTO
  <host variables list>
  // close cursor
  EXEC SQL CLOSE cursor1;
```

Coding for business is in a language that is understood by a business analyst. Coding for technology is not understandable by a business analyst, it can only be understood by a developer. In typical applications the majority of coding goes towards the technology that is used to implement certain business function. The larger the amount of coding for technology for the same business function the lower the productivity.

A productivity indicator can be based on, for example, the number of code lines per business function, the time spent for coding per business function, and/or the cost of coding per business function, to assess the productivity of a programming model or platform versus another.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for a programming infrastructure and implementations that overcome some of the drawbacks of known techniques, or at least, provides a useful alternative thereto. Some aspects of this disclosure provide examples of a system-oriented programming and implementation infrastructure, system and method that address this need.

In accordance with one aspect, there is provided a universally programmable platform for interacting with existing servers, each existing server utilizing any one or more programmable code interface, the platform comprising: a programming module for accepting event-based instruction sets, each event-based instruction set comprising event-based logic and configured to accept event-based data; at least one run-time server for interfacing with existing servers, wherein each run-time server stores respective sets of interfacing instructions in one of the programmable code interfaces utilized by one of the existing servers and corresponding to event-based data in an event-based instruction set; wherein said at least one run-time server is configured to generate and store said interfacing instructions automatically for at least one of the other existing servers based on the event-based instruction set, set interfacing instructions being implementable by said run-time server to cause the corresponding existing server to interact with at least one of the event-based logic and event-based data in accordance with the interfacing instructions, and said interfacing instructions being based on an association between the event-based logic a set of existing server commands stored on the at least one run-time server.

In accordance with one such aspect, each event-based instruction set is selected from the following group: new event-based instruction sets or inherited event-based instruction sets that may selectively inherit characteristics from one or more existing event-based instruction sets.

In accordance with another such aspect, the at least one run-time server is configured to accept additional existing server commands based on one or more of new existing servers and new programmable code interfaces.

In accordance with another aspect, there is provided a method of compiling event-based instruction sets for a universally programmable platform for interfacing with existing servers, the universally programmable platform comprising at least one run-time server operable to be communicatively coupled with existing servers, each existing server utilizing any one or more programmable code interface, the method comprising: accepting a first event-based instruction set for the at least one run-time server, the event based instruction set comprising at least one of the following: event-based logic and event-based data; automatically generating interfacing instructions for at least one existing server in the one or more programmable code interface, the interfacing instructions for causing the at least one existing server to carry out the first event-based instruction set, said interfacing instructions being based on associations between the event-based instruction set and a set of existing server commands stored on the at least one run-time server; and storing the generated interfacing instructions on the at least one run-time server.

In accordance with one such aspect, each event-based instruction set is selected from the following group: new event-based instruction sets or inherited event-based instruction sets that may selectively inherit characteristics from one or more existing event-based instruction sets.

In accordance with another such aspect, the at least one run-time server is configured to accept additional existing server commands based on one or more of new existing servers and new programmable code interfaces.

In accordance with another aspect, there is provided a server-mediated runtime application system, comprising: one or more runtime servers operable to provide universal runtime database, presentation and application services; and a client application operable on respective client devices to communicatively interface with said one or more runtime servers in executing runtime code stored and accessible via said one or more runtime servers; wherein said runtime code is universally executable in a technology-agnostic environment between said one or more runtime servers and said client; and wherein said one or more runtime servers interface with a plurality of distinct technology-specific execution layers in dynamically executing runtime instructions initiated via said client in executing said runtime code.

In accordance with one such aspect, said one or more runtime servers comprise each of a database server, a presentation server and an application server.

In accordance with one such aspect, said runtime code encompasses a universally structured set of encoded events, wherein each given event is self-contained in a universal event structure to define any one or more of data, presentation and application code required to fully execute said given event, said one or more of said data, presentation and application code being automatically and directly identifiable by respective ones of said runtime servers by virtue of said universal event structure in executing said given event during runtime.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 29, 30, 31, 32 and 33 are illustrative screenshot views of Systems, Sections, Interfaces, Elements and Nodes data artifacts, respectively, in accordance with one embodiment;

FIG. 34 is an illustrative screenshot of an exemplary Valuation Sequence, in accordance with one embodiment;

FIG. 35 is an illustrative screenshot of Event Domains, in accordance with one embodiment;

FIG. 36 is an illustrative screenshot of Nodes Values, in accordance with one embodiment;

FIGS. 47A and 47B are schematic diagrams of assignment elements, in accordance with one embodiment;

FIG. 48 is a schematic diagram of an Input Interface Element (IIE), in accordance with one embodiment;

FIG. 49 is a flow diagram of a relative or absolute path <EDPath>, in accordance with one embodiment;

FIG. 50 is a table showing an example of the Section Path to reach the Child Section, in accordance with one embodiment;

FIG. 51 is a schematic diagram of an Input Interface Elements (IIE), in accordance with one embodiment;

FIG. 52 is a schematic diagram of a new element, in accordance with one embodiment;

FIG. 53 is a schematic diagram of the GetCED element, in accordance with one embodiment;

FIG. 54 is a schematic diagram of the GetCED element, in accordance with one embodiment;

DETAILED DESCRIPTION

Figure 1:
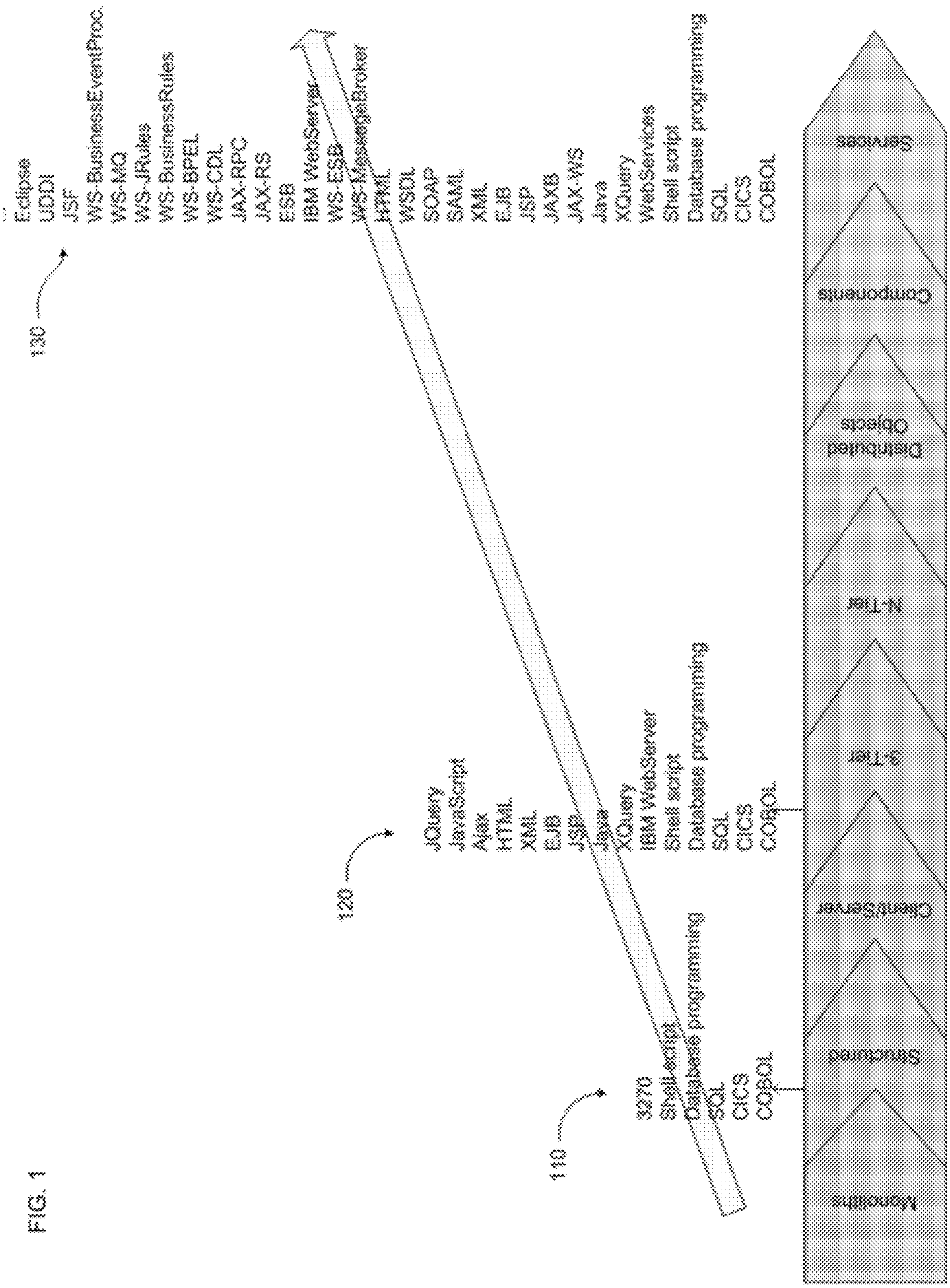
FIG. 1 is a diagram of IBM's technology stack.
Figure 2:
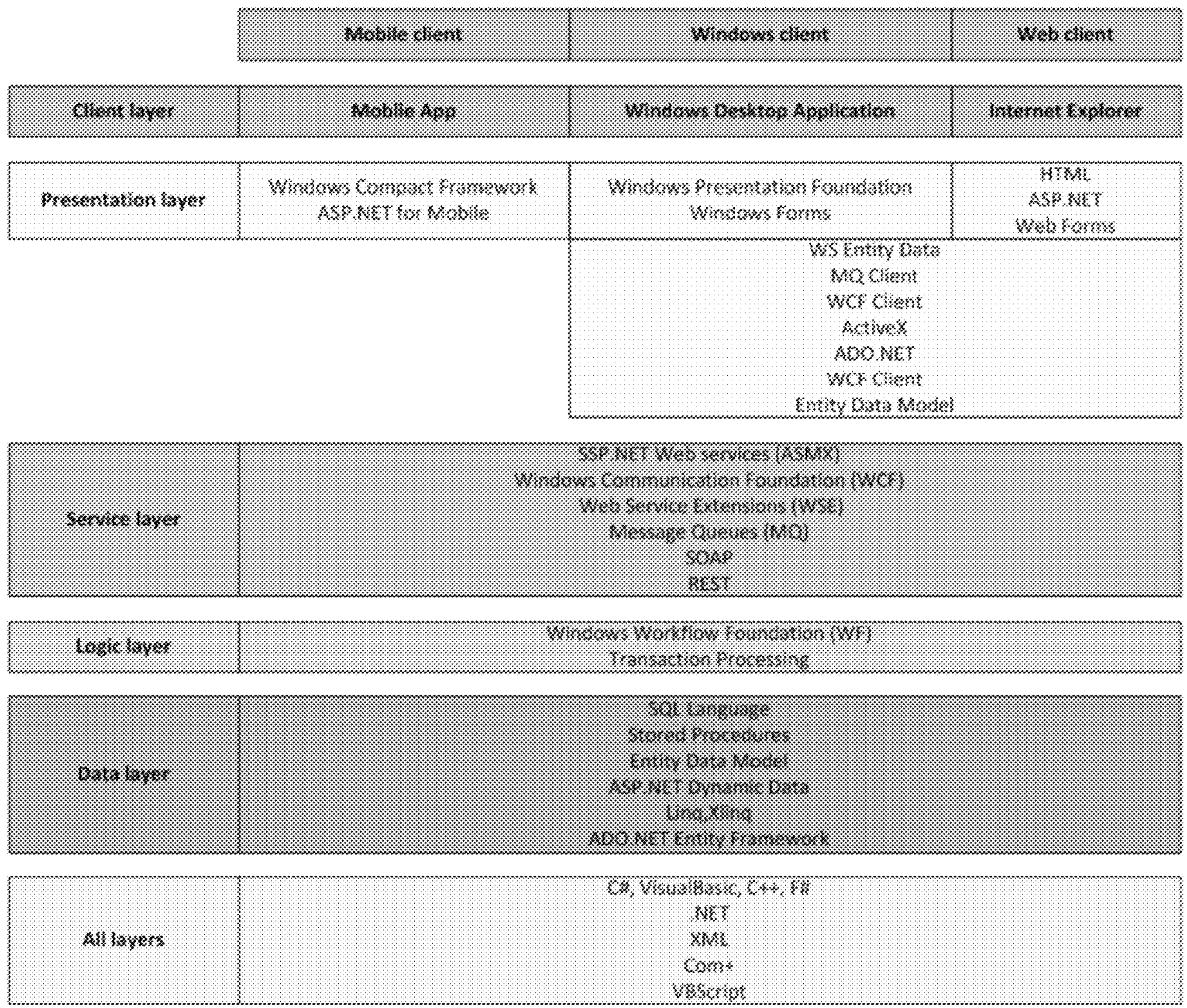
FIG. 2 is a diagram of Microsoft's technology stack as used in the development of service-oriented applications.
Figure 3:
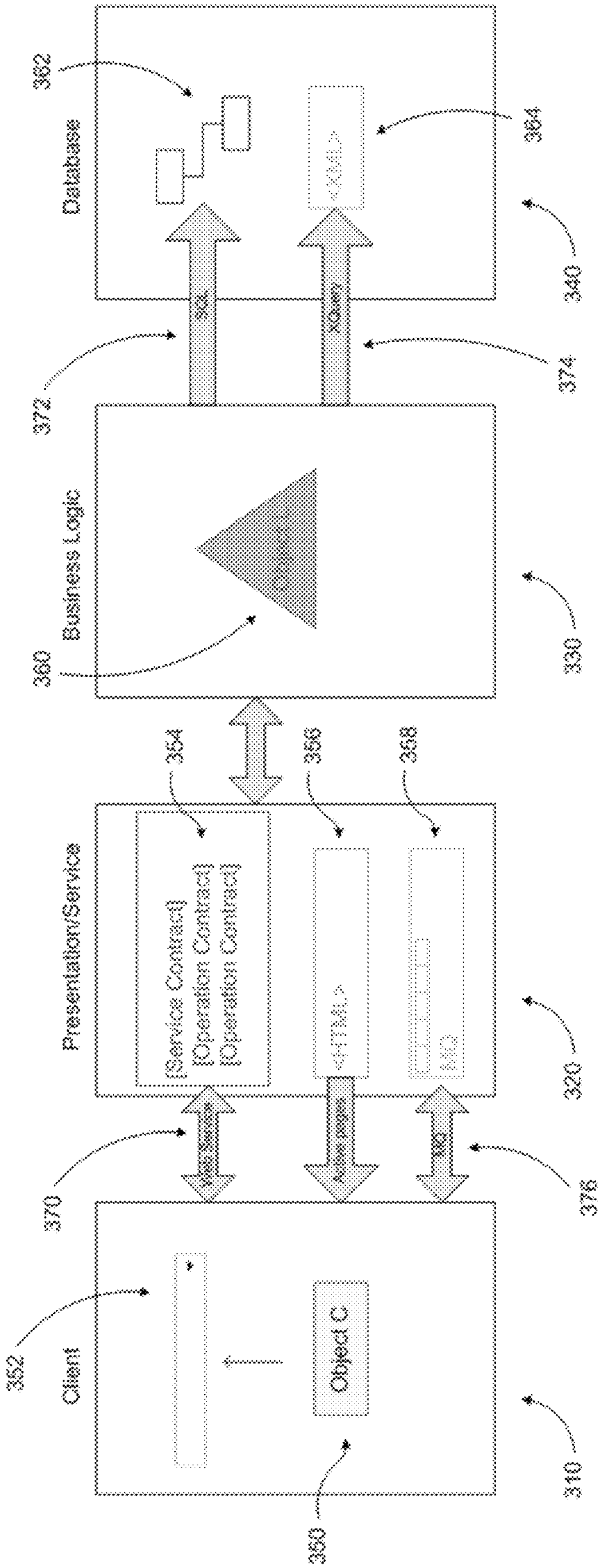
FIG. 3 is a high level schematic diagram of traditional application development and implementation platform.

The following description provides, in accordance with different embodiments, a detailed infrastructure for the implementation of system oriented programming and execution, which ultimately serves to provide various advantages over existing programming infrastructures and techniques.

The following describes a programming model and implementation that reduces the technological complexity of the development environment represented to the programmer. For instance, this model allows the programmer to use a single technology for developing multi-tier service-oriented applications without posing restrictions on programmability. The model reduces significantly the effort for developing multi-tier service-oriented applications and makes the development process accessible to a much larger audience (such as business analysts), which has traditionally been limited in accessibility to specialised or expert programmers.

In some embodiments, the described model has for further effect to reduce coding for technology in favour of coding for business, in other words favouring a coding language and architecture that is easier to recognize from the perspective of the business logic it intents to encode, which can increase coding productivity and make the application development process more readily consumable by the business analysis community, for example.

In some embodiments, the described model can also allow for substantively tierless application coding.

In some embodiments, the described model may also provide for the encoding of platform-independent applications via the introduction of a universal application virtualization.

In some embodiments, the described model may also facilitate the provision of versatile Web, desktop and mobile applications with minimal client-side coding.

In some embodiments, the described model may also facilitate the provision of applications equally consumable by human and application interfaces without the need for interface-specific coding.

These and other aspects and advantages are generally achieved by the introduction of new programming pragmatics, referred to generally herein as System Oriented Programming (SOP). The SOP pragmatics is predominantly based on the use of distinct systems as building blocks for encoding an application, as compared to using objects common in Object Oriented (OO) pragmatics. In the following description, this system-oriented model will be referred to as an Event Domain System Model (EDSM).

As will be described in greater detail below, different characteristics can be defined generally to contribute directly to achieving the abovementioned objectives. For instance, the EDSM is generally based on the principle of causality. As such, different processes that obey to causality principle can be programmed using this model. To do so, each building block of a given application, each generally recognized as its own Event Domain System (EDS), encapsulates data and business logic and unites them together. A direct consequence of this is the unity of data and business logic in the resulting application code. Accordingly, the EDS and the structures built with it are stateful and deterministic and encapsulate both data and business logic. This leads to the fact that a business process described as the EDS structure encapsulates all the information that is required by any application tier: i.e. business logic tier, data tier or presentation tier. As such, the application code, which ultimately consists of a structure constructed exclusively of respective EDSs does not contain tier-specific code and thus becomes effectively tierless.

As a result, a new SOP language, referred to herein as HiLDDE, was also developed based on EDSM. Accordingly, the SOP building blocks in HiLDDE are EDSs, as compared to objects as otherwise common in OO programming). Since each EDS encapsulates both data and business logic, it can be profiled as pure data, pure business logic or a combination of both.

The HiLDDE applications are also EDSs that consists in a hierarchic structure of sub EDSs (label 452) that represent presentation, business logic and data layers all built with the same types of building blocks.

The HiLDDE SOP language is a functional language that operates on scalars and EDS operands and features polymorphism.

In the system oriented inheritance model, new EDS systems can be constructed using one or more existing systems and adding or removing features. The composition of new systems is done by breaking down the parent system in atomic pieces and combining them together using user-specified rules. The newly created systems do not encapsulate inside them the parent systems. Instead, these new systems are independent systems that may contain some or all of the features of their parent systems.

Since the presentation, data and logic aspects of the systems are represented using EDSs, the inheritance model applies seamlessly to all the logical layers of the application (presentation, data and logic).

The construction of new EDSs based on existing ones is done using EDS expressions in both compile and runtime. Separate subsystems or an entire new application or application instance, with its business logic, database and user interface, can be constructed using one or more EDS expressions.

Figure 4:
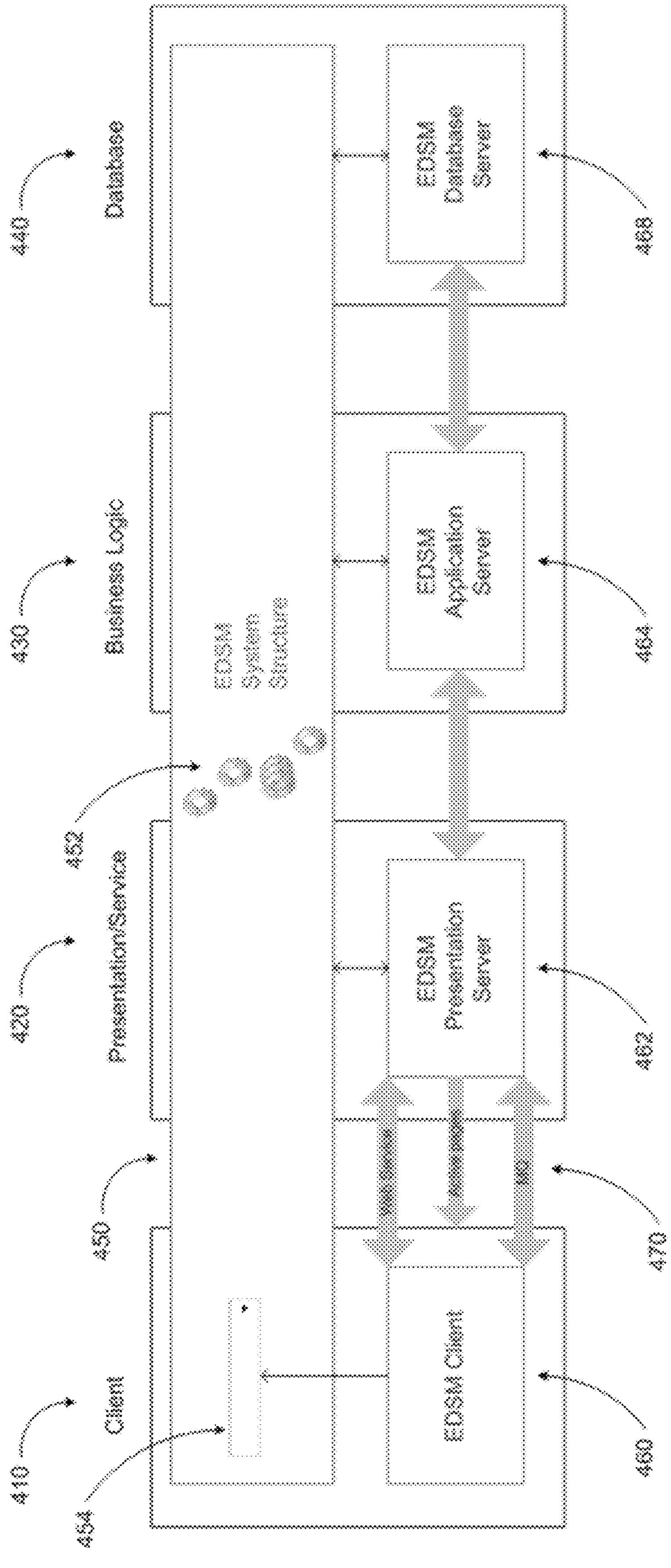
FIG. 4 is a high level schematic diagram of a system-oriented application development and implementation platform, in accordance with one embodiment.
Figure 5:
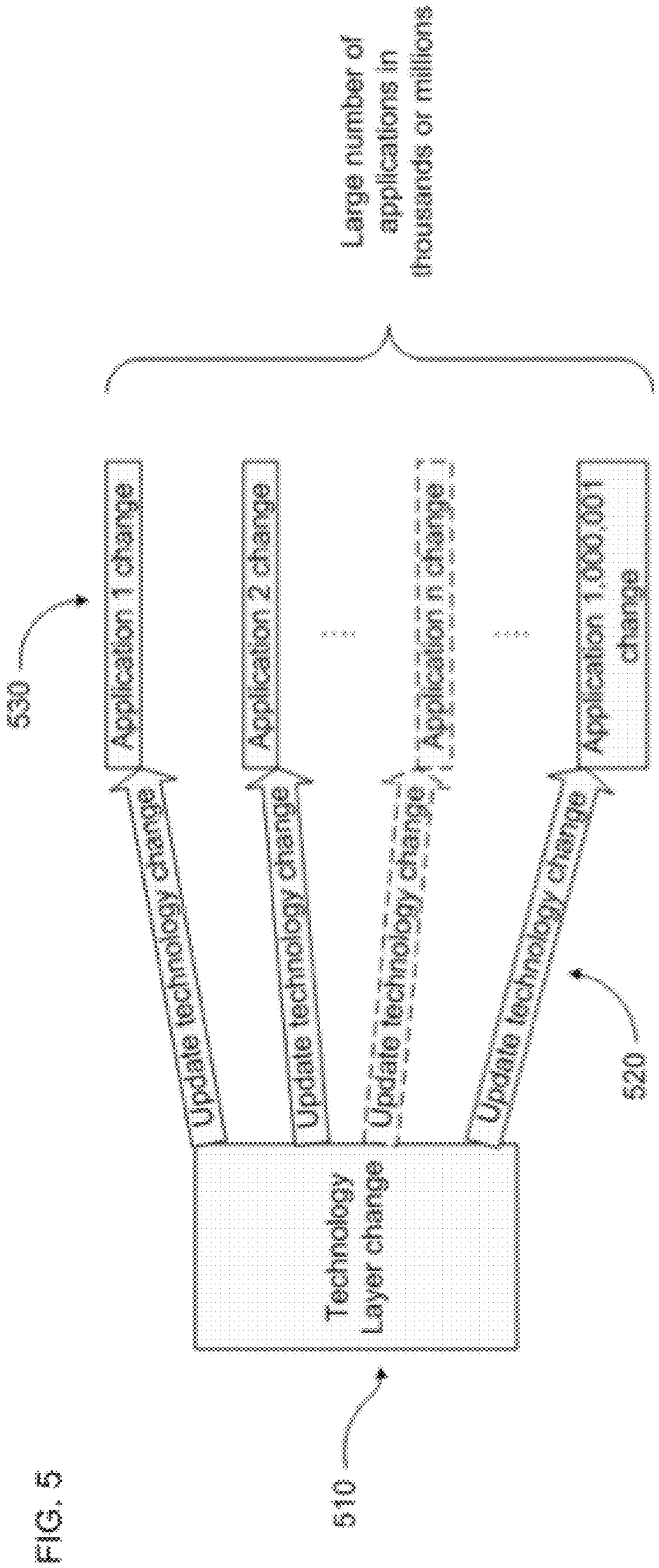
FIG. 5 is a schematic diagram of a technology layer change/update process within the context of a traditional application development and implementation platform.

In some embodiments, the HiLDDE language produces tierless and platform-independent intermediate code that is interpreted by tier- and platform-specific HiLDDE runtime servers. For greater clarity, the HiLDDE language and HiLDDE runtime servers will be referred to herein as the HiLDDE platform. With reference to the example of FIG. 4, and in accordance with one embodiment, the HiLDDE platform may be defined to service traditional client 410, presentation/service 420, business logic 430 and database 440 layers by virtue of an EDSM system structure 450 composed of a set of Event Domain Systems and Subsystems 452, each its own EDS and configured to seamlessly interface with each of an EDSM Client 460, ESDM Presentation Server 462, EDSM Application Server 464 and EDSM Database Server 468, whereby these tier- and platform-specific HiLDDE runtime servers can be defined and developed to achieve such platform independence. Namely, these servers can be implemented in specific tiers and platforms and allow the HiLDDE application code to be tierless and run in any hardware, software, database and/or communication platform. For example, the HiLDDE runtime presentation server 462 can operate on the presentation aspects of the EDS system 450 (i.e. application), the runtime application server 464 can interpret and operate on the business logic aspects of the EDS system 450, and the runtime database server 468 can operate on the data aspects of the EDS system 450. Since the EDS system 450 is deterministic, these three aspects are clearly defined in the EDS structure so the HiLDDE runtime servers deal with specific areas of the EDS system at all times.

Figure 6:
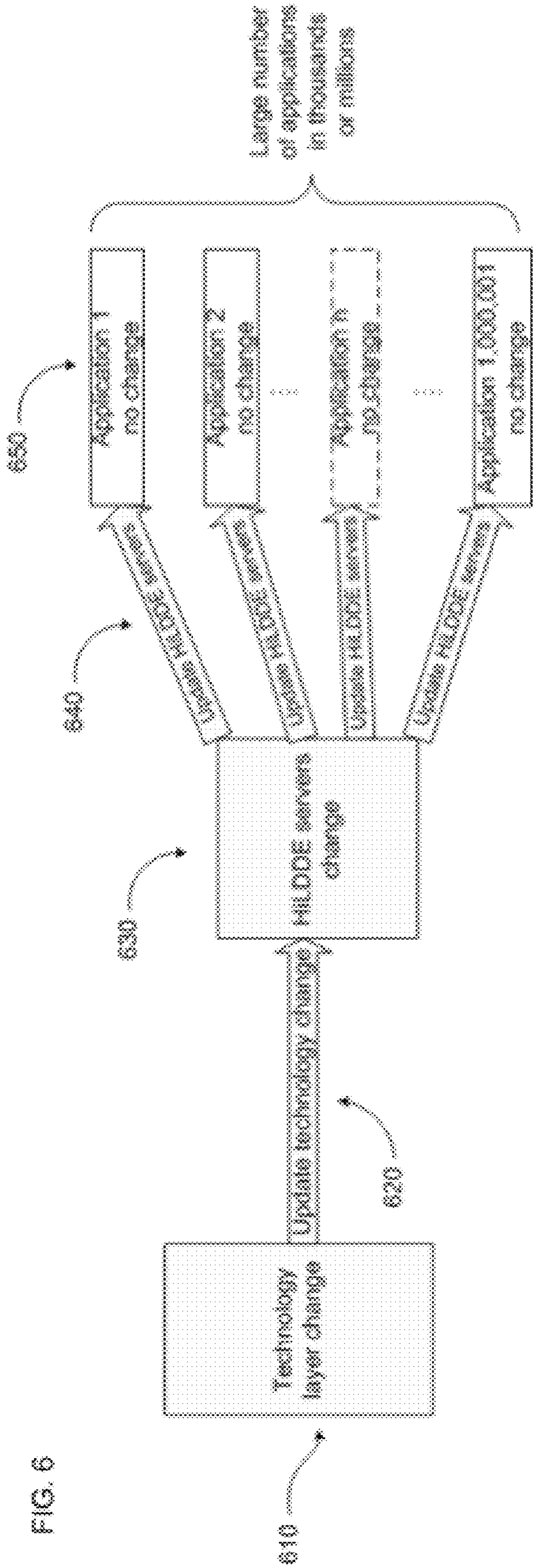
FIG. 6 is a schematic diagram a technology layer change/update process within the context of the system-oriented platform of FIG. 4.

Furthermore, the HiLDDE application servers can be configured to make use of all the technology that is available in the market to implement presentation, logic and data aspects of the EDS system. Likewise, as schematically illustrated in FIG. 6, Technology layer changes 610 can be observed centrally via corresponding changes/updates 620 to the HiLDDE servers 630, which updates can be automatically implemented 640 to the benefit of the large number of HiLDDE applications 650 relying thereon. Unlike current technologies, HiLDDE application code can remain unchanged and unaffected by underlying technology evolutions, while still potentially benefiting from such evolutions by virtue of their reliance on the system's runtime servers.

Figure 7:
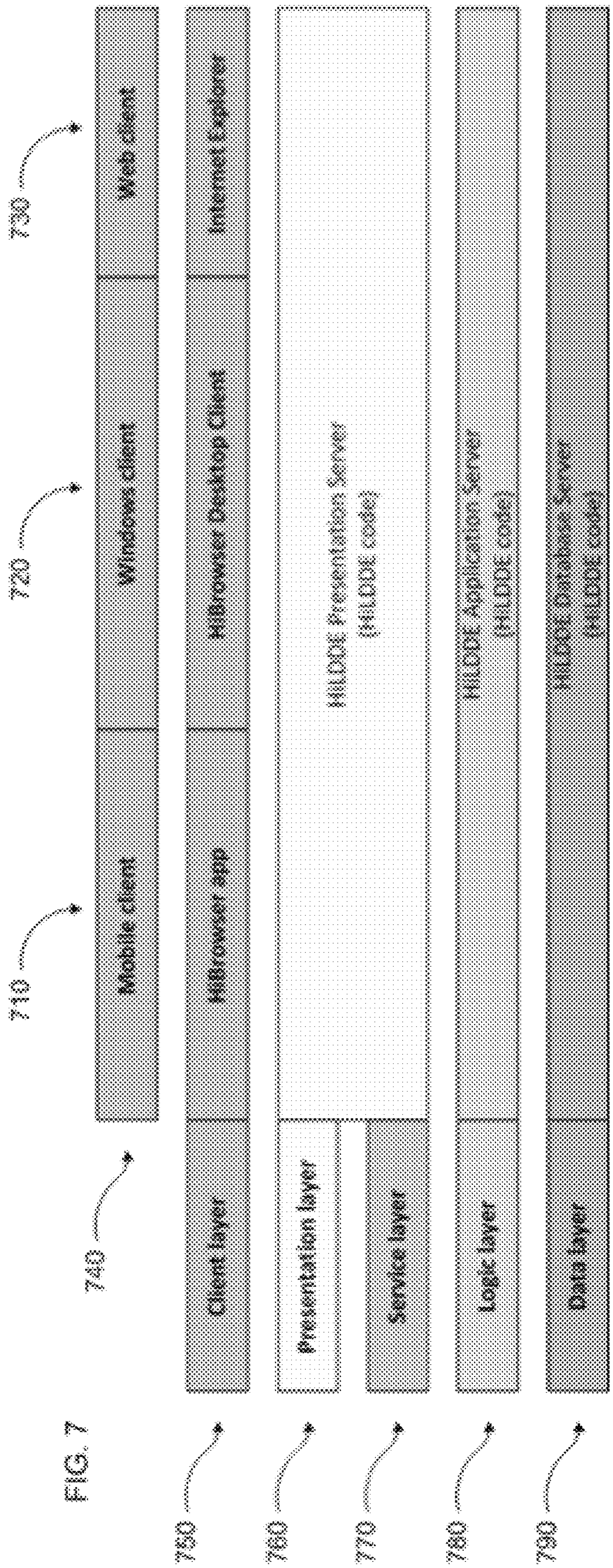
FIG. 7 is a schematic diagram of a layered architecture implementation of the system-oriented platform of FIG. 4.

With reference to FIG. 7, and in accordance with one embodiment, this principle is further illustrated within the context of a layered system architecture in which the Presentation Layer 760 and Server Layer 770 are operatively executed on the corresponding HiLDDE runtime presentation server, the logic layer 780 is operatively executed on the Hilde runtime application server and the data layer 790 is operatively executed on the HiLDDE runtime database server, each server continuously updated with the latest technologies to interface with the otherwise tier- and platform-agnostic HiLDDE application code. The Client Layer 750, in this embodiment, illustratively encompasses one or more of a HiLDDE-specific mobile browser application (HiBrowser App), HiLDDE-specific Desktop Client (HiBrowser Desktop Client) and a traditional Web browser (e.g. Internet Explorer) for interfacing with corresponding Mobile (710), Windows (720) and Web (730) Clients 740, respectively. The person of ordinary skill in the art will readily appreciate the staggering reduction in complexity provided by the HiLDDE platform, particularly as compared to the traditional models such as those schematically illustrated by FIGS. 1-3, 5 and 15.

Below is provided a non-limiting and non-exclusive list of various features and aspects of the HiLDDE platform, and programming language illustratively provided herein to implement this platform, that alone or in combination, distinguish this platform from commonly known platforms and programming models (e.g. such as OO models) and provide some of the advantages and technological benefits of using the HiLDDE platform and their equivalents as contemplate herein. As it will be appreciated by the skilled artisan upon reading the following examples and detailed description, other features, aspects and advantages of the proposed platform may be considered herein without departing from the general scope and nature of the present disclosure.

Building Blocks

Generally, the EDSM differs from existing models like OO models in that the EDS building blocks introduced herein provide for various advantages over the traditional OO building blocks common in the state of the art. For instance, programming objects are not, by definition, necessarily deterministic nor stateful, and as consequence, cannot benefit from the construction and information encapsulation capabilities provided by the EDS building blocks defined herein. As such, existing OO models traditionally define objects and their constructs (collections) that belong and have a life span only within a specific tier. The same is true for traditional concepts used in other tiers such as relational tables or structured XML data commonly used in database tiers.

While some attempts have been made to generalize the use of the same type of object and object instance in more application tiers, these efforts remain limited to the use of concepts that encapsulate only data or only business logic and do not span across all tiers of the application. Examples can be found in the Object Relational Mapping (ORM) model that represents relational tables as objects in non-database application tiers. This model effectively tries to unite the database tier with logic and presentation tiers, but only partially achieves this intent as the object data that represents relational tables only encapsulates data and not business logic. Additional objects must be used in business logic and presentation layers to manipulate the business or presentation logic, and therefore, coding for interfacing between all these types of objects is also required.

By contrast, the same building blocks can be used throughout the SOP model, resulting in a substantially tierless infrastructure. By comparison, in traditional multi-tier object oriented applications, different tiers must use different types of building blocks, i.e. the database layer will use relational tables or XML data structures, whereas the business logic layer will use objects, and the presentation layer will use objects, attribute specifications, hyperlinked texts, etc.

Derivation Model

The EDSM also differs from existing models in how new or child systems are derived from parent systems. For instance, when a new or child system comes into life as a result of combination of parent systems, the new system does not, as it would in traditional OO programming, encapsulate copies of the parents. Instead the new system is defined by a completely independent system constructed by combining atomic features of its parents based on macroscopic, system level rules; the new system retains its hierarchic structure of subsystems inherited from its parents. By comparison, in object oriented programing, if the hierarchic structure of the derived objects has to be preserved, the new objects obtained by derivation must encapsulate live and un-altered copies of the parents. For instance, if a new object oriented child object has to demonstrate one of its inherited features, the child must ask for it from the encapsulated parent responsible for this feature. If the humans for instance were built using an object oriented derivation model, each child would have live copies of its parents inside them, who themselves would have copies of the entire multi-generational inheritance chain. Conversely, if retaining copies of the parents has to be abandoned in object oriented programming, the derived object would ultimately need to have a flat list of each of the parents' features.

To the contrary, the system oriented derivation model proposed herein within the context of EDSM allows for every feature of any subsystem in the hierarchic structure of the existing parents to be changed in the newly derived child. Further, these features can be of presentation, data or logic nature. As a result, the hierarchic structure of the system can be retained after an unlimited number of derivations without having to refer to, or retain copies of the parents. In practice, while the observed derivation levels in an object-oriented language can reach 10 or 20 derivations, the system oriented model proposed herein can readily allow derivation levels higher by multiple orders of magnitude (e.g. practically unlimited) and effectively open the door for programming self-evolving systems or evolving-by-control systems.

Determinism

In order for presentation, application and database servers to be able to implement presentation, logic and data aspects of a given program using existing implementation technologies, the data, presentation and logic aspects of the constructs used in the application should be clearly identified. To achieve this, each EDS is by design configured to exhibit a deterministic nature in that every EDS by design will encompass a clear definition as to where presentation, logic and information data is to be found in every building block or construct of the application. The deterministic nature of the ESD is preserved during the system state changes as well as the derivation process as the derived system is again an EDS and only an EDS.

In comparison, the object in an oriented model is not necessarily deterministic in that it does not define what part of the object represents the presentation aspect of it, which part represents informative data and which part represents the business logic. While an object class that has deterministic features can be defined, child classes derived from this deterministic class do not necessarily retain the deterministic nature of the parent, making such objects incompatible with the tierless programming model proposed herein.

Decoupling

In accordance with some embodiments, the EDSM and application architectures enabled thereby are configured to provide for effective layer decoupling, in that the presentation, logic and data components or layers can be changed independently without affecting other layers. For instance, a new change can be introduced in the presentation layer and deployed to an existing EDSM application without necessarily affecting the existing user data. Furthermore, decoupling can be applied at the interface between traditional tiers, sub constructs within each tier (i.e. different business functions within the logic tier) as well as between programming/data code used in different tiers and the technology that is used to actually implement it in the runtime servers. As will be discussed in greater detail below, the EDSM maintains such decoupling by design at all levels, even though the same EDS in general can encapsulate presentation, data and logic. As will be discussed in greater detail below, this feature can be particularly desirable in decoupling an application's programming code or data from the underlying technologies used to implement them, i.e. in their respective tiers.

Application Virtualization

Application Virtualization generally refers to the separation of an application from its operating system (OS). Current OS-based virtualization techniques are limited in that they attempt to separate the application from the operating system, only, and do not provide for separation of the application from a database, a web server or any other middleware, for example. In other words, the OS-based virtualization does not make an application tier-independent. Currently, the implementation technologies of presentation, application and database tiers have heavily penetrated the application programming code or data presentations. This has made the application code and data representation code dependent on many varieties of underlying technologies used to implement these layers. Specialised skills are required to implement certain application tiers depending on the choice of the implementation technology that is used (i.e. the choice of operating system, programming language, database system, etc.). As a result, a change in implementation technology then requires changes in application programs that use these technologies directly.

As will be described in greater detail below with reference to certain embodiments, the HiLDDE presentation, application, and database runtime servers can completely isolate the application code from the technologies used to implement them. The HiLDDE runtime servers are designed to invoke various available underlying technologies to implement functions required by the application code such that any changes in these underlying technologies is absorbed by changes in these servers and not in the HiLDDE application code that they support. This feature is again made possible by the nature of the HiLDDE program code that has its roots in the deterministic feature of each EDS, which is lacking in traditional OO programing techniques.

User Interface

Any application developed in the HiLDDE platform is accessible by default via the following user interfaces: 1) Web Browser, 2) HiLDDE Windows Desktop Client and 3) HiLDDE Mobile App. For the HiLDDE programmer there is no need to write client side code for any of these platforms. The same HiLDDE application is represented automatically to the user via all three interfaces. To achieve this the HiLDDE presentation server exposes the presentation functions via one of these interfaces: 1) SOAP Web services, 2) REST Web Services, 3) MQs and 4) Com+. The client applications in different platforms accesses the presentation functions via any of those interfaces and performs the rendering of forms and controls in the specific user interface using client platform specific means. At the same time all functions exposed in the HiLDDE program are accessible and can be consumed via any of the 4 interfaces mentioned above. In summary, the HiLDDE platform differs from traditional multi-tier or service oriented programming by the fact that no application code is necessary to be written for User Interface as well as for exposing application functions as Web Services or MQ messages. Any HiLDDE application is accessible automatically using Web Browser and fixed Windows Desktop and Mobile applications as well as any of the four interfaces mentioned above without the need to write user code to expose the interfaces or Client code for the UI. Writing specific Client side applications that communicate with HiLDDE program using the four built in interfaces is always possible but not required. This is described in details in User Interface section of the Language Specification section.

Workflow Applications

Web Service Workflow Application is a class of applications where the business functions of the applications are exposed to the user as Web Services that change based on state of the business that follows a business flow. For instance if we are in the step A of business flow the available Web services are $\{SA_1, SA_2 \ldots SA_n\}$ and if we move to the consecutive step B another set of Web services is available $\{SB_1, SB_2 \ldots SB_m\}$. Various vendors provide specialised platforms for developing and hosting Web Service Workflow Applications. For instance Microsoft offers Windows Workflow Foundation (WF) and IBM Business Process Manager (BPM). Both are sophisticated and expensive platforms that require dedicated skillsets for programing and hosting of Workflow Applications. HiLDDE offers native support for Workflow Applications without introducing additional tools, servers or programming models. These are supported by two key features of the HiLDDE programing language: Polymorphism and System state variables.

Polymorphism allows creation of collections of ED systems that have different definitions. Such collections can be built dynamically at runtime. Since every ED system has its own input and output interface from the Web service presentation interface this results in a collection of Web Services that are available for consumption at a specific node of the business flow. These Web services can be consumed by custom-built Web service clients from the native HiLDDE UI clients, which require no client coding. In addition, to form a collection of web services that change from step to step in the business process flow, HiLDDE offers Web Service collections that change in time at the same node of the business flow. For instance a payment web service interface in the payment node of the business flow in day 2 may have a different definition from day 1 depending on internal condition. This is supported natively in HiLDDE programming by state variables that are ED system type. The EDS state variables can take different system values from state to state, which results in different web service operations from day to day at the same node of the business function. As such HiLDDE offers elegant programming and hosting of Web Service application in the same programming language and model and platform used for other non-workflow applications. This is discussed in more details in Workflow Applications section of Language Definition.

Cost

Using HLDDE system-oriented programming brings significantly lower costs for developing and running applications and shorter times to market. The following are the areas of cost savings Development Time Instead of typically three types of expensive resources needed in multitier or service oriented applications (database, backend and front end developers), only one type is needed in HiLDDE platform.

The development cycle in HiLDDE is much shorter than a traditional programming and the application code much shorter. The HiLDDE language is easy to learn and does not require extensive knowledge of the underlying technologies.

The coding for interfacing between different types of applications or between different application layers is eliminated.

Using the HiLDDE platform creates more opportunities to create larger families of applications that use the same programming and running platform and communicate natively with each other.

No separate coding is needed to make HiLDDE applications available for Web, Desktop or Mobile access. They are automatically accessible via all these three user interfaces.

Runtime

The application code has a much longer lifetime, as it is independent of the underlying technology for operating systems, databases and other middleware layers.

It also provides for lower operating costs. Typically when new operating system, database or middleware patches are rolled out, the applications need to be tested to ensure they run smoothly with the updated software. In the HiLDDE infrastructure, the applications do not need to be tested, only the four components of the HiLDDE runtime platform need to be tested: HiLDDE client, Presentation, Application and Database Server.

HiLDDE applications are portable through different operating systems and hardware platforms. This allows the applications to migrate easily from platform to platform and allow companies to reduce their technology footprint, save in license and maintenance costs, etc.

The table below summarizes the development resources needed in the case of traditional programming versus HiLDDE system-oriented tierless programming.

| Development time | | | | | |
|---|---|---|---|---|---|
| Traditional programming | | | HiLDDE | | Comments |
| Application layer | Resources | Technology skillset | Resources | Technology skillset | |
| Data layer | Data architect | Database design | HiLDDE programmer | HiLDDE | |
| | Database programmer | SQL, XQuery, Embedded SQL, CLI programming, etc. | HiLDDE programmer | HiLDDE | |
| Business logic | Back end Programmer | COBOL, RPG, C++, C#, VB Java, Transaction Manager, MQ, etc. | HiLDDE programmer | HiLDDE | |
| Presentation layer | Front end programmer | Java, JSP, ASP.NET, WPF, VB, VB Script, C#, PHP, SOAP, REST | HiLDDE programmer | HiLDDE | |
| Web Client | Web programmer | HTML, Java, Java Script, VB, VB Script, C#, PHP, WPF | HiLDDE programmer | HiLDDE | The same HiLDDE developed user interface is available for Web browser, HiLDDE Desktop Client and HiLDDE App Client. |
| Desktop Client | Desktop programmer | Java, VB, C#, PHP | Not required | HiLDDE | |
| Mobile Client | Mobile programmer | Mobile App | Not required | HiLDDE | |
| Workflow | Workflow Application programmer | MS WS, IBM BPM | HiLDDE programmer | HiLDDE | |

Definitions

The following provides a set of definitions used to define the Event Domain System (EDS), as contemplated herein within the context of one particular embodiment of the invention.

A Scalar Variable is defined herein as an identifier that can be associated with a quantifiable scalar property.

A scalar variable Type is defined as a type of scalar variable that can be associated with a given scalar property, such as numeric (represents a member of the set of numerical values); string (represents a member of the set of alphanumerical values); date (represents a member of the set of date values); time (represents a member of the set of time values); Boolean (represents a member of the set of Boolean values); etc.

Figure 8:
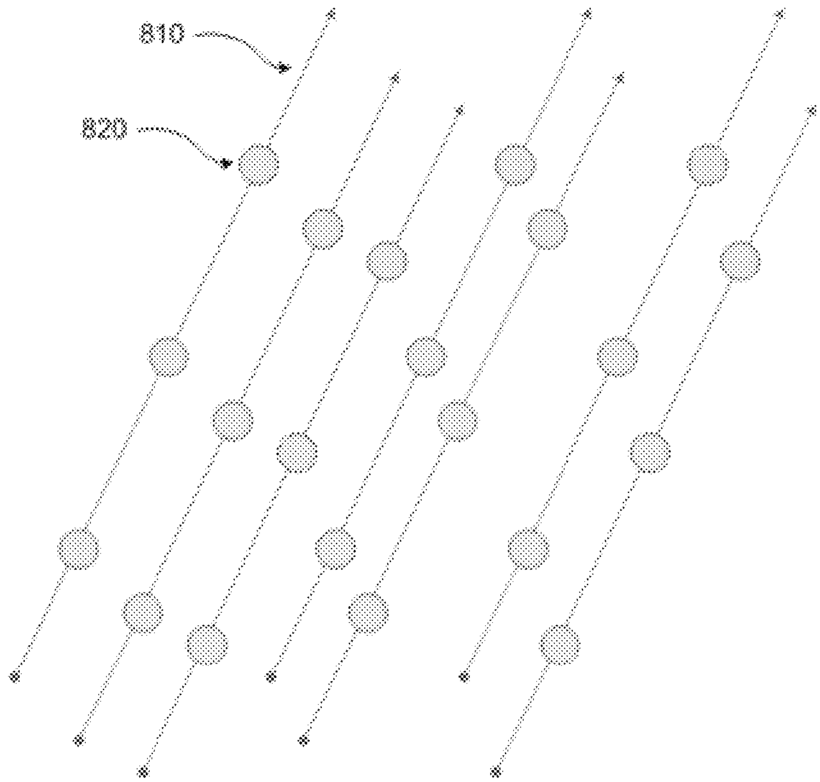
FIGS. 8 to 14 are schematic representations of variable, event and system definitions within context of a system-oriented platform in accordance with one embodiment.

Accordingly, each scalar variable will be associated with a type variable, which will indicate the type of the scalar value that can be associated with the scalar variable. The type variable itself is associated with the type string. For illustrative purposes, FIG. 8, and those referenced below, represents scalar variables as arrows 810 and the values associated with them as dots 820. For greater clarity, unless otherwise noted, the term variable will be used henceforth to refer to scalar variables.

On that basis, let's consider a set of variables X, where $X=\{x_k\}$ and for each of the variables $x_k$ a rule $V_k(M_k)$ that maps all other variables but itself into $x_k$. The set $M_k=\{x_r|r\neq k\}$ can be empty or contain some or all of the variables $x_r$ except for $x_k$.

The variable $x_k$ of the set X is defined as a dependent variable if the set $M_k$ is not empty. The subset of indexes k that belong to dependent variables will be assigned with the letter D, such that: $X^D=\{x_d|d\in D\}$.

Otherwise, the variable $x_i$ of the set X is defined as an independent variable if it is not a dependent variable. The set of variable indexes that belong to independent variables will be assigned the letter I, such that:

$$X^I=\{x_i|i\in I\}$$

$$X=X^D\cup X^I$$

A valuation function of a dependent variable $x_d$ is defined as a rule $V_d$ that maps the variables $X^{\bar{d}}$ into $x_d$, such that: $x_d=V_d(X^{\bar{d}})$. There is a one-to-one mapping between dependent variables $x_d$ and valuation functions $v_d$.

An algorithm for filling an empty set C with values of the variables X can be defined provided a given subset of the values of independent variables I.

A variable is defined as available if it has a value in the set C of the variables X.

First, all the values of independent variables I are added into the set $C=C^I$, thus defining the variables $X^I$ as available. The valuation functions can then be used to calculate the values of the dependent variables $X^D$. Only those valuation functions whose input arguments are available can be calculated.

Let's suppose there exists a sequence of evaluation of valuation functions as such that all dependent variables are evaluated after their evaluation according to this sequence. A valuation sequence is thus defined as an order of execution of valuation functions such that all dependent variables are valuated when the execution is completed. To do so, the valuation sequence is represented as an ordered set of dependent variable indexes assigned with letter S such that: $S=\{k_1, k_2, \ldots k_d | k \in D\}$.

If the valuation sequence exists, all dependent variables $X^D$ can be calculated and added to the set $C=C^I \cup C^D$.

An event is defined as a mapping between some set of variables and the set of independent variables. An event is a set of rules that define the values of independent variables, which set of rules are assigned the letter e and defined as follows: $e=\{e_1, e_2, \ldots e_k | k \in I\}$, where $e_k$ indicates the rule for mapping a specific variable.

An event occurrence is defined as the application of the event rules which generates a new set of independent variables $C^I$. While an event is thought as a set of rules, the event occurrence is the application of these rules to generate a new set of independent variables values. Every time an event occurs, a new current set of independent variables values is generated, which leads in the valuation of dependent variables by means of execution of the valuation sequence and so in the generation of a new current set. Accordingly, a series of events e(t) produces corresponding sets of values C(t) of variables X. This series of value sets is illustrated in FIG. 9.

Based on the above, an Event Domain System (EDS) can be defined as the 5-tuple:

- a set of variables which is a union of independent and dependent variables, such that $X=X^I \cup X^D$, and where $X^D$ can be empty;
- a set of valuation functions $V^D=\{v_d | v_d \equiv V_d(X^{\bar{d}})\}$, where $V^D$ can be empty;
- a valuation sequence $S=\{k_1, k_2, \ldots k_d | k \in D\}$, where S can be empty;
- an event $e=\{e_1, e_2, \ldots e_k | k \in I\}$, where e can be empty; and
- a set of initial values of state variables $X^R[0]=X_0^R$.

Figure 9:
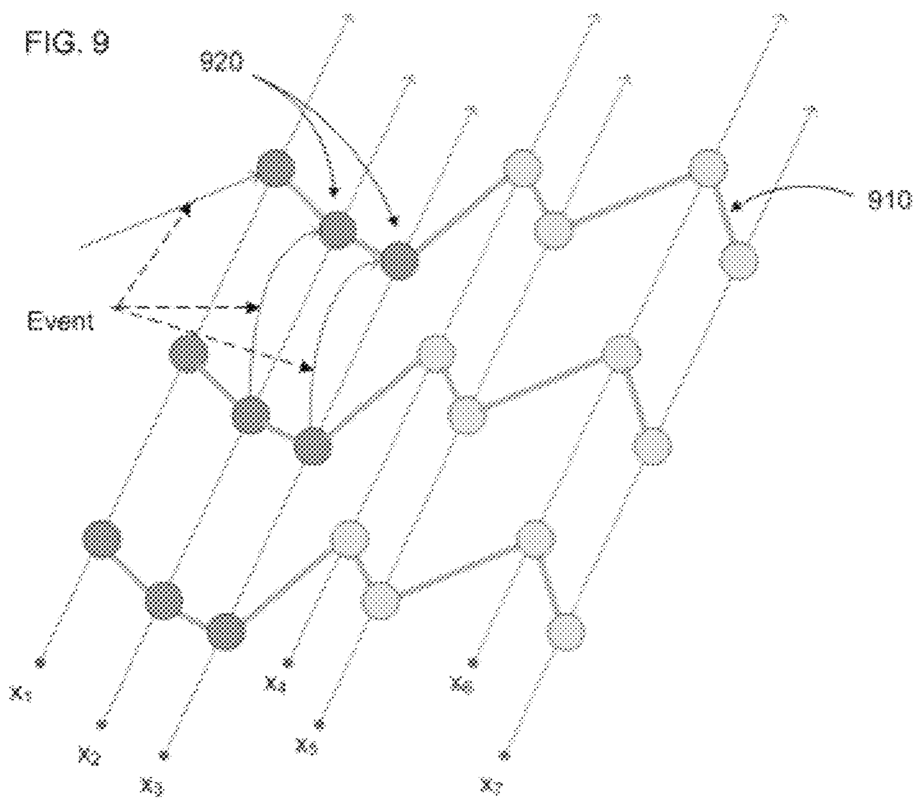

A System State can be defined as the set of values of the system's variables X at a given time or iteration, whereby the Current System State is defined as the set of the latest values of the system's variables X, illustrated as the set of latest values 910 for variables $X_1$ to $X_7$ in FIG. 9.

A State Variable is defined as an independent variable that is valuated based on its own previous value, as illustrated by the values 920 for variables $X_2$ and $X_3$ in FIG. 9. In the following, the set of state variables will be assigned with the symbol $X^R$, wherein R is the set of indexes of variables X that are state variables.

In comparison, an Input Variable is defined as an independent variable that is independent from its own previous value. In the following, the set of input variables will be assigned with the symbol $X^H$, wherein H is the set of indexes of variables X that are input variables. Accordingly, the set of system variables is a union of disjoint subsets of input variables, state variables and dependent variables, as follows:

$$X=X^I \cup X^D=X^H \cup X^R \cup X^D$$

Figure 10:
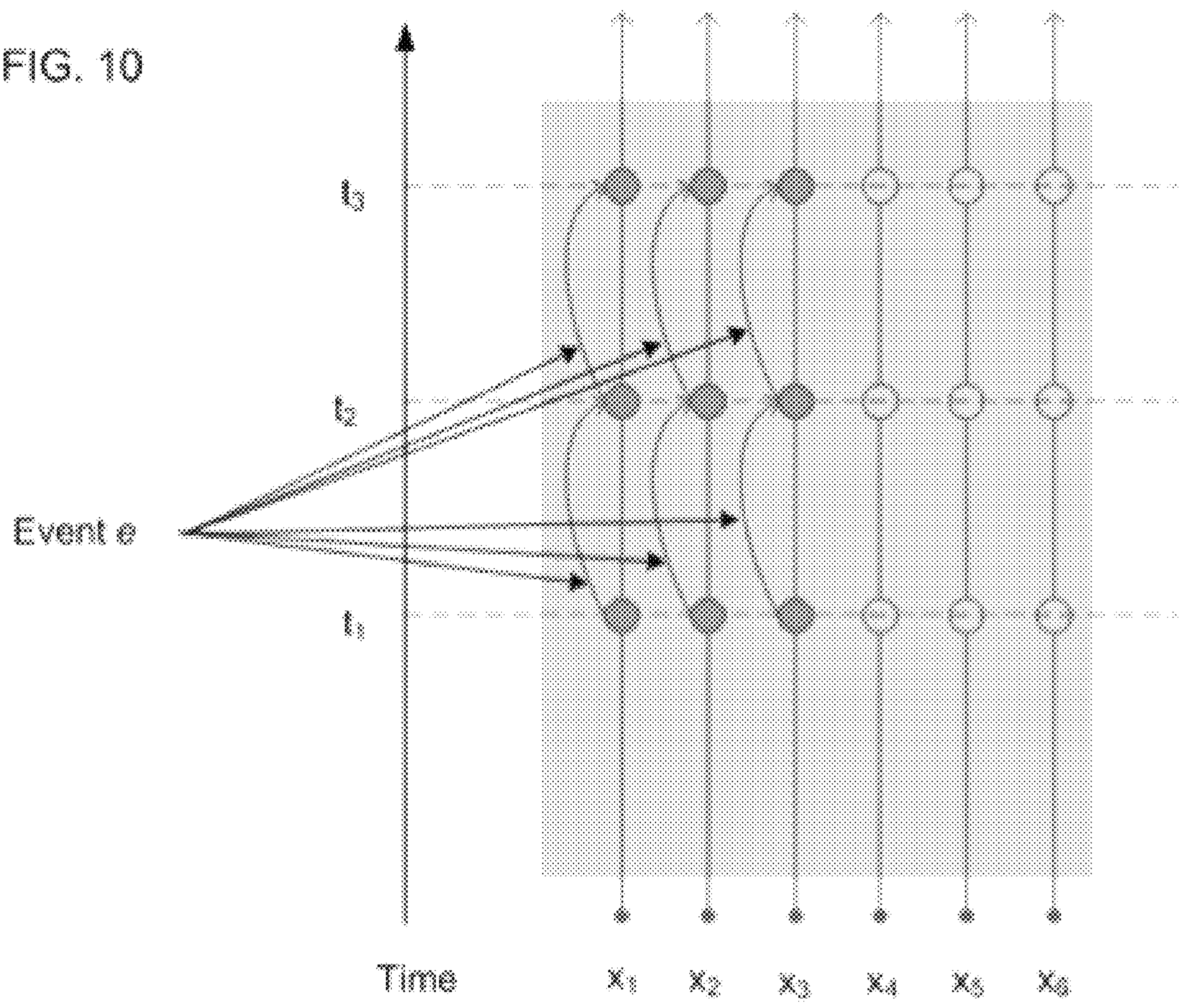

Time is defined herein as an event counter, for example as shown as times $t_1$, $t_2$ and $t_3$ in FIG. 10.

Figure 11:
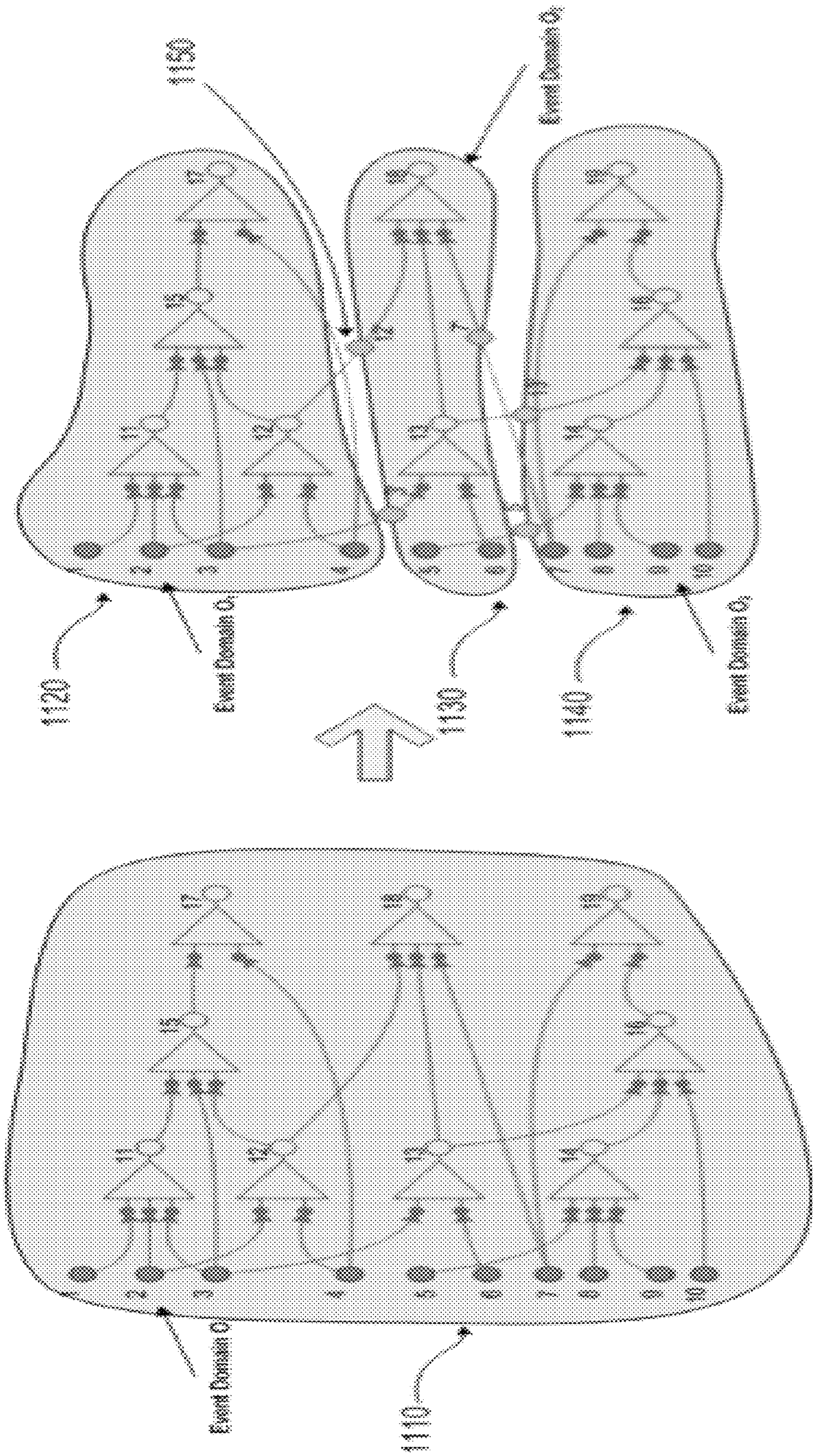

From the above, it can be shown analytically that every EDS can be broken down into smaller EDSs, interchangeably referred to herein and defined as sub-EDSs or simply Subsystems. This is illustrated in FIG. 11. The EDS 1110 has independent variables 1 to 10, dependent variables 11 to 19, valuation functions {v11, v12, . . . v19} and valuation sequence {11, 12, 15, 17, 13, 18, 14, 16, 19}. EDS 1110 can, however, be broken down into 3 sub-EDSs 1120, 1130 and 1140. For sub-EDS 1130, the dependency on foreign variables 3, 12 and 7 can be seen as 3 independent variables 3', 12' and 7' (1150). Accordingly, sub-EDS 1130 has independent variables {5, 6, 3', 7', 12'}, dependent variables {13, 18}, valuation functions {v13,v18} and valuation sequence {13,18}.

An Output variable is defined herein as any of the variables X of a given EDS that is defined as an input variable by another EDS.

In general, EDS systems form Composite EDS Structures wherein sub-EDSs are located as children of their parent EDS, and wherein any such structure itself defines an EDS.

Figure 14:
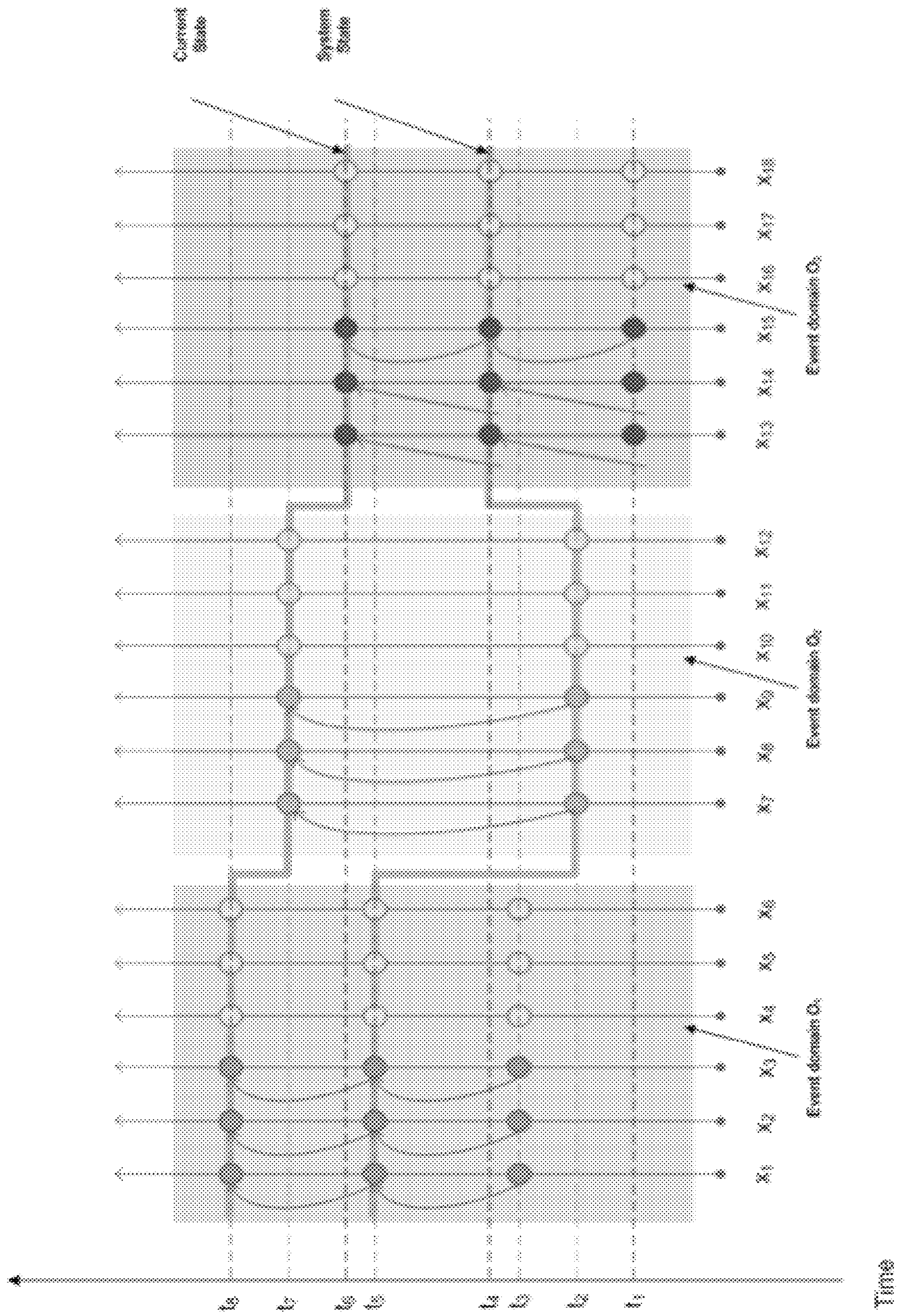
Figure 15:
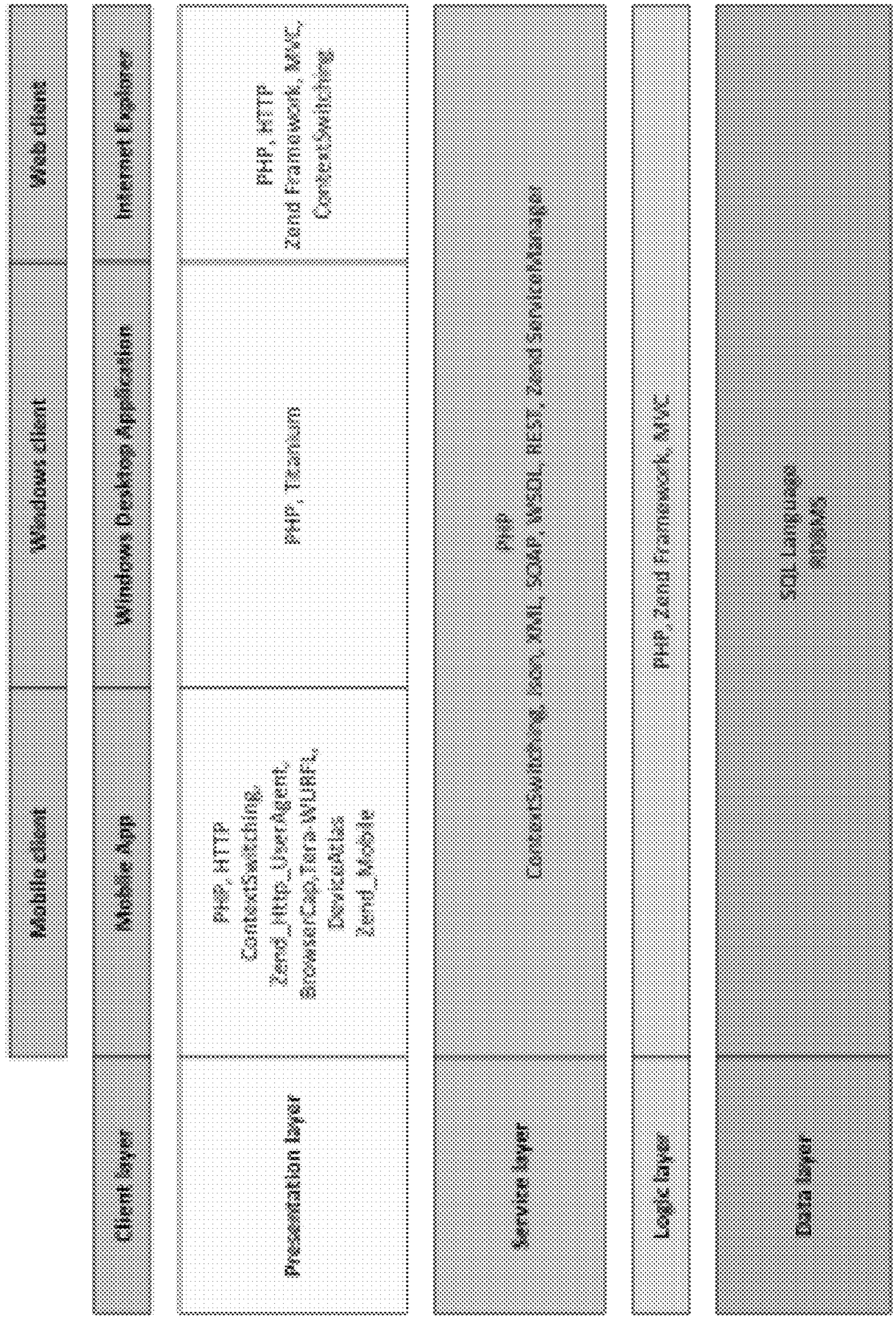
FIG. 15 is a diagram of a Zend Framework technology stack for the development of Web and mobile applications.

From above, the Composite EDS Structure Time is defined much like above as an event counter that ticks for every event in each of the structure's subsystems. Likewise, a Composite EDS Structure State is defined as the union of all subsystem states at a given time t, whereas the Composite EDS Current State is this union for all the latest subsystem states. FIG. 14 illustrates the concepts of Composite EDS time and state.

From the above, a new variable type can be defined as an EDS Variable Type, which type can define an Input, State or Dependent Variable. The values of the EDS-type variables in the state t can be obtained using a set of difference equations:

$$\begin{cases} X^D[t] = V^D(X^I[t]) = V^D(X^H[t],\ X^R[t]) = V^D(X^H[t], e^R(X^R[t-1])) \\ X^R[0] = X_0^R \end{cases}$$

where $X^R[t]=e^R(X^R[t-1])$ is a set of r functions that map the state variables in the state t−1 into state variables in state t. This difference equation fully describes an EDS as it contains all 4 elements that are needed to describe the EDS, as defined above.

Since EDS can be described as difference equations, it is possible to construct EDS Functions that take EDS and scalar arguments and return an EDS or scalar. It is likewise possible to construct EDS expressions that take EDS and scalar arguments, use a specified set of operators or functions and return an EDS or scalar. This allows the EDS variables to be used in the same fashion and without limitation as scalar variables in an EDS.

Figure 12:
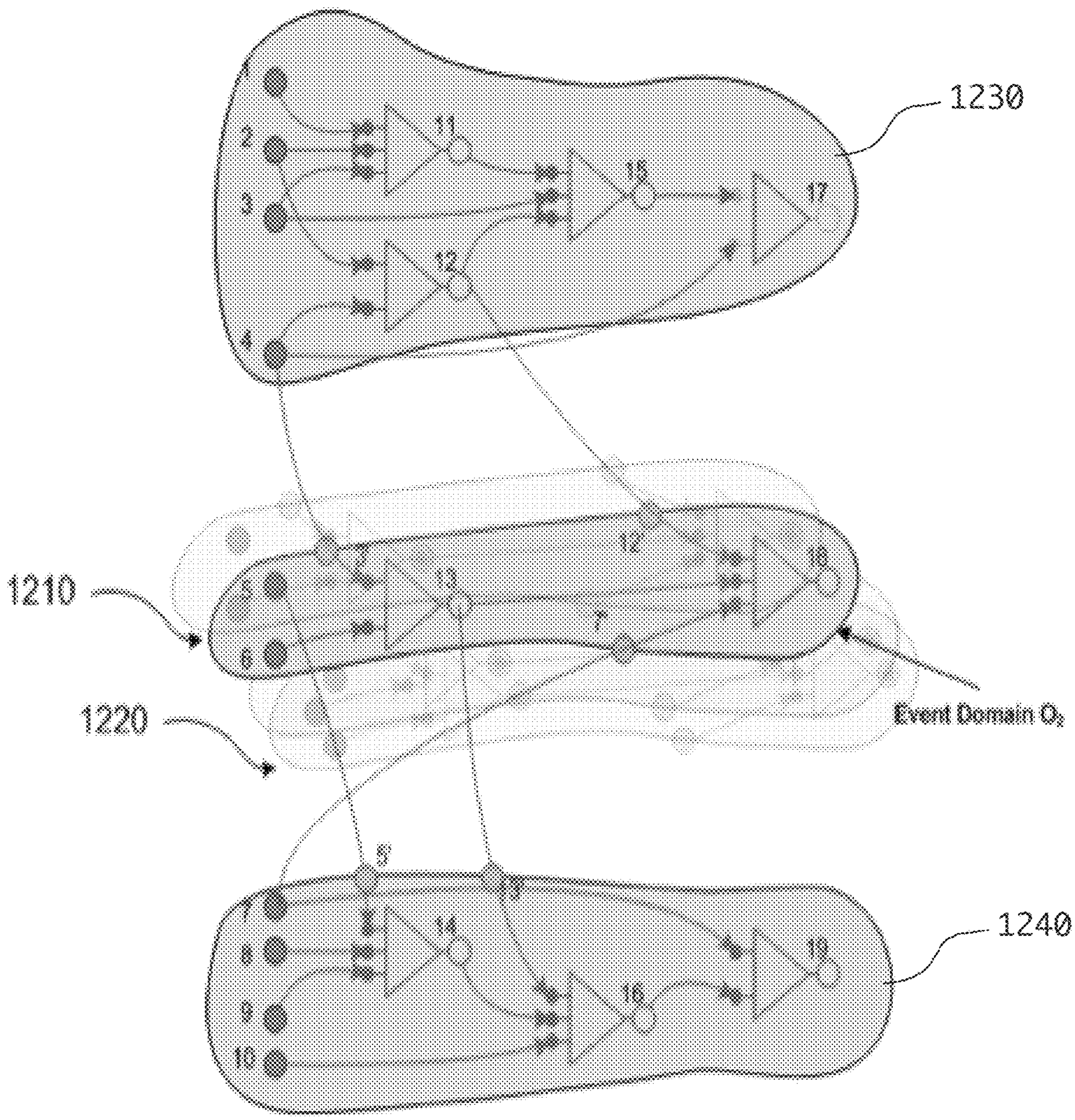

Furthermore, it is possible to construct collections of EDSs that have the same set of input and output variables. Multiple instances of EDSs can be stacked on top of each other, but with only one of those being connected to the rest of EDSs at a given time. FIG. 12 illustrates collections of EDSs, in which EDS 1210 is shown as being currently connected to related EDSs 1230 and 1240 for the given instance, with stacked EDS instances shown as EDS 1220. In some implementations, however, different EDS instances 1210 can be connected at the same time or partially connected.

Figure 13:
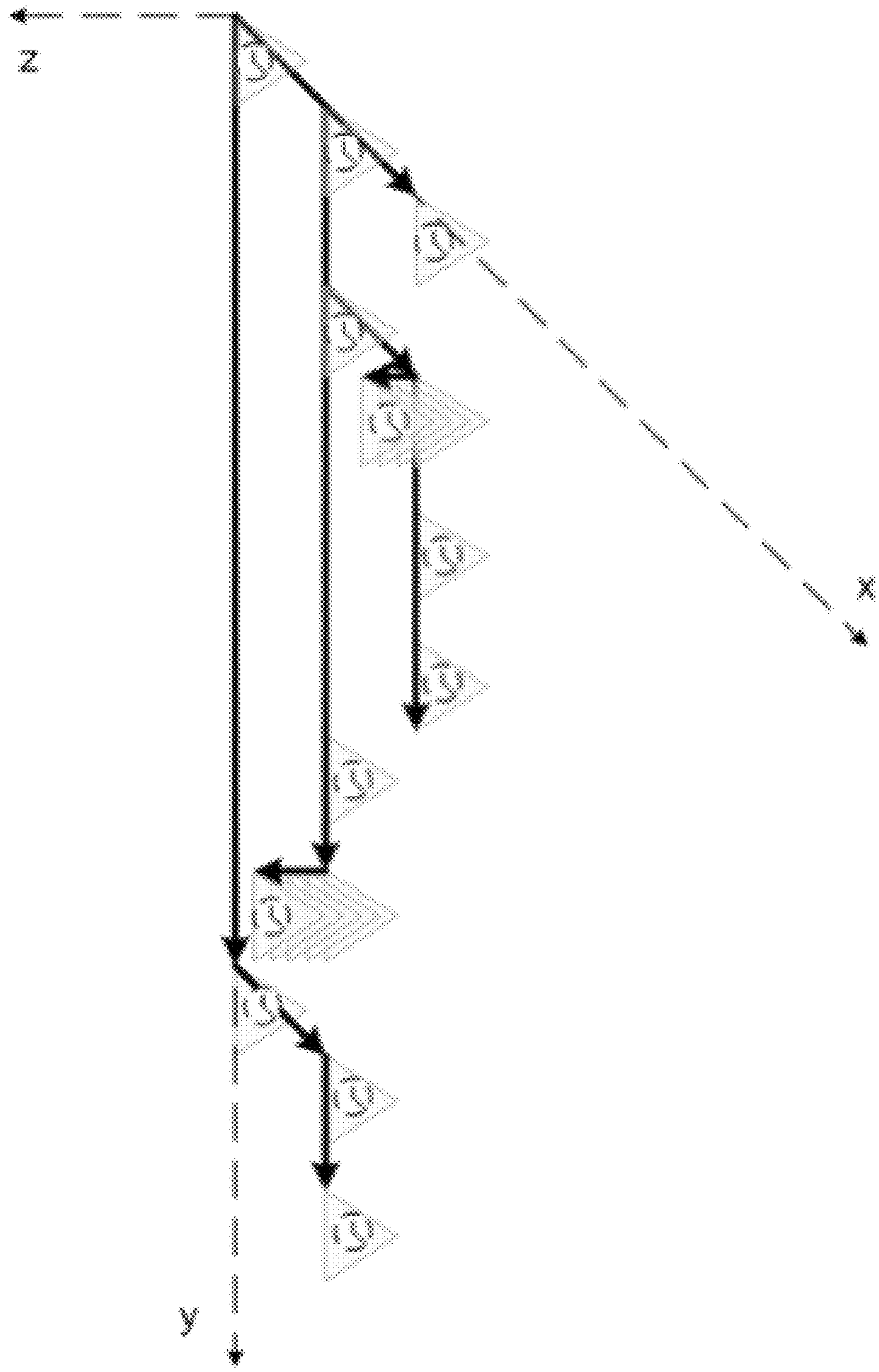

Based on the above, and with reference to FIG. 13, the EDSs space-time can be represented as a structure of EDSs in a three dimensional space where each EDS has its own time. The root EDS is located at the center of notional x-y-z axes, with $x_p$, $y_p$, $z_p$ coordinates being assigned for each parent EDS 1310 and in which the index i is given to represent a given Child EDS level and the index j is given to represent the number of instances of each given $i^{th}$ Child EDS. Accordingly, each Child $EDS^{i,j}$ has the following coordinates as related to its parent: $x_c=x_p+1$; $y_c=y_p+i$; and $z_c=z_p+j$.

Polymorphism can be observed in several ways. For instance, EDS-type variables can be assigned to different EDSs. Since an EDS variable can itself represent an EDS, this leads to a child EDS that may change from state to state. As such the EDSM defines a system structure that can change dynamically or can even be self-evolving in some implementations. Polymorphic collections whose members maintain the same input and output interface with the rest of the system are another form of polymorphism available within the present context.

Event Domain System Programing Model

An Event Domain System Programing Model (EDS PM) is defined herein that uses EDS as building blocks for an application. To represent an EDS in this model, $X^O$ is assigned to a subset of system variables X, and designated as output variables. The presentation of the Event Domain (ED) consists of two parts: the header and the body. The header starts with an ED system name followed by a list of input and output variables $X^H$,$X^O$. The body is enclosed in curly brackets and consists of a list of state $X^R$ and dependent variable $X^D$ definitions followed by a list of valuation functions $V^D$. $X^R$ $[0]=\{x0_r|r\in R\}$ is a list of expressions that valuate the initial values of the state variables in the state 0 of the system.

From this, an ED can be represented as follows:

```
EDName
X^H,X^O
{
  X^R, X^R[0]=X_0^R, X^D
  V^D
}
```

In the initial state t=0, the state variables of the system are valuated with initial values $x_{0r}$. This is indicated by the expressions $X^R$ $[0]=X_0^R$.

Let's suppose the system is in state t so the sate variables $X^R[t]$ are valuated. When an event occurs the input variables $X^H[t+1]$ are valuated so the depended and state variables of state t+1 can be valuated according to difference equations noted above using valuation functions $V^D$. The valuation functions will be valuated based on the order specified by the valuation sequence $S=\{k|k\in D\}$ with:

$$X^D[t+1]=V^D(X^H[t+1],e^R(X^R[t]))$$

Once all the system variables are valuated the output variables $X^O$ are also available. This cycle is repeated every time an event occurs and moves the system from one state to the next.

Every state of the system contains information in Input variables $X^H$ and State variables $X^R$. The dependent variables do not contain any new information as those are calculated values based on input and state variables while the output variables are copies of other system variables. Accordingly, the Input variables $X^H$ and State variables $X^R$ can be treated to define System Data within the context of a given ED. Those data are specific to a state t of the system and may change from state to state.

On the other hand, the Business Logic within an ED can be described using the Valuation functions $V^D$. Those functions map the input and state variables to output variables.

Finally, the Input variables $X^H$ represent the input interface of the system whereas the output variables $X^O$ represent the output interface, jointly define the System Interfaces of the ED.

Furthermore, an ED may contain Subsystems in a nested structure as shown in the example below. An ED that is hosted inside another ED is defined as a Child ED (CED) in respect to the hosting ED whereas the hosting ED is defined as the Parent ED (PED) in respect to its CED. An index can be assigned to each CED in the order they appear inside the PED, starting with the number 1; this index is referred to herein as the Child ED Index (CEDI). All the CEDs are positioned in a two-dimensional tree structure. The ED that is in the root of the tree is referred to as the Root ED (RED), which represents the entire EDS.

```
EDName
X^H,X^O
{
  X^R, X^R[0]=X_0^R, X^D
  V^D
  EDName1
  X^H,X^O
  {
    X^R, X^R[0]=X_0^R, X^D
    V^D
  }
  EDName2
  X^H,X^O
  {
    X^R, X^R[0]=X_0^R, X^D
    V^D
    EDName3
    X^H,X^O
    {
      X^R, X^R[0]=X_0^R, X^D
      V^D
    }
  }
}
```

The ED Path of an ED consists in the sequence of the names of the EDs that are needed to pass from the root in order to reach a specified ED. The names are separated by "." and the last name in the path is also terminated with ".". The ED Path to a specific ED can be constructed by starting with the ED name of interest and sequentially adding to its left, the names of all its Parent EDs until the RED is reached. For instance the ED Paths of the EDs in the above EDS are:

EDName.
EDName.EDName1.
EDName.EDName2.
EDName.EDName2.EDName3.

The tree of EDs forms a two dimensional structure. One dimension of a certain ED location in the structure is its order in the sequence of EDs, starting from the root ED, and the other dimension is the depth of the ED from the root, i.e. how many levels the ED is inside the root ED. For instance the coordinates of the ED "EDName.EDName2.EDName3." are respectively 4 and 3.

The CEDI Paths are constructed by replacing the branch name in the ED Path with the Child ED Index of the respective EDs, with the CEDI of the RED being 1. Accordingly, the CEDI Paths of the exemplary EDS provided above are:

1.
1.1.
1.2.
1.2.1.

An ED Instance is a copy of any of the EDs that are defined in an EDS. It has its own life cycle and independent variable values. To represent ED instances in the ED system, a system variable of the type ED is defined. The instances of the EDs are placed on "top" of the ED variable. By doing so, the structure of EDs becomes three dimensional, with the third dimension being raised by the stack of ED instances placed in the ED variables. To indicate the vertical dimension in the ED Path, the ED name is followed by the arrow symbol "→".

HiLDDE Platform

As noted above, and schematically illustrated in FIGS. 4 and 7, the HiLDDE Platform (or other comparable EDSM platforms implemented on the above-defined constructs) is implemented on the basis of a HiLDDE Language and consists of a HiLDDE Language Compiler, 3 HiLDDE Runtime Servers (Presentation Server, Application Server and Database Server) and 3 HiLDDE Clients (Desktop Client, Web Client and Mobile Client). The HiLDDE compiler generates the EDS structure data as well as the executable code in a proprietary intermediate language. Both the structure data and the intermediate code are stored in the HiLDDE database. The presentation server provides a variety of interfaces to HiLDDE clients. For example, the currently supported interfaces are SOAP and REST web services and COM+. Other interfaces may include, but are not limited to an MQ interface, for example, as well as other currently available and/or future interfaces as appropriate or desirable.

In an illustrative process, the HiLDDE clients send a request to the HiLDDE presentation server via one of its supported interfaces. The presentation server then redirects the request to the application server who loads the referred systems from the database and processes the request. If the request involves data, the application server sends the request to the database server to process the data transaction.

In this context, the HiLDDE clients are interpreters of EDS presentation aspects. They render the user interface screens based on the content defined in the EDS program and provided by the presentation server. All three types of clients are thus capable of interpreting the same presentation content provided by the application server, and the HiLDDE program can remain agnostic to the selected HiLDDE Client, i.e. the HiLDDE program does not include any code specific to a certain type of HiLDDE Client. That being said, the presentation aspect of the HiLDDE code is unique for all three types of clients, so the clients do not need to be changed; they are valid for all applications written in HiLDDE. In a current implementation, the application and database servers are written in C++, whereas the presentation server is written in C# and MS ASP.NET. The Web and Desktop Clients are also written also in C# and MS .NET, whereas the mobile clients are written in platform-specific languages such as Android and iOS.

HiLDDE Language

The following provides a description of an exemplary implementation of an EDSM-based language and structure. Naturally, the base concept in HiLDDE is the concept of the Event Domain System (EDS). An EDS is described as a black box with inputs and outputs and internal business logic that produces the EDS output based on the input and state. In HiLDDE terminology, the definition of an EDS is called a Section. The Section is defined by the header and the body. The header consists in a series of variable declarations or references to other system outputs, which describes the EDS input and output. The body describes the business logic of the EDS using HiLDDE functional language. HiLDDE functions and operators operate on scalars and systems as well as collections thereof. A HiLDDE program is an EDS structure with systems and subsystems which is defined in a similar way as a document with sections and subsections. The root EDS is defined in the main Section of the document and the subsystem EDSs in the sub Sections of the document.

Application Presentation.

The input and output of each EDS represents the application interface. This interface might be exposed as Web Services, Com+ or MQs and represented as a Graphical User Interface accessible as a Web, desktop or mobile application. The HiLDDE presentation server interprets the input and output of the EDS structure and exposes it as Web services, Com+ or MQ interface. The HiLDDE clients, which communicate to the server using one of the available channels, renders the input and output interface and represents it to the user as a Web, desktop or mobile application. It is to be noted that in the HiLDDE program there is no specific code related to any of the supported interfaces of the presentation server. It is the presentation server's duty to represent any HiLDDE application using the three interfaces mentioned above. The HiLDDE clients support UI rendering in primitive mapping mode or Forms mode. In primitive mapping mode no specific code for the user interface needs to be written in HiLDDE. In Forms mode, the screens, its composition and behaviour is modeled as an EDS system and referred to in the system's input or output by a system variable.

The HiLDDE presentation server and Client are not affected by the HiLDDE application code. That means the same HiLDDE application server and Client can be used for all HiLDDE applications.

Further, interpreting the system's input as a user interface does not impose any limitations to what can be represented in the GUI, or any limitations in the screen functionality. This is because the input variables are not only of a scalar type, but can also be of an EDS system type, which can be as complex as it needs to be to present complex behaviours and flows in the user screen. System variables in EDS input or output behave in similar ways as forms in traditional user interface programming. Any behaviour that obeys to causality principle can be described.

Application Data

By definition, EDS information is encapsulated in systems input and state variables. The intermittent variables used in the business logic or the systems output do not carry information as the values of these variables can be calculated from input and state variables using the described functions or operators. As such, the database server treats the input and the state variables of every EDS as data. An EDS may be defined as pure data, pure business logic or a mixture of the two. Since the system structure consists of a tree of subsystems starting with the root system, the structure of data also resembles a tree of data sets, similar to an XML file structure. If we define an EDS system with Sections and subsections using only scalar variables, this results in a two dimensional tree of data sets, where each data set is the input and the state of its Section (EDS). Since every system has a state and evolves in time, such data structure can be compared to a city of one-story buildings (flats). Each flat is a system of data members (input and state) that can change from day to day (state to state). Each flat has a unique address referred to as the CEDI Path (Child Event Domain Index Path defined above) that describes the node path to reach the subsystem from the root node and a specified state in time.

However, the HiLDDE language allows definition of system variables, which are instances of defined systems (Sections). The system variables can be used as a system's input or output, state or intermittent variables. Multiple instances of a system can be created and stored in specific locations in the system tree. These locations are specifically the locations where system variables are declared. The declaration of a system variable creates a one storey building (a flat) in the location where the system variable is declared. Additional instances of the system can be stored in this location, which give rise of "apartment buildings" in that location. "Apartments" in HiLDDE are multi-storey buildings where each floor represents a system instance.

HiLDDE features polymorphism, which from the data perspective means that system instances of different types can be stored on the same location. This situation looks like an apartment building where floor configurations can be different from floor to floor. So, in general the data structures in HiLDDE are three-dimensional structures in space and time which look like a city, with multi-story buildings where each apartment has its own unique address and state in time. Each apartment represents an EDS. The system's three-dimensional addresses are described by the CEDI Path (apartment location) and by the instance number in the stack (or the floor number). The EDS time represents the state of the system.

The data members of the EDS change when the system state changes. The HiLDDE language doesn't provide instructions for storing or retrieving individual data members of the EDS in the database; instead the database server determines the database operation on these data members based on the system's Mode. There are 4 Modes of an EDS. In Mode Create the new state of the EDS in memory is stored in the database. In Mode Modify the new state of the EDS in the memory modifies the existing state in the database. In mode Play the input and state of the EDS are read from the database while intermittent and output members are calculated via the EDS business logic. HiLDDE provides the options to also store the Output members in the database, in order to avoid recalculation. In this case the Mode Read can be used to read all data members, including input, state, and output without the need to execute the business logic for calculating the output.

The HiLDDE language provides instructions for storing, querying and retrieving entire systems or system structures. Those operations store, query or retrieve systems to and from the space-time data city structure described above. Those do not operate directly on the database system used by implementation of the HiLDDE database server. It is the database server that interprets HiLDDE database operations in the language used by the database technology that implements it.

There are several models defined for implementing the data city model of HiLDDE and its operations into a database system. First, three categories of data are identified as: 1) system structure data, 2) application code and 3) user data. The first database model that can be used is the relational model. As noted above, the EDS represents structured data, similar to XML, while the implementing data model is a relational table. In this case a significant amount of data shredding and reassembling is required, especially when it comes to the user data category. The HiLDDE query language is structured by nature so the HiLDDE queries, which deal with user data, need to be converted to relational queries. As such, the relational model has a performance penalty especially when it comes to processing user data, which is reflected to the performance of HiLDDE queries.

The second model is a hybrid model, where system structure and application code data are stored in relational tables and the user data in XML form. This requires the implementing database to have solid support for XML and relational data. In this case the HiLDDE queries are easily translated to XQuery due to their structured nature. The queries used by the database server are both relational and XQuery and the database systems that support hybrid queries (relational+XQuery) work best for this model.

A third model is a pure XML data model. In this case all three data categories are represented as XML data on the implementing database and all types of queries used by the database server are XQuery.

Note that regardless of the database system used to implement the HiLDDE database server, the HiLDDE query language remains the same.

Application Logic

In the HiLDDE language, the application logic is found inside the body of the EDS. HiLDDE is a functional language. The statements of the language are assignment statements where on the left side of the assignment operator (=) is a variable and on the right side expressions using operators or functions. The operands of expressions are scalar or system variables as well as their collections. As defined above in the EDSM, the goal of the application logic is to evaluate the output variables based on input and state variables. This process in HiLDDE is called Valuation and results in obtaining a new state of the system based on the system input and the previous state. In order to perform such valuation, the business logic should provide the assignment statements that would evaluate all output variables.

To facilitate these expressions, state and intermittent variables can be declared inside the body of the EDS. Such variables can be used only within the scope of the EDS that declares them to code the valuation expressions. In contrast to an imperative language, a variable can be valuated only once within the body of the EDS. Input variables and previous state variables cannot appear on the left side of the assignment operator as those variables are considered already valuated. All output variables must be valuated.

The sequence of execution of valuation statements by a HiLDDE application server is not determined by the order they appear in the HiLDDE application code. Instead, a valuation expression will be valuated if all variables on the right side of the assignment operator are valuated. To reduce ambiguity on the sequencing of valuation expressions, the sequencing operator "I" can be used at the end of an expression followed by one or more comma separated variables. The HiLDDE compiler determines the valuation sequence and executes the assignment operations in order. The HiLDDE compiler produces a HiLDDE proprietary intermittent code. The instructions of this code are called Elements and are atomic functions that are recognised by the HiLDDE application server. The HiLDDE executable code is a series of atomic valuation functions that is also functional in nature. This code is executed based on the valuation sequence that is produced by the compiler. Both the executable code and the valuation sequence are produced by the HiLDDE compiler and loaded to the HiLDDE database. The HiLDDE runtime server loads the application code from the database for the EDS that is being valuated. Partial compile, i.e. the compile of a single EDS is supported.

From multiple EDS instances that might be present in a node of the CEDI Path tree in the HiLDDE database, only one of them is loaded in the memory. When another EDS instance found on the same CEDI Path node is to be processed, the existing instance that is in the memory is unloaded and the new one is loaded at the same CEDI Path node. The EDS instances that are not saved to the database exist only in the memory and are purged from memory when the EDS instance goes out of scope. So the memory management in HiLDDE is done by the application server on EDS instance bases and is not left to the programmer.

The recursion in HiLDDE is implemented using the recursive valuation of the same EDS. Structured programming is implemented using sub-EDSs as program blocks.

Again, HiLDDE features polymorphism which consists in the ability to assign EDS of different types to the same variable as well as build apartments of different types of EDS. In HiLDDE, a Section, which is the definition of an EDS, is similar to the concept of the Class in Object-Oriented programming. The difference is that the Section is also a live instance of the defined system.

The HiLDDE language also supports derivation, which consists in defining new Sections (system definitions) based on existing ones. This is done using Section expressions. A new Section can be declared as a Section function of pre-existing Sections and the newly defined Section. The new Section obtained in this fashion does not encapsulate the parent Sections. Instead it becomes an independent Section that inherits the features of the parents, where some of them might be modified based on macroscopic rules. This is a powerful feature as it allows practically infinite numbers of derivations. In addition, complete new applications can be presented as new Sections derived from existing ones including all aspects of the applications, such as database, logic and presentation. All aspects of the application that belong to any of those layers can be modified in the derived application.

The application source code of the parent applications used in a Section function is not needed to derive a new Section. Instead the system definition stored in the HiLDDE database is used.

HiLDDE also supports system instance functions. This is done through functions that use system variables. System functions are powerful for manipulating live (run time) instances of EDS, which may be used to dynamically change an application during runtime (including presentation, data and logic aspects). These are also used to process collections of data (functions such as joints and intersections) which are useful for bulk data manipulation, reporting, etc.

Tokens

In this illustrative example, the following types of Tokens are defined and are case sensitive:

Section identifier
Variable identifier
Keyword
Literal
Operator
Separator

Identifiers (ID)

In this illustrative example, Names or Identifiers (IDs) are defined as below and are part of Section identifiers and Variable identifiers. The IDs start with a later or underscore (O character and continue with letters or numbers.

| | |
|---|---|
| {IdHead} | = {Letter} + [_] |
| {IdTail} | = {IdHead} + {Digit} |
| ID | = {IdHead}{IdTail}* |

Keywords

In this illustrative example, the following Keywords are defined as follows:

| | | | |
|---|---|---|---|
| Access | Function | longint | smallint |
| After | ID | output | string |
| Bin | init | previous | system |
| Boolean | inout | Repeat | time |
| Byte | input | Section | uses |
| Date | integer | self | xml |
| Decimal | key | smalldec | |

Operators

In this illustrative example, the following Operators are defined as follows:

<table>
<tr><td>−</td><td>+</td><td>=</td><td>and</td><td>under</td></tr>
<tr><td>*</td><td><</td><td>==</td><td>bor</td><td></td></tr>
<tr><td>/</td><td><<</td><td>></td><td>not</td><td></td></tr>
<tr><td>/\</td><td><=</td><td>>=</td><td>or</td><td></td></tr>
<tr><td>|</td><td><></td><td>>></td><td>over</td><td></td></tr>
</table>

Separators

In this illustrative example, the following Separators are defined as follows:

| | | | |
|---|---|---|---|
| ( | : | [ | } |
| ) | ; | ] | -> |
| . | @ | { | |

White Space

In this illustrative example, White Space can be introduced as follows:

space tab form feed

In this illustrative example, Comments can be introduced and enclosed within Comment Start "/*" and Comment End "*/" notations. In addition, a given line can be commented on using the Line Comment notation "//" till the end of the line.

Comment Start='/*'

Comment End='*/'

Comment Line='//'

Literals

In this illustrative example, the Literals are defined as follows:

<table>
<tr><td>DecLiteral</td><td>= {digit}+</td></tr>
<tr><td>OctLiteral</td><td>= 8x{OctDigit}*</td></tr>
<tr><td>HexLiteral</td><td>= Ox{HexDigit}+</td></tr>
<tr><td>FloatLiteral</td><td>= {Digit}*'.'{Digit}+</td></tr>
<tr><td>StringLiteral</td><td>= ' " '( {StringCh} | '\'{Printable} )* ' " '</td></tr>
<tr><td>CharLiteral</td><td>= ' ' ( {CharCh} | '\'{Printable} )' '</td></tr>
<tr><td>BoolLiteral</td><td>= [Tt] [Rr] [Uu] [Ee] | [Ff] [Aa] [Ll] [Ss] [Ee]</td></tr>
<tr><td>DateLiteral</td><td>= '#'{StringCh}'#'</td></tr>
</table>

Types

In this illustrative example, an input/output section provides a list of variable declarations. Those are the input and output variables of the system. The following is a table of currently available variable types, and how they compare to variable types in C++ and ATL languages.

| HiLDDE | Equivalent type | | |
|---|---|---|---|
| language type | C++ type | MS ATL type | HiLDDE |
| string | wstring | | |
| decimal | double | | |
| integer | long | | |
| boolean | bool | | |
| date | | COleDateTime | |
| system | | | EDS |
| longint | long long | | |
| smalldec | single | | |
| smallint | Int16 | | |
| xml | string | | |
| bin | string | | |

HiLDDE Program Structure

As noted above, the HiLDDE programming language is a programming language that uses the system-oriented programming paradigm defined above. Namely, the building blocks of programs written using the HiLDDE language are Event Domains (EDs) rooted in the base concept of an Event Domain System (EDS). As introduced above, the EDS structure in the HiLDDE language is defined in a similar way as a document with sections and subsections. For instance, in the exemplary HiLDDE terminology provided herein, the definition of and EDS is called Section. The root EDS is defined in the main Section of the document, and the subsystem EDSs are defined in the sub-Sections of the document.

The following provides an illustrative example of a program structure defined within the context of the EDSM constructs described and defined above, and further with reference to the MyAlbum example outlined below. While the following outlines in explicit detail one implementation of a program structure consistent various inventive aspects of the systems and processes described herein, the person of ordinary skill in the art will appreciate that alternative approaches and examples may be considered without departing from the general scope and nature of the present disclosure.

The main section declaration has the following structure.

```
Section Section_ID [=Section expression]
[Access_control_list]
[References_list]
{
  [Body]
}
```

Section_ID

The Section ID is composed by a series of Identifiers separated by "." An Identifier starts with a letter or "_" and continues with a letter "_" or number. For instance:

```
Section MyAlbum.
{
  Section MyAlbum.Album.
  {
  }
  Section .Albums.
  {
    Section .Add.
    {
    }
    Section ._Edit.
    {
    }
    Section ._Delete.
    {
    }
  }
}
```

A "." in front of the Section ID is equivalent to the Section ID of the Parent Section.

| | | |
|---|---|---|
| <SectionID> | = | <SectionID>ID '.' |
| | \| | <SectionID>ID '->' |
| | \| | <SectionID>ID '->' <WhereClause> |
| | \| | ID '.' |
| | \| | ID '->' |
| | \| | <Back> |
| <Back> | = | '.' |
| | \| | <Back>'.' |

Section_Expression

A Section expression is an optional expression that is used to derive the Section form previously defined Sections. The Section Expression uses Section Functions and Section Operators and its operands are Sections.

Some of the Section Functions include, but are not limited to:

- Section(Section_ID), which returns the Section with Section ID; and
- self, which returns the Section that is coded under the Section ID where self is used.

Some of the Section Operators include, but are not limited to:

- over, which overlays the left Section over the right Section;
- under, which overlays the left Section under the right Section; and
- less, which subtracts the right Section from the left Section.

Further details on Section Functions will be provided below in describing system Derivation.

Access Control List

The Access Control List defines the user access rights in the section.

Access ID

REFERENCES LIST

The References List defines a comma-separated list of external system Names that are referenced in this EDS.

| | |
|---|---|
| <Uses> | = <UsesHead> <UsesList> ';' |
| <UsesHead> | = 'uses' |
| <UsesList> | = <UsesList>','<SystemID> |
| | \|<SystemID> |
| <SystemID> | = ID'.' |
| <BaseSection> | = <Equal> '(' <Expr> ')' |

For instance:

uses Locations.,System.,Security.;

Body

The Body of the section may be empty or contain declarations of variables, user functions or other subsections as well as statements as defined further below.

| | | |
|---|---|---|
| <BodyItem> | = | <Dec> <BodyItem> |
| | \| | <Stm> <BodyItem> |
| | \| | |

<Dec> consists in a series of Sub Section, Variable or User Function declarations.

| | | |
|---|---|---|
| <Dec> | = | <SubSecDec> |
| | \| | <VarDecSec> |
| | \| | <FuncDec> |

<SubSecDec> A Sub Section declaration has the following parts:

```
Section Section_ID [=Section_expression]
[Access_control_list]
[Interface_declaration]
{
  [Body]
}
```

Interface_Declaration

In this example, this part can be used to declare the input and output variables of the EDS.

| | |
|---|---|
| <IntItem> | <InIntDir> <InIntItemList> ';' |
| | \| <OutIntDir> <OutIntItemList> ';' |
| | \| <InOutIntDir> <InOutIntItemList> ';' |
| <InIntDir> | input |
| <OutIntDir> | output |
| <InOutIntDir> | inout |

<InIntItemList> provides the input interface declaration

| | |
|---|---|
| <InIntItemList> | <InIntItemList>','<InIntItem> |
| | \| <InIntItem> |
| <InIntItem> | <Var> <LocVar> <InitVal> |
| | \| <Type> <VarDec> <InitVal> |
| | \| <SectionID> <LocVar> <InitVal> |
| <InitVal> | '=' <Literal> |
| | \| '=' <SectionID> |

An input variable can be of any type, including system, and can be declared as an independent variable or as a reference to another variable in another system. When the input variable is a reference it represents the value of the referred variable. The input variables are considered valuated and cannot be valuated for a second time in the ED body. As such they cannot appear on the left side of the assignment operators. The input variables can be initialized with the value from another variable or a constant, or left uninitialized, in which case the default initialization takes place. The possible values an input variable can take can also be restricted to the set of values that exists in a reference apartment. If a filter is applied in the input variable declaration only the filtered values are allowed. For the full list of input variables declaration scenarios see the "Presentation Server" section further below.

Listed in the following Table 1, below, is a set of input interface declaration examples, in accordance with one embodiment.

| Declaration | Meaning |
|---|---|
| input ULPolicy.Withdrawal-> ["*"]CRPWA CRPWA; | CRPWA is a by value input variable that can take any of the values found in the current apartment ULPolicy. Withdrawal-> Only the apartments that satisfy the filtering condition can be referred. |
| input ULPolicy.Withdrawal. CRPWA-> CRPWA; | CRPWA input variable is a reference to the CRPWA ED in the current apartment ULPolicy.Withdrawal.CRPWA-> |
| input ULPolicy.Withdrawal-> CRPWA-> CRPWA; | CRPWA input variable is a reference to the CRPWA ED in the current apartment ULPolicy.Withdrawal->CRPWA-> |

-continued

| Declaration | Meaning |
|---|---|
| input integer Age; | Age is an uninitialized integer by value input variable |
| input integer Age = 30; | Age is an integer by value input variable with initial value 30 |
| input integer Age = Clients.Client->Age; | Age is an integer by value input variable initialized with the current value of the member Age of the apartment Clients.Client-> |
| input system Currency(Locations.Currency.); | Currency is a system by value input variable of type Locations.Currency. |
| input system Currency(Locations.Currency.) = Locations.Currencies.Currency->; | Currency is a system by value input variable of type Locations.Currency initialized with the current value of the apartment Locations.Currencies. Currency-> |
| input Locations.Currencies.Currency-> ["@Code=\"CAD\" and @Time=0"] Currency; | Currency is a system variable reference to the current ED in the apartment Locations.Currencies.Currency-> Only the apartments that satisfy the filtering condition can be referred. |
| input Locations. Currencies.Currency->["*"]Code CurrencyCode; | CurrencyCode is a by value scalar input variable reference to the Code member of the current ED in the apartment Locations.Currencies.Currency-> Only the apartments that satisfy the filtering condition can be referred. |

<OutIntItemList> Provides the Output Interface Declaration

| | |
|---|---|
| <OutIntItemList> | <OutIntItemList>','<OutIntItem> |
| | \| <OutIntItem> |
| <OutIntItem> | <Var> <LocVar> |
| | \| <Var> |

The output variables declaration consists in a list of local or full variable names. These variables must be declared and valuated inside the body of the ED.

Listed in the following Table 2, below, is a set of output interface declaration examples, in accordance with one embodiment.

| Declaration | Meaning |
|---|---|
| output CRPWA;<br>{<br>string CRPWA;<br>} | CRPWA output variable is a reference to the CRPWA variable declared inside the EDs. |
| output .Withdrawal.CRPWA;<br>{<br>Section .Withdrawal.<br>Output CRPWA;<br>{<br>string CRPWA;<br>}<br>} | CRPWA output variable is a reference to the CRPWA variable declared inside the sub section.Withdrawal. |

<InOutIntItemList> provides an Input/Output Interface Declaration

| | |
|---|---|
| <InOutIntItemList> | <InOutIntItemList>','<InOutIntItem> |
| | \| <InOutIntItem> |
| <InOutIntItem> | <Var> <LocVar> <InitVal> |
| | \| <Type> <VarDec> |
| | \| <SectionID> <LocVar> <InitVal> |

The input/output variables are output variables that refer to an input variable. These variables have all the properties of input variables. In addition, they appear in the system output. This is equivalent to declaring an input variable and an output variable with the same name.

The Body of the section may contain declarations and statements.

```
<Block>         = '{' <BlockItem> '{'
<BlockItem>     = <Stm> <BlockItem>
                | <Dec> <BlockItem>
                |
```

<Dec>—Declarations include variable declarations, user function declarations and sub Section declarations.

```
<Dec>     = <VarDecSec>
          | <FuncDec>
          | <SecDec>
```

<VarDecSec>—Each variable declaration consist in a type name followed by a comma-separated list of variable names. The variables can be initialized with constant literal values during declaration.

```
<VarDecSec>     = <Scope> <Type> <VarDecList> ';'
                |         <Type> <VarDecList> ';'
```

The variables inside the Section's Body can be intermittent or state variables. The state variables come in pairs of two variables, current state variable and previous state variable. The state variables are declared by a type name followed by current state variable name followed by previous keyword followed by the previous state variable name. Both current state variable and previous state variable can be initialized with constant values.

```
<Scope>         ID
<VarDecList>      <VarDecList>','<VarDec>
                |  <VarDec>
<VarDec>          ID <InitVal>
                | ID <ArrDim>
                | ID <InitVal>   <Previous>
                | ID <InitVal>   <Previous> <Init>
                | ID '(' <SectionID> ')' <InitVal>
                | ID '('   ' )' <InitVal>
                | ID '(' <SectionID> ')' <Previous>
                | ID '(' <SectionID> ')' <Previous> <Init>
                | ID '('   ')' <Previous>
                | ID '('   ')' <Previous> <Init>
```

An initialized variable is considered a Constant variable and it can't be valuated.

Table 3: Below is a Table listing examples of variable declarations.

| Declaration | Meaning |
|---|---|
| string FirstName, LastName, Type = "Client"; | FirstName and LastName are declared as two string intermittent variables. Type is declared as a constant string intermittent variable. |
| system Country(. . . Country.) = . . .Countries.Country->, Currency(. . . Currency.); | Country is declared as a constant system intermittent variable. Currency is declared as a system intermittent variable. |

-continued

| Declaration | Meaning |
|---|---|
| integer No previous No_p init 0; | No is declared as an integer state variable with No_p his previous state variable and initial value 0; |
| system Account(. . . Account.) previous Account _p; | Account is declared as a system state variable with Account_p his previous state variable. |

<FuncDec> provides user function declarations. In this example, user functions declaration begin with return type name followed by the keyword "Function" followed by the function's name followed by parameters list in brackets followed by the function body. The function's Body has the same definition as a Section Body.

```
<FuncDec>     = <Type> Function <ID> '(' <ParList> ')'
<Block>
<ParList>     = <Type> <LocVar> ',' <ParList>
              |  <Type> <LocVar>
              |
```

Example

```
decimal Function COI(integer age)
{
  system AgeParm(ULPolicy.AgeParm.);
  AgeParm=GetED(ULPolicy.AgeParms.AgeParm→
    ["@Age="+ToString(age)+" and @Time=0",1]);
  COI=AgeParm→coi;
}
```

User functions can be used in the same way as HiLDDE standard functions, for example:

COI=COI(Age);

<SecDec> allows one or more sub Sections to be declared inside a Section's Body.

<Stm> Statements

```
<Stm>         = <AssignStm> ';'
              |  <InitStm>       ';'
<AssignStm>   = <LocVar>          <Equal> <Expr>
              |  <LocVar>          <Equal> <Expr> <OpAfter>
<InitStm>     = <LocVar>         <InitOpr> <ID> <Equal> <Expr>
              |  <SectionID>     <InitOpr> <ID> <Equal> <Expr>
<OpAfter>     = 'After'   <LocVar>
              | '|'       <LocVar>
<Equal>       = '='
<InitOpr>     = ':'
```

<InitStm>—Initialization statements can be used, in some examples, to appear in the initialization part of the variable declarations.

<AssignStm> Assignment statements consist in a variable name on the left of the assignment operator (=) and an expression on the right. The assignment statements are valuated if all variables on the right side of assignment operator are valuated. To resolve the ambiguities in the valuation order the "after" operator "|" is used at the end of the expression, followed by a variable name.

Example

```
Section .LoadLocationsFromFile.
input
   string FileName="Locations.txt",
   string RecordType = " Locations";
output
   RetMessage;
access public;
{
   integer File,ret,ret1;
   string RetMessage;
   File=FileOpen("Direction=I" , FileName);
   ret =Iff(File > 0, Valuate(.ReadData.,File=File,NoRecords=0), -1);
   RetMessage=Iff(File <=0, "Failed to open the file " + FileName,
      Iff(ret<>0,"An error occured while reading data from file",
            ToString(.ReadData.NoRecords) + RecordType +" records
               were loaded.")
            );
   ret1= Iff(File > 0, FileClose(File), -1) | RetMessage;
   Section .ReadData.
   input integer File;
   output NoRecords;
   {
   }
}
```

In the above example, the File assignment statement depends on a constant ("Direction=I") and the input variable FileName. Since both of them are valuated, this expression can be valuated, which will valuate the File variable. The ret assignment statement depends on File variable and can be valuated second. The RetMessage depends on File, ret and input variables FileName and RecordType and can be valuated third. The ret1 assignment statement depends on File and RetMessage and can be valuated fourth.

<Expr> Expressions appear on the right side of the assignment statement. In the grammar sample below, only part of the operations precedence is shown. The operator precedence starts with the "or" operation and ends with unary operations. HiLDDE built-in functions and User-Defined functions are also unary operations.

| | |
|---|---|
| <Expr> | <TypeSpec> <OpOr> |
| | \| <OpOr> |
| <TypeSpec> | '(' <Type> ')' |
| <OpOr> | <OpOr> 'or' <OpAnd> |
| | \| <OpAnd> |
| <OpAnd> | <OpAnd> 'and' <OpPinOR> |
| | \| <OpPinOR> |
| \|<OpUnary> | <OpNeg> |
| | \| <Literal> |
| | \| <StdFunct> |
| | \| <Function> |
| | \| '(' <Expr> ')' |
| | \| <LocVar> |
| | \| <Pointer> |
| | \| <OpNot> |
| | \| <OpSelf> |

Variables

In the present example, five variable categories are defined, each of which can be of any of the Types defined above.

Input Variables

Input variables are defined in the EDS Interface and are considered valuated. When a system is valuated the input variables are passed to the EDS by the calling party, which might be another EDS, User Interface, or System Interface (like Web Service etc.). Passing of the argument to the input variable can be done by value or by reference. This is determined based on the rule below:

Pass by reference—The input variable is declared as an address to a Section or apartment.

Pass by value—All other declaration cases.

Access Scope—The input variables can be accessed using the variable name within the Section where they are declared or the full name from any of the child Sections. In addition the input variables can be accessed in the Valuation calls for the purpose of passing their value or reference.

Access rights—During the Valuation call: Read, Write; in all other cases: Read.

Access modifiers—The access scope and rights can be restricted further by the use of access control list on the specified variable or Section.

An example of full declaration syntax is provided above in the Input Interface Declaration section within the context of the HiLDDE Program Structure.

Output Variables

The output variables are declared in the output interface part of the Section as a variable name or variable path that refers to an input, output or internal variable within the current Section or any of its Child Sections. The Output variables can be of any type. The output variables are references to the variables they point to.

Access Scope—The output variables can be accessed using the local or full variable name from anywhere in the current application or from other applications.

Access rights—Within the Section body where the referred variable is declared: Read, Write; In all other cases: Read.

Access modifiers—The Read access scope and rights from outside of the home Section can be restricted further by the use of access control list on the specified variable or Section.

An example of full declaration syntax is provided above in the Output Interface Declaration section within the context of the HiLDDE Program Structure. Intermittent variables Intermittent variables are declared within the Body of a Section. They must be valuated by one and only one assignment statement.

Access Scope—The intermittent variables can be accessed within the Section they are declared. In addition they can be accessed for read from any Sub Section of the Section that has declared them. The intermittent variables can be referred to by an output variable on the same Section.

Access rights—Within the Section body where the intermittent variable is declared: Read, Write. In all Sub Sections of the Section where the variable is declared: Read.

Access modifiers—N/A.

An example of full declaration syntax is provided above in the Variable Declarations section within the context of the HiLDDE Program Structure. Intermittent interface declaration examples are also provided in Table 3, above.

State Variables

State variables are declared within the Body of a Section. The come in pairs of two variables, the current state variable and the previous state variable. Each of them may have any name. The previous state variable is declared using the previous keyword. The state variable may be initialized to an initial value, otherwise it's initialized with the default initial value based on the type. When an ED is valuated, the value of the state variable is passed automatically to the previous state variable before the valuation of coded expressions starts. Then an assignment statement that must exist in the ED Body would valuate the current state variable. This cycle is repeated every time the system is valuated.

The state variable can also be initialized when the Valuate function is called. Passing an initial value to a system variable is done in the same way as for input variables.

Below is an example of the initialization of a state variable during a valuation call:

```
ret=Valuate (.ReadData., NoRecords=0);
Section .ReadData.
{
  integer NoRecords previous NoRecords_p;
  NoRecords=NoRecords_p+1;
}
```

Access Scope—The state variables can be accessed for read and write within the Section they are declared. In addition they can be accessed for read from any other system in the same application or from any other applications. The state variables can be initialized during the Valuation call. The previous state variable can be accessed for read within the Section where it's declared as well as from any of its Sub Sections.

Access rights—State Variable. Within the Section body where the intermittent variable is declared: Read, Write; In all Sub Sections of the Section where the variable is declared: Read; In Valuation call: Write.

Access rights—Previous State variable: Within the Section body where the intermittent variable is declared: Read; In all Sub Sections of the Section where the variable is declared: Read.

Access modifiers—The access scope and rights can be restricted further by the use of access control list on the specified variable or Section.

An example of full declaration syntax is provided above in the Variable Declarations section within the context of the HiLDDE Program Structure. Intermittent interface declaration examples are also provided in Table 3, above.

Constant Variables

Constant variables are Intermittent variables that are initialized during the declaration. The Constant variables cannot be valuated; otherwise, they can be used in the same way as Intermittent variables.

Access Scope—The Constant variables can be accessed for Read within the Section they are declared. In addition they can be accessed for read from any Sub Section of the Section that has declared them. The intermittent variables can be referred to by an output variable on the same Section.

Access rights—Within the Section body where the intermittent variable is declared: Read; In all Sub Sections of the Section where the variable is declared: Read.

Access modifiers—N/A.

An example of full declaration syntax is provided above in the Variable Declarations section within the context of the HiLDDE Program Structure. Intermittent interface declaration examples are also provided in Table 3, above.

Standard Conversions

Standard conversion from one type to another take place whenever a conversion without the risk of losing the value is possible.

User-Defined Conversions

In some implementations, type conversions can be specified by the programmer by using the type conversion predicate (<Type>):

```
string Prefix;
Prefix=(string)FileRead(File,",");
```

Sections vs. EDs

As introduced above, each Section generally defines an Event Domain (ED). At the same time, a Section also represents a live ED instance. As such, the ED represented by the Section can be valuated. In the City structure of the application, as introduced above, the Section is flat, i.e. a one storey, apartment.

An ED is an instance of a Section. Such instance can be represented by the Section itself or represented by a system variable. When a system variable is declared, an ED instance of the specified type is created. The declared ED is by default initialized with the ED instance represented by the Section. The ED represented by system variable can be initialized with an existing ED instance as part of the declaration or valuated to an ED instance in the Body of the Section.

Figure 16A:
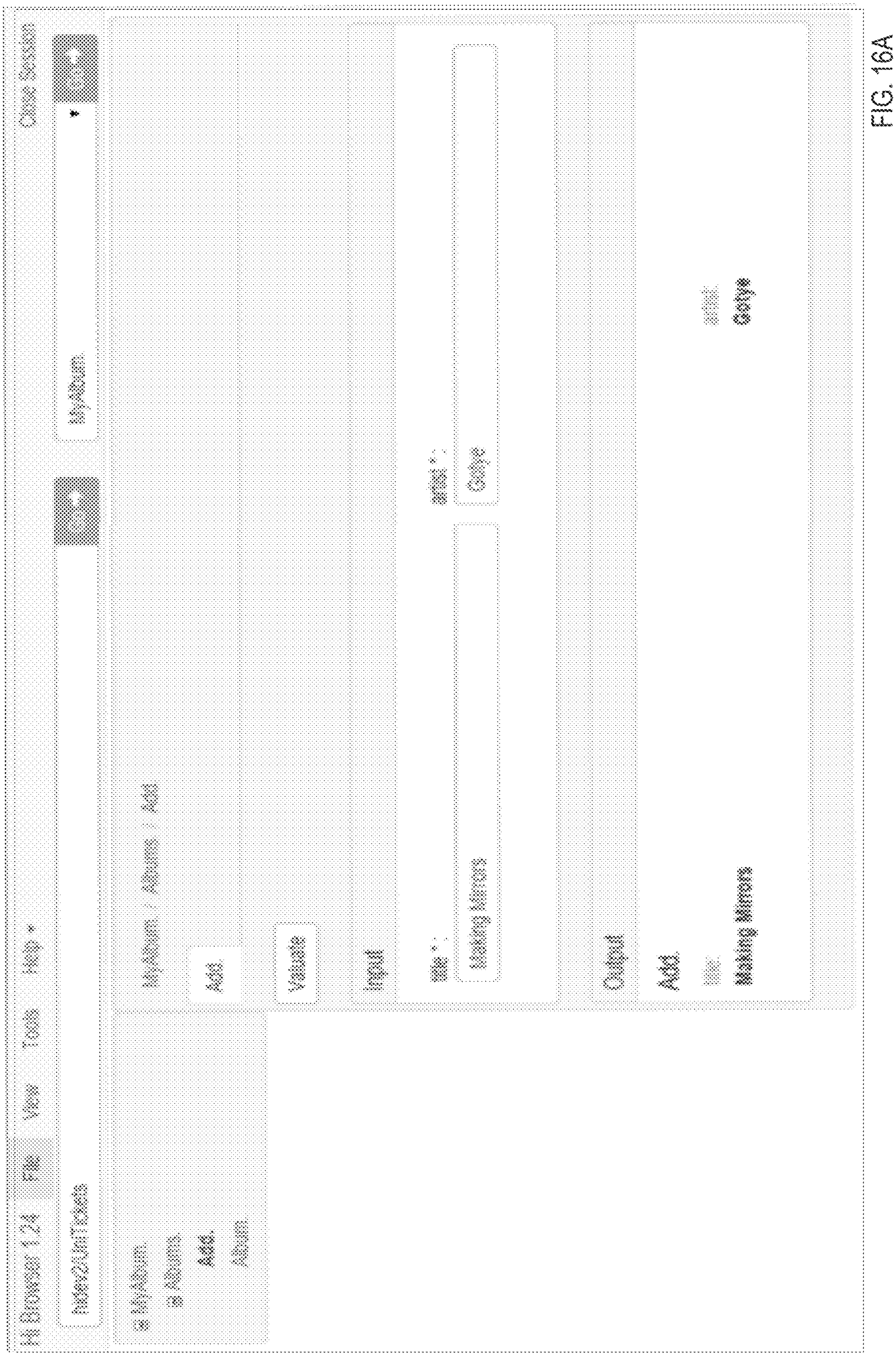
FIG. 16A is an illustrative UI screenshot corresponding to an exemplary .Add. Event Domain (ED) instance during implementation of an exemplary application developed and implemented using a system-oriented platform, in accordance with one embodiment, whereas FIG. 16B provides a corresponding UI screenshot for a similar application developed and implemented using the Zend Framework.
Figure 16B:
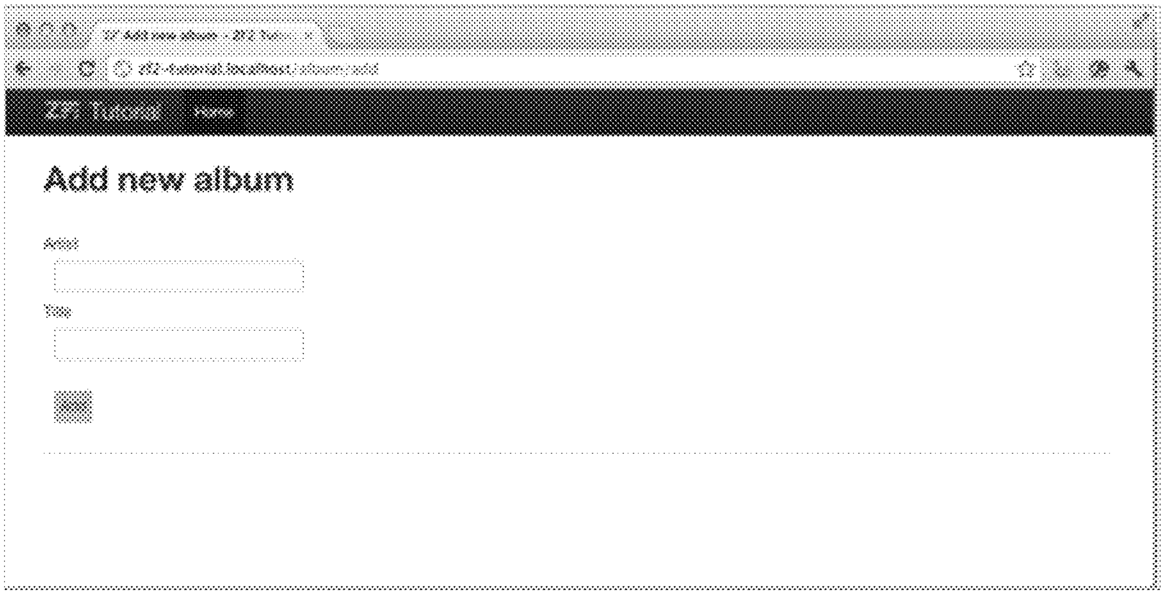
Figure 17B:
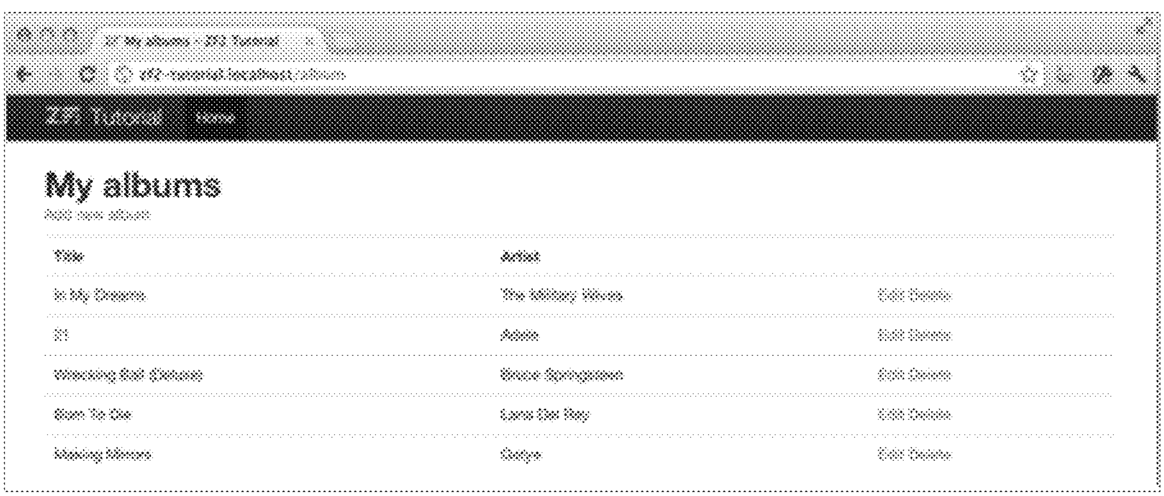
FIG. 17A is an illustrative UI screenshot showing a number of Album instances created by valuating the .Add. ED via the UI of FIG. 16A, whereas FIG. 17B provides a corresponding UI screenshot within the context of the Zend Framework implementation.
Figure 17A:
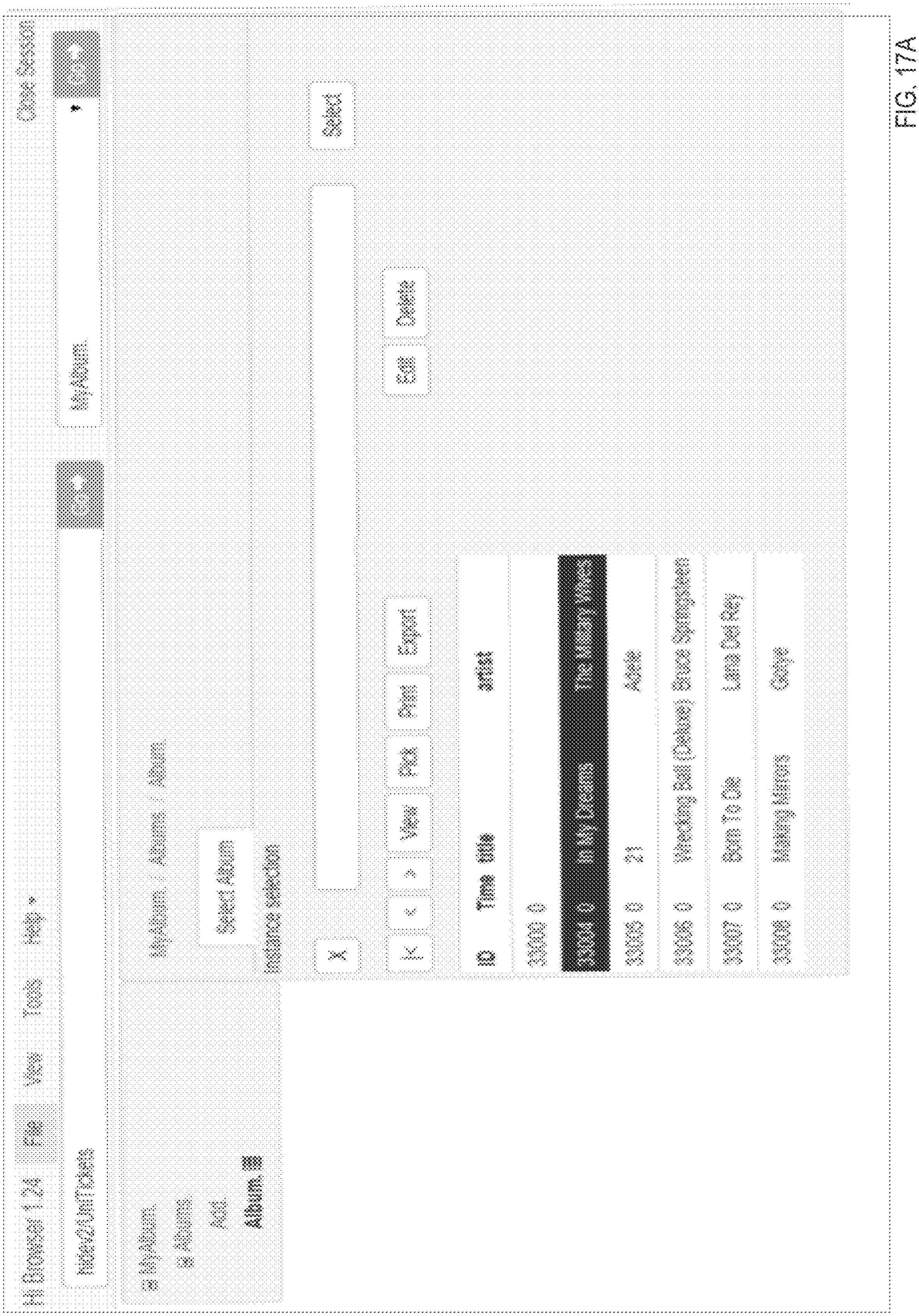

The ED represented by the Section, and the system variable of the same type, behave in the same way. In the example below, the system variable Add1 is an ED instance of the type .Add., which is initialized with the value of the ED instance represented by the Section .Add.. This ED instance is a one storey apartment located under .Albums., and the ED represented by the Section .Add. is also a one storey apartment, the representation of each of these instances in the UI being effectively the same, as show illustratively in the example of FIG. 16A (A corresponding UI implemented using the Zend Framework is shown in FIG. 16B). FIG. 17A, shows a number of Album instances created by valuating the .Add. ED via the user interface (A corresponding UI implemented using the Zend Framework is shown in FIG. 17B).

The valuation of the EDs represented by the Section .Add. and the system variable Add1 is shown in the example below under the Section .LoadFromFile.

```
// Albums collection system
        Section .Albums.
        access public;
        output Album;
        {
          // This is the node where Album instances are stored
          public system Album(MyAlbum.Album.);
          public system Add1(.Add.) = .Add.;
          // System for adding new Album instances
          Section .Add.
          access public;
          inout
            string title,
            string artist;
          {
            integer ret,ret1,ID;
            system Item(MyAlbum.Album.); // Album instance
            // Generate a new Album ID
            ret1 = Valuate(MyAlbum.AlbumID.);
            // Create a new Album instance
            Item = NewED(MyAlbum.Album.,
                ID =MyAlbum.AlbumID.ID,
                artist=artist,
                title =title) | ret1;
            // Store the new Album instance in the specified node path
            ret = SaveED(Item, . .Album->,"val");
      }
      Section .LoadFromFile.
      input
        string title,
        string artist;
      {
        integer ret,ret1;
        system Add1(. .Add.);
        Add1 = NewED(MyAlbum.Albums.Add.);
        ret = Valuate(. .Add.,
            artist= artist,
            title = title);
```

-continued

```
        ret1 = Valuate(Add1,
            artist= artist,
            title = title);
    }
}
```

Expressions

Expressions appear on the right side of the assignment operator "=". There are two kinds of Expressions: Variable Expressions and Section Expressions.

Variable Expressions

Variable Expressions appear in the Body of the Section. In the process of such an expression valuation the intermittent results of an operation is called Node. The variables are also Nodes as they are treated as unary operations. The operands of Variable Expressions are of any of the types supported by HiLDDE, including system type.

Figure 18:
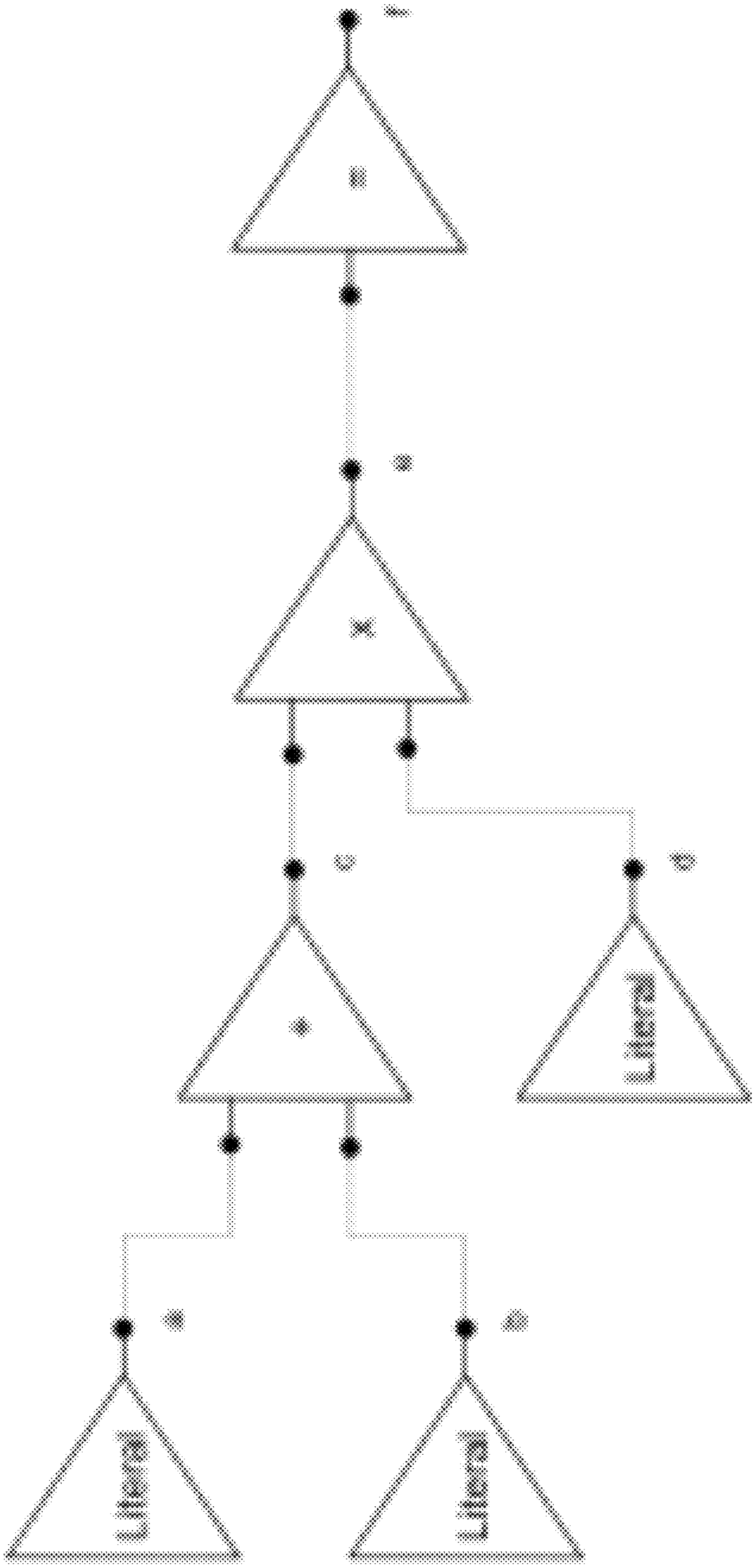
FIG. 18 is a schematic diagram of an Assignment statement as expanded by a HiLDDE compiler in a Node expression, in accordance with one embodiment.

The assignment statement f=(a+b)*d is expanded by the HiLDDE compiler in the Node expression as illustrated in the example of FIG. 18.

The expansion of statements involves the Nodes a, b, c, d, e and f and the following atomic assignment operations in order:

*c=a+b;*

*e=c+d;*

*f=e;*

Note that Nodes a, b and f correspond respectively to variables a,b and f

Section Expressions

Section Expressions appear in the Section declaration and are used to derive new Sections from existing ones. The operands of Section Expressions are Sections. Below is an example of the use of Section Expressions within the present context.

```
Section ._Any.
{
}
Section ._VisualControl.=(self over Section(System._Any.))
access public;
{
  string DisplayName;
  . . . .
}
Section ._Command.=(self over Section(System.Controls-
._VisualControl.)) access public;
{
  . . . .
}
Section ._SimpleForm2.=(self over Section(System.Con-
trols._VisualControl.))
{
  Section ._Valuate.=(self over Section(System.Con-
    trols._Command.))
  {
  }
  Section ._Delete.=(self over Section(System.Con-
    trols._Command.))
  {
  }
  Section ._Print.=(self over Section(System.Con-
    trols._Command.))
  {
  }
  Section ._Export.=(self over Section(System.Con-
    trols._Command.))
  {
  }
}
```

ED Instance Lifecycle

An ED instance is created in the memory for every System Node. A new ED instance is created in the following scenarios: 1) when a system variable is declared; and 2) as a return of system functions NewED, SaveED, etc.

Each ED instance has a CEDI Path address in the program's City map. A CEDI Path determines the location of the ED in the City map but not the apartment floor number. Only one instance of the EDs that are located in a single CEDI Path address is loaded in the memory. When a new instance is created or loaded at the same CEDI Path address, the ED instance that existed before at that address is discarded. All the ED instances that are member of a certain parent ED are discarded from the memory when the user session to this ED is terminated or as decided by the memory manager.

Each ED instance has an ED ID. The EDs that are not stored in the database have a negative EDID. Once they are stored in the database they are assigned with an EDID which is unique within the application system.

The ED instances are stored in the database in the following scenarios: 1) When the parent ED is Valuated and the system variable representing the ED instance is qualified for save; and 2) When an ED function that performs explicit ED save to the database such as SaveED, CopyED, etc. is performed.

EDS Modes

The presently described implementation defines 4 EDS Modes.

Create—In Mode Create the new state of the EDS in memory is stored in the database.

Modify—In Mode Modify the new state of the EDS in the memory modifies the existing state in the database.

Play—In mode Play the input and state of the EDS are read from the database while intermittent and output members are calculated via the ESD business logic.

Read—When option to store the Output nodes in the database is used the Mode Read can be used to read all data members, including input, state, and output without the need to execute the business logic for calculating the output.

The ED Mode is controlled by the system internal variable_Mode, which can take respectively the values 1, 2, 3, and 4. The Default value is 1.

Events

An Event occurs when an ED is valuated. For every Event, the ED time is increased by 1 and a new ED state is generated. If the ED is in save mode, its input, state and optionally output that belongs to this ED time is stored in the database.

The save mode of the ED is controlled by the EDs internal variable _Save, which can be valuated to the values true and false. If the _Save variable is true, the ED state will be saved in the database according to the EDs mode when the ED is valuated. The default value of the _Save variable is false.

The ED functions that explicitly save the ED, such as SaveED or CopyED will ignore the save state of the ED specified by the _Save variable.

Collections (Apartments)

Every time an ED is valuated, any system variable that is qualified for save will be stored in the database in the CEDI Path location where the variable is declared. For every valuation of this system a new state of the system will be stored at the same location. This would create single storey apartments with multiple states. The multiple states of such ED can be used as a collection of data.

Another type of collection is defined as a multi-storey apartment. Such apartments can be created using the explicit save commands such as SaveED, CopyED, and MoveED. Each of the EDs in the apartment may have multiple states created during the EDs valuation.

The ED collections can be accessed using HiLDDE queries or manipulated using HiLDDE system functions.

Queries

HiLDDE queries are used to access EDs instances or states sored in apartment collections. The query expressions are used in HiLDDE functions such as GetED, DeleteED or in the filtering criteria of the Interface declarations.

| | | |
|---|---|---|
| <SaveED1> | =SaveED | '(' <Expr> ',' <SectionID> ',' <Expr> ')' |
| <DeleteED1> | =DeleteED | '(' <SectionID> ')' |

The <SectionID> syntax is shown above within the HiLDDE Program Structure section. Part of the <SectionID> declaration is the <WhereClause> part that has the following syntax:

| | |
|---|---|
| <WhereClause> | = '[' <Expr> ',' <Expr> ' ]' |
| | \| '[' <Expr> ']' |

where the <Expr> is a string expression that returns a HiLDDE Query.

The HiLDDE queries have the similar notation as Path Expressions in XQuery. The ED variable names are preceded by the symbol @ in the query. An exemplary HiLDDE Query is provided below:

```
Section .AreaConfiguration.
  inout
    integer Code,
    string EventCode,
    string LocationCode,
    string HallCode,
    string AreaCode,
    decimal SalePrice;
  {
  }
  Section .AreaConfigurations.
  output AreaConfiguration;
  access public;
  {
    public system AreaConfiguration (UniticketsActivities.AreaConfiguration.);
  }
  AreaConfiguration=GetED (UniticketsActivities.EventConfiguration.AreaConfigurations.AreaConfiguration→
    ["@EventCode=\" "+.Event→Code+"\"
      and @LocationCode=\" "+.Location→Code+"\"
      and @HallCode=\" "+.Hall→Code+"\"
      and @AreaCode=\" "+.Seat→AreaCode+"\" and
        @Time=0",1
    ]);
```

Derivation

Derivation is used to create new Sections from the existing one using Section expressions. The sections are used in the Section declaration and the full syntax is shown in HiLDDE Language Definition section provided above. The Section expressions use Section operators and Section functions. In the instantly described implementation, the following Section operators and Functions are defined, though further or alternative Operators and Functions may also be considered without departing from the general scope of the present disclosure.

Section Operators.

over—Overlays the Section on the left of the operator over the section on the right under—Overlays the Section on the left of the operator under the section on the right Section Functions:

Section(<SectionID>)—Returns the Section specified by <SectionID>

Self—Returns the Section coded under the declared Section. The self Section must be compilable.

The Section that is derived as a result of a Section expression is a new and independent Section that doesn't include the Sections it is derived from. Instead it has inherited features of the original Sections that are manipulated by the Section expression. The source code of the existing Sections is not required. The Section functions use the Section definition data that is stored in the HiLDDE database.

The members that are manipulated by the Section expressions are the following: Main Section—identified by Section Name; Sub Section—identified by partial Section ID; Variable declaration—identified by variable name; Interface—identified by the interface variable; and Assignment statement—identified by the name of the variable in the left side of assignment operation.

Some examples of derivation are shown in the figures below. A first example is provided, as follows:

```
// Original Section
  Section .GoogleMap.
  access public;
  inout
    string startAddress,
    string destAddress;
  output
    map;
  {
    Section .Parameters.
    inout
      string url,
      string startAddress,
      string destAddress;
    {
    }
    system Param(.Parameters.);
    Param=NewED(.Parameters., url="Scripts/map.js",
      startAddress=startAddress,
      destAddress=destAddress);
    system map(System.Controls._EmbeddedScript.);
    map=NewED(System.Controls._EmbeddedScript.,
      Type="Script", Category="JavaScript",
      Parameters=Param)|Param;
  }
// Derived Section
  Section .Delivery3.=(self over Section(System.Controls.GoogleMap.))
  access public;
  inout
    string startAddress,
    string destAddress,
    integer zoom=8; // New variable
  {
```

```
    Section .Parameters.
    inout
      string url,
      string startAddress,
      string destAddress,
      integer zoom; // New variable
    {
    }
    system Param(.Parameters.);
    // Replaced Param assignment statement
    Param=NewED(.Parameters., url="Scripts/map-
      Zoom.js", startAddress=startAddress,
      destAddress=destAddress, zoom=zoom);
}
```

The following illustrates the.Delivery3. Section resulting from the above derivation.

```
  // Derived Section
  Section .Delivery3.
  access public;
  inout
    string startAddress,
    string destAddress,
    integer zoom=8; // New variable
  {
    Section .Parameters.
    inout
      string url,
      string startAddress,
      string destAddress,
      integer zoom; // New variable
    {
    }
    system Param(.Parameters.);
    // Replaced Param assignment statement
    Param=NewED(.Parameters., url="Scripts/map-
      Zoom.js", startAddress=startAddress,
      destAddress=destAddress, zoom=zoom);
    system map(System.Controls._EmbeddedScript.);
    map=NewED(System.Controls._EmbeddedScript.,
      Type="Script", Category="JavaScript",
      Parameters=Param)|Param;
```

The following provides another example of Derivation suing the instantly described implementation.

```
// Original Section
  Section ._Delete.
  access public;
  input system Item(System._Any.);
  output
    RetMessage;
  {
    integer ret;
    string RetMessage;
    string _DisplayName="Delete";
      ret=DeleteED(Item);
    RetMessage=Iff(ret==0, "Deleted successfully",
      "Failed to delete");
  }
  Section Locations.Countries.
  {
    public system Country(Locations.Country.);
    // Derived Section
    Section ._Delete.=(self over Section(.._Delete.))
    input ..Country→Item;
    { }
  }
```

Systems Library

HiLDDE has defined a base library of systems which can be used to derive variation of these functions in other HiLDDE applications. The derivation chain starts from the parent Section .Any.. A sample of the System library is shown below.

```
Section System.
access public;
  {
  Section ._Any.
  { }
  Section .Components.
  {
    Section .Item.
    inout
      string Code;
    { }
    Section ._Collection.
    access public;
    {
      Section .Add.
      access public;
      inout
        string Code;
      {
        system Item(System.Components.Item.);
        integer ret;
        _Save=false;
        Item = NewED(System.Components.Item., Code=Code);
        ret = SaveED(Item,"val");
      }
      Section .LoadFromFile.
      access public;
      input
        string FileName,
        string RecordType="";
      output RetMessage;
      {
        integer File,ret,ret1;
        string RetMessage;
        _Save = false;
        File=FileOpen("Direction=I",FileName);
        ret = Iff(File > 0,
Valuate(.ReadData.,File=File,NoRecords=0), −1);
        RetMessage=Iff(File <=0, "Failed to open the file "
+ FileName,
          Iff(ret<>0,"An error occured while reading
data from file",
            ToString(.ReadData.NoRecords) +
RecordType +" records were loaded."));
        ret1=FileClose(File) | RetMessage;
        Section .ReadData.
        input integer File;
        output NoRecords;
        {
          string sepLast, Name;
          integer ret1, ret2;
          integer NoRecords previous NoRecords_p init
0;
          _Save = false;
sepLast="";
          ret1=0;
          NoRecords = NoRecords_p + 1 | ret1;
          ret2=Iff(sepLast <>
";",Valuate(. .ReadData.),0) | NoRecords;
        }
      }
    }
  }
  Section .Controls.
  access public;
  {
    Section ._VisualControl. = (self over Section(System._Any.))
    access public;
    {
      string _DisplayName;
    }
    Section ._Dbject. = (self over
```

-continued

```
Section(System.Controls._visualControl.))
      access public;
      input
         string Type,
         string Category,
         system InputSystem(System._Any.);
      output
         Content;
{
bin Content;
      }
      Section ._EmbeddedScript. = (self over Section(System._Any.))
      inout
         string Type = "",
         string Category = "",
         system Parameters(System._Any.);
      { }
      Section .GoogleMap. = (self over Section(System._Any.))
      access public;
      inout
            string startAddress, // startAddress"@@start"
            string destAddress;
      output
         map;
      {
         Section .Parameters.
         inout
            string url,
            string startAddress,
            string destAddress;
         { }
         system Param(.Parameters.);
         _Save = false;
         Param = NewED(.Parameters., url ="Scripts/map.js",
startAddress = startAddress, destAddress = destAddress);
      system map (System.Controls._EmbeddedScript.);
      map = NewED (System.Controls._EmbeddedScript., Type =
"Script", Category = "JavaScript", Parameters = Param);
      }
      Section ._Report. = (self over Section(System.Controls._Object.))
      access public;
      input
         string Type = "PDF",
         string Category = "FreeForm",
         system InputSystem(System._Any.),
         string TemplateFileName;
      output
         Content;
      {
         bin Content;
         Content = CreateReport(InputSystem, Type, Category,
TemplateFileName);
      }
      Section .HiRouteMap. = (self over
Section(System.Controls._Object.))
      access public;
      input
         string Type = "HTML",
         string Category = "ADDR",
         system InputSystem(System._Any.),
         integer width=500,
         integer height=500,
         string style="",
         string StartAddress="",
         string StartName="",
         string DestAddress="",
         string DestName="",
         string ContentFile = "Scripts\RouteMapAddr.html";
      output
         Content;
      {
         bin Content;
         integer File,ret;
         File=FileOpen("Direction=I",ContentFile);
         Content=(string)FileRead(File,Chr(26));
         ret = FileClose(File) | Content;
      }
      Section ._Button. = (self over
```

-continued

```
Section(System.Controls._visualControl.))
      access public;
      { }
      Section ._Command. = (self over
Section(System.Controls._visualControl.))
      access public;
      { }
   }
   Section .Forms.
   {
      Section ._SimpleForm1. = (self over
Section(System.Controls._VisualControl.))
      access public;
      {
         Section ._valuate. = (self over
Section(System.Controls._Command.))
         access public;
         {
            string _DisplayName="Valuate";
         }
      }
      Section ._SimpleForm2. = (self over
Section(System.Controls._visualControl.))
      access public;
      {
         Section ._yaluate. = (self over
Section(System.Controls._Command.))
         access public;
         {
            string _DisplayName="Valuate";
         }
         Section ._Delete. = (self over
Section(System.Controls._Command.))
         access public;
         {
            string _DisplayName="Delete";
         }
      }
      Section ._CollectionForm1. =
(Section(System.Controls._VisualControl.) over
Section(System.Components._Collection.))
      access public;
      {
      }
      Section ._CollectionForm2. = (self over
Section(System.Forms._CollectionForm1.))
      access public;
      {
         Section ._Edit. = (self over
Section(System.Controls._Command.))
         access public;
         {
            string _DisplayName="Edit";
         }
         Section ._Delete. = (self over
Section(System.Controls._Command.))
         access public;
         input system Item(System._Any.);
         output
            RetMessage;
         {
            integer ret;
            string RetMessage;
            string _DisplayName="Delete";
            ret = DeleteED(Item);
            RetMessage =Iff(ret == 0,"Deleted
successfully" ,"Failed to delete");
         }
      }
   }
}
```

Recursion

The recursion in HiLDDE is implemented by performing a Valuation call to the hosting system. This is shown in the example below:

```
Section .ReadData.
  {
    integer ret;
    integer NoRecords previous NoRecords_p init 0;
    NoRecords=NoRecords_p+1;
    ret=Iff(NoRecords<100   ";",Valuate(..ReadData.),0)
      |NoRecords;
  }
```

Polymorphism

HiLDDE support EDS polymorphism. This allows a system variable to be assigned to EDs of different types. In order to allow a system variable to be assigned to different ED types, the variable should be declared as system type .Any.. In addition, polymorphism allows building apartments (ED collections) with different types of EDs.

The following provides an example of a polymorphic apartment.

```
// Base account
  Section .Account.
  inout
    string NAME,
    string AccountType,
    string ACCNUM,
    decimal NormalBalance,
    decimal Debit,
    decimal Credit,
    decimal Balance,
    string ParentAccountRef,
    Locations. Currencies. Currency→["*" ]Code Currency,
    Accounting.Company.ChartOfAccounts.AccountStates.AccountState→["*" ]Code State,
    string Description=" ",
    string Note=" ",
    integer REFNUM;
  {
    _Save=true;
    _Mode=System.Modes.Update;
  }
  // Derived account
  Section .BankAccount.=(self over Section(Accounting.Company.ChartOfAccounts.Account.))
  inout
    string AccountType="BANK",
    string BankAccountNo=" ",
    decimal OpeningBalance=0;
  { }
  // Derived account
  Section .AccountsReceivable.=(self over Section(Accounting.Company.ChartOfAccounts.Account.))
  inout
  string AccountType="AR";
  { }
  // Derived account
  Section .AccountsPayable.=(self over Section(Accounting.Company.ChartOfAccounts.Account.))
  inout
    string AccountType="AP";
  { }
  . . . .
  Section .Ledger.
  output Accounts;
  access public;
  {
    // Book of accounts consists in an apartment of account
      instances of different types
      public system Accounts(Accounting.Company.ChartOfAccounts.Account.);
  }
```

Figure 19:
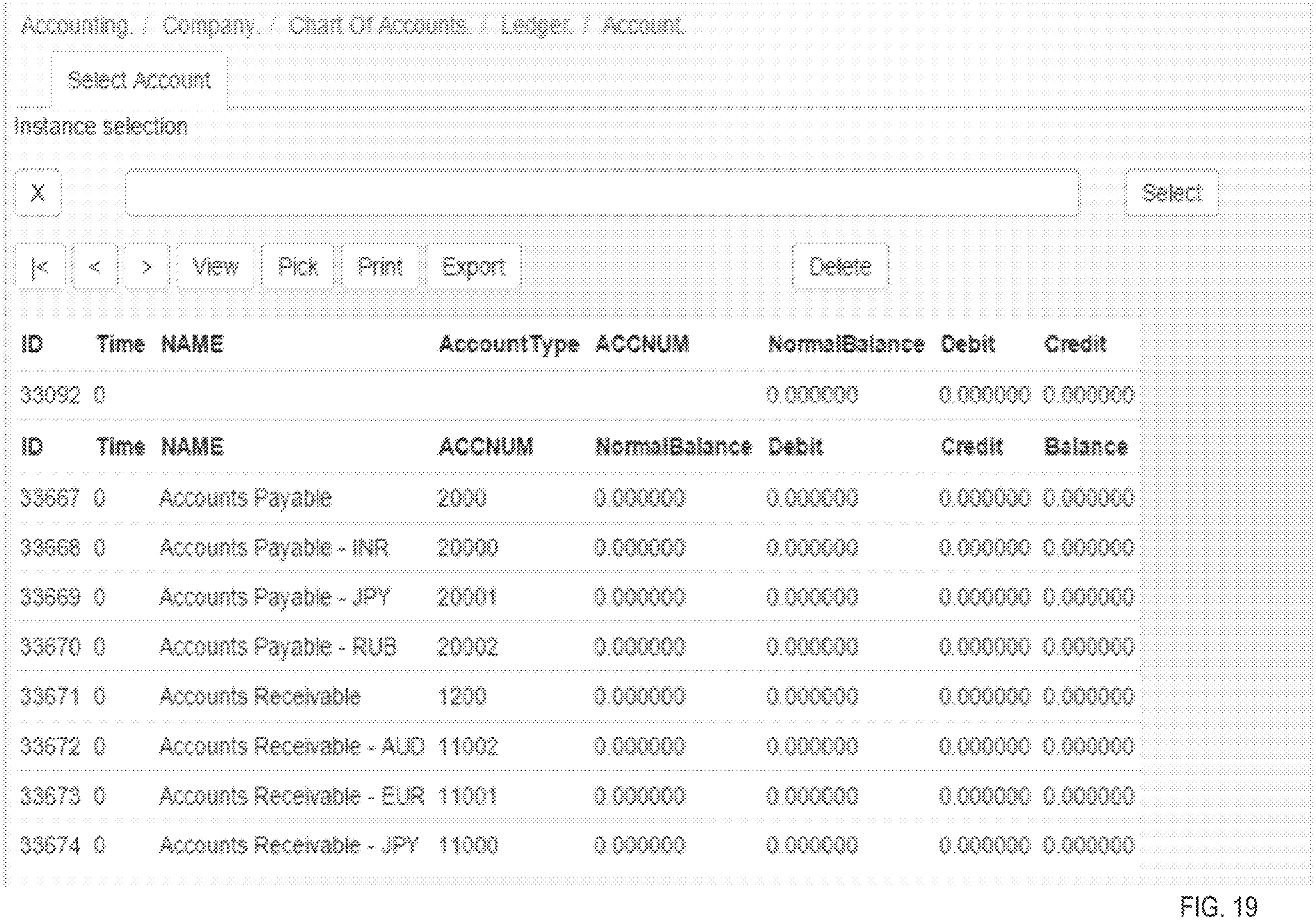
FIG. 19 is a an illustrative UI screenshot of a polymorphic apartment with the HiLDDE framework, in accordance with one embodiment

In the default user interface, the polymorphic apartment of different account types is reflected by different table headers in the apartment view, as shown in the illustrative screenshot of FIG. 19.

External Interfaces

In the instantly described implementation, HiLDDE supports the following external interfaces:

File interface—The basic file operations in HiLDDE are supported using HiLDDE file operation functions:

FileOpen

FileClose

FileRead

FileWrite

These functions support the same file input and output operations as C++.

HiLDDE also uses a direct file interface, which allows exporting an EDS to a file and importing an EDS from a file using single HiLDDE functions FileExport and FileImport, respectively. This allows the file content to be processed in HiLDDE as an EDS.

Web Service interface—HiLDDE supports consuming Web Services using native HiLDDE language commands. This is achieved by building an EDS that acts as a Web Service (WS) Client proxy. The WS Client Proxy EDS is built in compile time using wsdl file for SOAP web services. The Web Service operations and types are converted in an EDS. The HiLDDE application uses the WS Client Proxy EDS that translates the EDS Events into WS Calls and vise versa.

Relational database interface—The connection of a HiLDDE application to an external relational database is done using the HiLDDE RDB Proxy Client. This client consists of an EDS that is built during the compile time and represents the database tables as EDS. The HiLDDE applications use native HiLDDE language commands to communicate with the RDB Proxy that communicates internally with the remote database.

HiLDDE User Interface—In the instantly described implementation, all HiLDDE applications are presented using a default UI in a HiLDDE desktop Client, HiLDDE Web Client and HiLDDE Mobile Client, without requirement for coding for a specific UI.

In addition, HiLDDE supports Forms based User Interface. In this case the HiLDDE form is an EDS that represents the User Screen and can be defined as desired.

Figure 20:
FIG. 20 is an illustrative screenshot of a HiLDDE Web Client screen.
Figure 21:
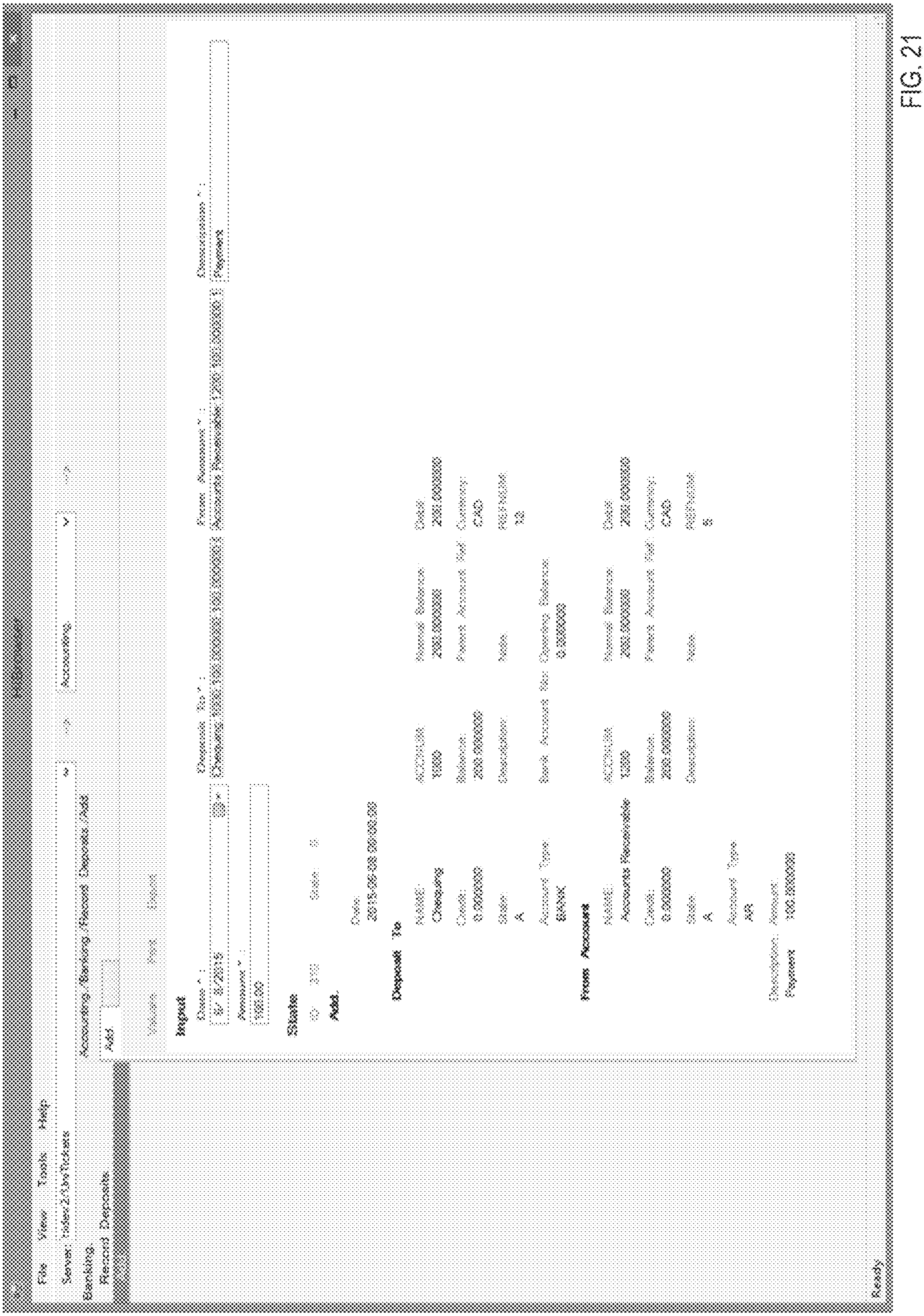
FIG. 21 is an illustrative screenshot of a HiLDDE Desktop Client screen.

FIG. 20 provides an illustrative screenshot of a HiLDDE Web Client screen, whereas FIG. 21 provides an illustrative screenshot of a HiLDDE Desktop Client screen.

HiLDDE System Interface

In the instantly described implementation, the HiLDDE Presentation Server exposes HiLDDE applications using the following system interfaces: SOAP Web Services; REST Web Services; Com+; and MQ. This is done automatically for every application. No user code is required for exposing the HiLDDE applications via those interfaces.

HiLDDE Compiler

Compiler Command

Compiler Command Syntax:

```
hicompiler [-c -s source file [-B database name] [-U user name] [-P password] [-g grammar file] [-p parsed file] [-l compile log file] [-a application log file] [-e element definitions file] [-S YES|NO] [-D YES|NO] [-O YES|NO]]
[-i [-B database name] [-U user name] [-P password]]
[-y grammar file]
```

[-E element definitions file [-B database name] [-U user name] [-P password]]

[-r system name file [-B database name] [-U user name] [-P password]]

Compiler Command Samples:

Compile the Program File Unitickets_Administration.txt

HiCompiler -c -s

"...\HiLDDE_Apps\Unitickets\Unitickets_Administration.txt"-B "UTICKETS"

-U "userid"-P "password"-g "HiLDDE.cgt"-p "parser.log"-l "compile.log"-a "compiler.log"-e "ElementDefinitions.txt"-D 1

Delete the Program UniticketsAdministration from Database

HiCompiler -r "UniticketsAdministration."-B "UTICKETS"-U "userid"-P "password"

Data Structures

Variables and Nodes—Node Types:

The HiLDDE compiler takes as input the HiLDDE source code and produces the output data that are loaded to the HiLDDE database. These data describe the EDS definition, intermittent executable code and user data using these hierarchic artifacts:

- Systems
  - Sections
    - Interfaces
    - Elements
    - Nodes
    - Valuation Sequence
  - Event Domains
    - States 1. System Definition Data The following data structure describes the EDS definition. These data are static and do not change during the runtime.

- Systems
  - Sections
    - Interfaces
    - Elements
    - Nodes

The screenshots provided by FIGS. 29, 30, 31, 32 and 33 provide illustrative views of the Systems, Sections, Interfaces, Elements and Nodes data artifacts, respectively.

2. Application Executable Code

Application executable code is provided in a HiLDDE internal executable language. This consists in a sequence of instructions that can be processed by the HiLDDE application server. FIG. 34 provides an illustrative screenshot view of an exemplary Valuation Sequence.

3. User Data

User data consists in Event Domain instances and States. While the definition of each ED remains static during the runtime (stored in the System Definition area of the database) the data members of the new ED instances are stored in Event Domains area and the States in the Nodes Values area. FIG. 35 provides an illustrative screenshot view of Event Domains, whereas FIG. 36 provides an illustrative screenshot view of Nodes Values.

HiLDDE defines 7 Node types, as listed comparatively in the Table below:

| HiLDDE language type | HiLDDE compiler type | C++ type | ATL type (MS specific) |
|---|---|---|---|
| string | HiStrT | wstring | |
| decimal | HiDecT | double | |

-continued

| HiLDDE language type | HiLDDE compiler type | C++ type | ATL type (MS specific) |
|---|---|---|---|
| integer | HiIntT | long | |
| boolean | HiBoolT | bool | |
| date | HiDateT | | COleDateTime |
| event | HiEventT | bool | |
| system | HiSysT | UDT | |
| longint | | long long | |
| smalldec | | single | |
| imallint | | Int16 | |
| xml | | string | |
| bin | | string | |

The HiSysT is a user-defined type as union of Full (C++ integral) and SystemNode structures, that contains 3 members as detailed below.

```
typedef uSysPointer HiSysT;
union uSysPointer {
  SysPointT     Full;
  SystemNode    Parts;
};
struct SystemNode{
  EventDomainIDT EventDomainID   : 32;   // DEDID
  NodeIndexT          EventIndex   : 16;   // Event Nod Index in DED
  SectionIDT          SectionID    : 16;   // SEDID (BEDID)
} ;
```

Node Roles:

```
enum gNodeRole {
  Hi_nrUndefined=0,
  Hi_nrInput,
  Hi_nrOutput,
  Hi_nrStateVar,
  Hi_nrIntermediate,
  Hi_nrKey,
  Hi_nrConstant,
  Hi_nrInputOutput,
  Hi_nrStateOutput,
  Hi_nrStateInput,
  Hi_nrStateInputOutput,
  Hi_nrPrevState,
  Hi_nrPrevStateInput,
  Hi_nrPrevStateInputOutput,
  Hi_nrPrevStateOutput,
  Hi_nrOutRef
};
```

Each Node has a unique ID within the corresponding section.

Element Classes

The following Element Classes are defined: Input Elements; Output Elements; State Variable Elements; Intermediate Elements; and Assignment Elements (illustrated in FIGS. 47A and 47B)

a=b; (FIG. 47A)

a=b After c; (FIG. 47B)

a=b|c;

Input Interface Elements (IIE)

Section ULPolicy.Policy.RPCov.CASHVAL.
  input
    ULPolicy.Policy.RPCov.Withdrawal.CRPWACR-PWA The IIE purpose is to initialize the input interface variables before the ED is valuated with values from other nodes that are directly referred to in HiLDDE in the input declaration. The IIE element (schematically illustrated in FIG. 48) is generated only if the left side of an input item is a node located to a BED. The IIE element has a role Hi_erInputinterface. The output node has the same type as the declared input interface node.

Figure 22:
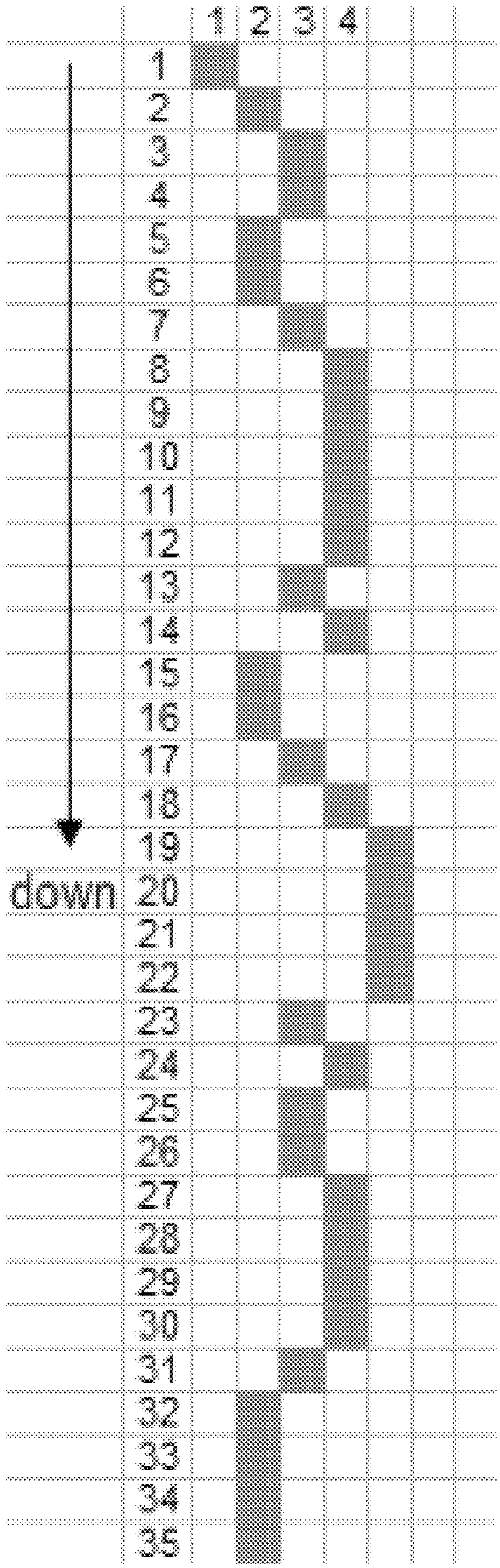
FIG. 22 is a graphical representation of an exemplary subsystems tree, in accordance with one embodiment.

The value of Node 2 is the Relative Remote Section position. This is a RelSecPosT structure which determines the relative SectionID position. The RelSecPosT.RelSecID indicates the number of system levels up or down the target Section is from the current Section. The RelSecPosT, ChildSecIndex is the Child Section Index in the Remote Section. FIG. 22 provides a graphical representation of an exemplary subsystems tree.

The value of Node 3 is the Remote ED ID and is determined only for a DED.

The value of Node 4 is the RemoteNodeID.

The Output Node of the IIE points to a variable Node in the current ED. The Role of this node is Hi_nrIntermediate. The Node Type is the same as the remote Node.

The Node 2 is a Bin node of Hi_nrConstant Role. It carries the CEDI Path of the remote BED if the remote Section is specified using a relative path. If the remote Section is specified by a full path, than the remote ED can be determined during the runtime by EDID specified in the Node 3, so in that case the Node 2 is blank.

The Node 3 is an Integer node of Hi_nrConstant Role. It carries the ID of the remote BED if the remote Section is specified using a full path.

The Node 4 is a long integer node of Hi_nrConstant Role. It carries the ID of the remote node in the remote BED.

The Node 5 is the System ID of the referred system. If the reference is on the same system, the SystemID=0. The node is a Hi_nrConstant integer.

The Relative Section Position doesn't work in the conditions when DED IDs are generated in a non-sequential fashion by different processes. The Section Paths to Remote Nodes should be specified in HiLDDE code based on the following. The Section Path to the Remote Node can be a Full Path or a Path relative to the Current Section. If a Full Path is specified then an EDID can be determined for this path, which can be stored in Node 3. In this Case the Node 2 is set to " ". If the Path is Relative, than a CEDI Path can be determined and stored in Node 2. In this case the Node 3 should be set to 0. The Node 2 of IIE should be a Bin type.

The IIE can be provided in two versions as a 3 Node Element. In the version 1 the Node 2 would be an EDID and in version 2 a CEDI Path.

For performance improvement during the runtime, the last node will contain the address of the remote Node Value instead of the RemoteNodeID. In this case the runtime IIE function will simply move the value of the last Node to the value of the Output Node.

The Output Node of the IIE exists in the ED as an Input Node in order to be able to store the value of the Input Interface.

In some embodiments, the Remote Node specification in the interface section of the HiLDDE code may be optional. For example, if it is not specified, the Output Node of the IIE will be initialized during the runtime via an Initialization operation. In this version, the Input Interface is not hardwired to a predetermined node. Instead, the value of the Input Interface is provided as a parameter during the runtime. If all input interface nodes are specified in this fashion, the Section input interface behaves like function input parameters.

"Get Node Value" Element (GNY)

The GNVSec Element returns the value of the Node from a Child Section or DED. The path to the Target Section or CED is a series of names separated by dots or →. Each name can be a System Variable or a Section Name. The path is terminated by the target variable name. The internal Node Value can only be returned from a Child Section or Child DED.

The GNV Element comes in two forms, as shown in the table below, depending on whether the Section Path of the target ED starts with a Section Name or System Variable.

| Ver | Function Syntax | Valuate Element Class |
|---|---|---|
| 1 | - 'Section_Name.''EDPath''Var_Name'-- | Hi_ecGNV |
| 2 | - 'SysVar->''EDPath''Var_Name'-- | Hi_ecGNV1 |

EDPath is illustrated in FIG. 49:

Below is an example of the EDPath when the path to a remote ED starts with a Section Name: Sec1.Sec2.Sec3 . . . NodeName

```
Section ArrayEx.COI.
{
  integer COI;
  Section ArrayEx.COI.COIitem.
  output coi;
  {
    integer coi previous coip;
    . . . .
    coi=(integer)ToNumber(cois);
    . . . .
  }
  COI=ArrayEx.COI.COIitem.coi;
}
```

Below is an example of the EDPath when the path to a remote ED starts with a System Variable

```
Section Locations. Currency.
inout
  string InternationalCode,
  string InternationalName,
  string LocalName,
  string LocalCode;
{
}
. . . .
Section ..Read.
inout
  string InternationalCode;
output
  InternationalName,
  LocalName,
  LocalCode;
{
  system Currency(Locations.Currency.);
  string InternationalName,
    LocalName,
    LocalCode;
  Currency=GetED (Locations.Currency.
    ["NodeName=InternationalCode and StrValue='"+
    InternationalCode+"' and IntTime=0",1]);
  InternationalName=Currency→InternationalName;
  LocalName=Currency→LocalName;
  LocalCode=Currency→LocalCode;
}
```

CEDI Path

A dot or → separated sequence of Section Names or System Variables that specifies the Child Sections that you need to pass through to reach a Child Section from the Current Section is called a Section Path.

A Child Event Domain Index Path (CEDI Path) is a representation of a Section Path using the Child Event Domain Index of the EDs corresponding to the Section Path. Each CEDI is represented by a 16 bit integer. The CEDI Path is a sequence of such 16 bit integers, represented as a double byte string (wchar_t).

In FIG. 50, the Section Path to reach the Child Section Sec9 from the current Section CurSec is "Sec2.Sec5.Sec9".

The CEDI Path is a wchar_t array whose hexadecimal presentation is x'000200020001'

The Hi_ecGNV Element is presented below.

The Node 1 points to an internal variable that will carry the value of the remote Node. The Role of the Output Node is Hi_nrIntermediate.

The Node 2 is of type Bin and carries the CEDI Path. The Node Role is Hi_nrConstant.

The Node 3 is the Target EDID. The node type is a long integer and the Node Role is Hi_nrConstant.

The Node 4 is of the type Integer and carries the target Node ID in the target Section. The Node Role is Hi_nrConstant.

The Node 5 is the System ID of the referred system. If the reference is on the same system the SystemID=0. The node is Hi_nrConstant integer.

The GNV Element's role is Hi_erIntermediate, as illustrated in FIG. 51.

If the CEDI path contains only Section names, then the target ED is known at compile. In that case the RemoteEDID is set to the target ED and the CEDIPath is empty. If time so the CEDI Path is built and set during the compile time. Also the target Node ID value is set during the compile time.

Since both Input nodes are of Hi_nrConstant Role, the valuation of the expressions that involve this Element can be controlled using a sequencing operator, if needed.

The Hi_ecGNV1 Element is presented below.

The Node 1 points to an internal variable that will carry the value of the remote Node. The Role of the Output Node is Hi_nrIntermediate.

The Node 2 is of type Bin and carries the remote node reference at compile time in the structure below: The Node Role is Hi_nrConstant.

The Node 3 is of type Hi_ntSystem and is linked to the System variable representing the remote DED. The Node Role is Hi_nrIntermediate.

```
union ParmRefT {
  char chars[8];
  struct {
    SystemIDT SystemID :32; // 4 byte integer
    SectionIDT SectionID :16; // 2 byte integer
    NodeIndexT NodeIndex :16; // 2 byte integer
  };
  };
```

New Element

The New Element creates a new DED based on the specified Section and associates it with an event in the current Section. The output node of New Element is a SysPointer. The HiLDDE syntax of the New function is defined as follows:

New(SectionName,KeyExpression)

for example:

```
Section ArrayEx.COI.
  integer key KeyVar;
{
. . . .
Section ArrayEx.NewInst.
input
  index as ArrayEx.Init.index;
{
  system ArrayExNew(ArrayEx.COI.);
  ArrayExNew=New (ArrayEx.COILoad.,index+1,1);
```

The returning SysVar should be declared as a System Variable of an existing SED.

The SectionName argument is a literal specifying the name of an existing SED. The SectionName must match with the Section name of the returning SysVar.

The EventVariable argument is a literal specifying an Event Variable declared in the current Section. This event will be associated with the new DED.

The KeyExpression argument is an expression that returns a type compatible with the key of SED.

The New Element is shown in FIG. 52.

The output Node is a System node of Hi_nrIntermediate Role.

The Node 2 is the SystemID of the Source system. The Node Role is Integer Hi_nrConstant. The SystemID=0 indicates the current system.

Node 3 is an integer node of Hi_nrConstant Role that caries the SectionID of the Source System that belongs to SectionName.

The Node 4 is an integer node of Hi_nrConstant Role that caries the ChildIndex of the Source Section.

The Node 5 is attached to the output node of KeyExpression. This node can be of any scalar type. The Node Role is Hi_nrIntermediate.

GetED, GetCED Elements

In the instantly described implementation, the GetED Element retrieves an existing DED from the database based on a Full Section Name, a selection condition for the ED node values and optionally the ED Time. The selection conditions can be specified for all Child EDs under the main ED.

The output node of a New Element is a SysPointer.

In the instantly described implementation, the HiLDDE syntax of the Get function is as follows.

GetED(<EDSelQuery>)

where

```
<EDSelQuery>=<EDPath>[WhereExpression1,Index1],
  <EDPath>[WhereExpression2,Index2],
  . . . .
  <EDPath>[WhereExpressionN,IndexN]
```

<EDPath> is a relative or absolute path composed as a sequence of Section Names and system variables separated by dots, as illustrated in FIG. 49.

WhereExpressionN specifies the selection criteria for identifying the ED. The selection criteria is a string expression that returns an SQL where clause search condition. Only node names of the current ED can be referred in the search condition. The valid node roles that can be referred in the selection criteria are state and input roles. All child EDs can be specified following the main ED along with their search conditions. The Child EDs should be specified in the same order as their hierarchy in the ED tree.

IndexN specifies the item index to be returned. In general more than one ED may satisfy the selection criteria, for example:

```
GSIitem=GetED (
ULPolicy.AgeParm.Item.["NodeName='age' and
  IntValue="+ToString(age)+" and IntTime="+ToString
  (1),1],
..Item.["NodeName='coi' and DecValue>"+ToString
  (10.2)+" and DecTime="+ToString(1),1]);
```

The GetED Element returns a system node. The GetED function is expanded in a complex of one GetED element and zero or more GetCED elements.

The GetED Element is shown in FIG. 53.

The output Node is a System node of Hi_nrIntermediate Role.

The Node 2 is the SystemID of the Source system. The Node Role is Integer Hi_nrConstant. The SystemID=0 indicates the current system.

The Node 3 is type Bin and carries the CEDI Path. The Node Role is Hi_nrConstant.

The Node 4 is type integer and holds the RemoteEDID or the relative/absolute flag, depending on the element configuration. The Node Role is Hi_nrConstant.

In the instantly described implementation, there are 3 configurations on the nodes 3 and 4:

When an EDPath does not contain System variables, the target EDID is known at compile time and this ID is assigned to the Node 3—RemoteEDID. The Node 2—CEDIPath is left empty.

In the case when an EDPath contains System variables, the target EDID can not be determined at compile time but instead the CEDI path can be built at compile time, hence the following two subcases.

In the case when the path to the target contains system variables and the target ED Path is relative, the Node 2 is the relative CEDIPath and Node 3=0. However, in the case when the path to the target contains system variables and the target ED Path is absolute (starting from root section), the Node 2—CEDIPath contains the absolute CEDIPath and Node 3< >0.

The Node 5 is an integer node of Hi_nrConstant Role that caries the ChildIndex where the returning ED will be hosted in the parent ED.

The Node 6 is attached to the output node of the where clause expression. This is a string expression that returns a string in the format of the where clause of the SQL language and is used to identify the target ED. The where clause expression uses references to the nodes of the current Section, including the built-in nodes like Time, Mode, etc. Only the node names references are allowed in the where clause expression. The System name and Section name are already identified. The "where" token is not needed. The node type is string. The Node Role is Hi_nrIntermediate.

The Node 7 is an integer value indicating the ED item index in the search result set. More than one ED may meet the search criteria so the index indicates which ED will be picked. This node can be of any type compatible with Integer. The Node Role is Hi_nrIntermediate.

The GetCED Element is shown in FIG. 54.

The output Node is a System node of Hi_nrIntermediate Role.

The Node 2 is the the SystemID of the Source system. The Node Role is Integer Hi_nrConstant. The SystemID=0 indicates the current system.

The Node 3 is type Bin and carries the CEDI Path. The Node Role is Hi_nrConstant.

The Node 4 is type long integer and stores the RemoteEDID or the relative/absolute flag, depending on the element configuration. The Node Role is Hi_nrConstant.

There are 3 configurations on the nodes 3 and 4. When an EDPath does not contain System variables, the target EDID is known at compile time and this ID is assigned to the Node 3—RemoteEDID. The Node 2—CEDIPath is left Empty.

In the case when an EDPath contains System variables, the target EDID can not be determined at compile time but instead the CEDI path can be built at compile time, hence the following two subcases. In the case when the path to the target contains system variables and the target ED Path is relative, the Node 2 is the relative CEDIPath and Node 3=0. However, in the case when the path to the target contains system variables and the target ED Path is absolute (starting from root section), the Node 2—CEDIPath contains the absolute CEDIPath and Node 3< >0.

The Node 5 is an integer node of Hi_nrConstant Role that caries the ChildIndex where the returning ED will be hosted in the parent ED.

The Node 6 is attached to the output node of the where clause expression. This is a string expression that returns a string in the format of the where clause of the SQL language and is used to identify the target ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

The Node 7 is the attached to the output node of the TimeExpression. This node can be of any type compatible with Integer. The Node Role is Hi_nrIntermediate.

The Node 8 is the attached to the output node of a perent GetED or GetCED element. This node is of type System. The Node Role is Hi_nrIntermediate.

Figure 23:
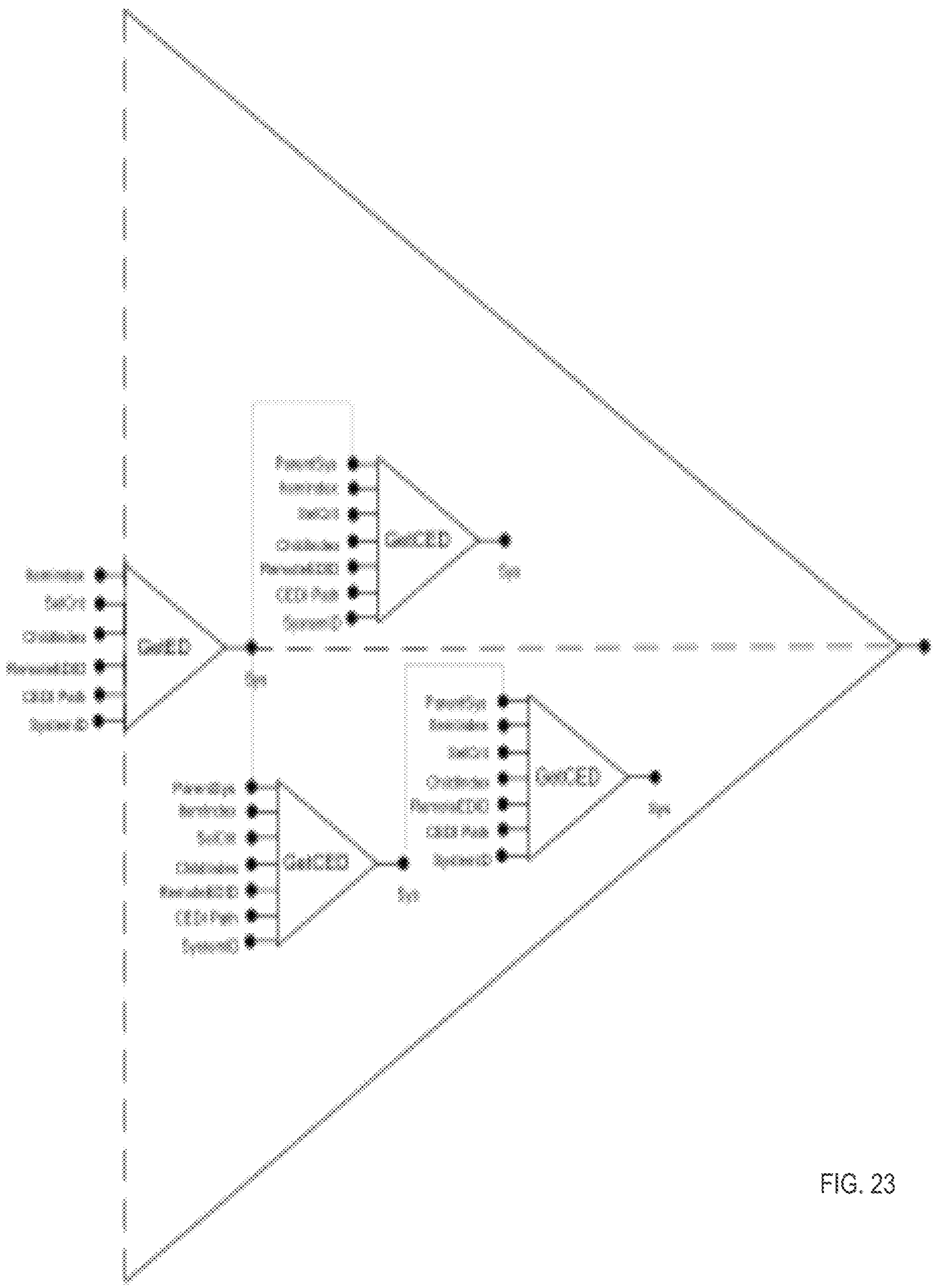
FIG. 23 is a graphical representation of an expansion of a GetED function, in accordance with one embodiment.

The expansion of the GetED function is schematically depicted in FIG. 23.

New version of GetED:

Multiple filtering criteria after each System variable.

Syntax:

```
Seat=GetED (UniticketsAdministration.Locations.Locations.Location→Hall→["@Code=\" "+HallCode+"\" and
  @Time=0",1]Seat→[" ",NoRecords]);
```

Resulting Query:

```
SELECT
  EventDomainID,Time
from
  AllNodeValuesXMLVIEW1
where
  systemid=62 and
  CEDIPath=x'06000A00070001000100' and
  XMLEXISTS ('$NODEVALUES/Nodes[@Time=0]')
    and
  ParentID in
  (SELECT
    EventDomainID
  from
    AllNodeValuesXMLVIEW1
  where
    systemid=62 and
    CEDIPath=x'06000A0007000100' and
    XMLEXISTS ('$NODEVALUES/Nodes[*
      [@Name="Code"]="HC4" and @Time=0]')
  );
```

Figure 24:
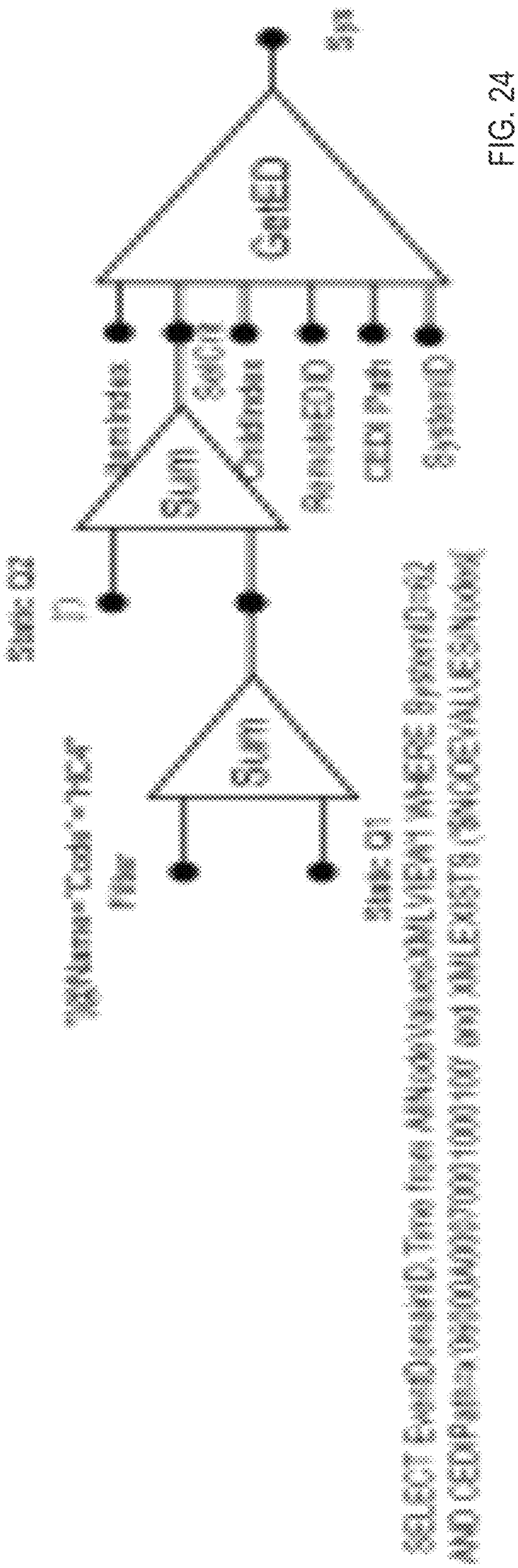
FIGS. 24 and 25 are schematic diagrams of one filter and two filter implementations
Figure 25:
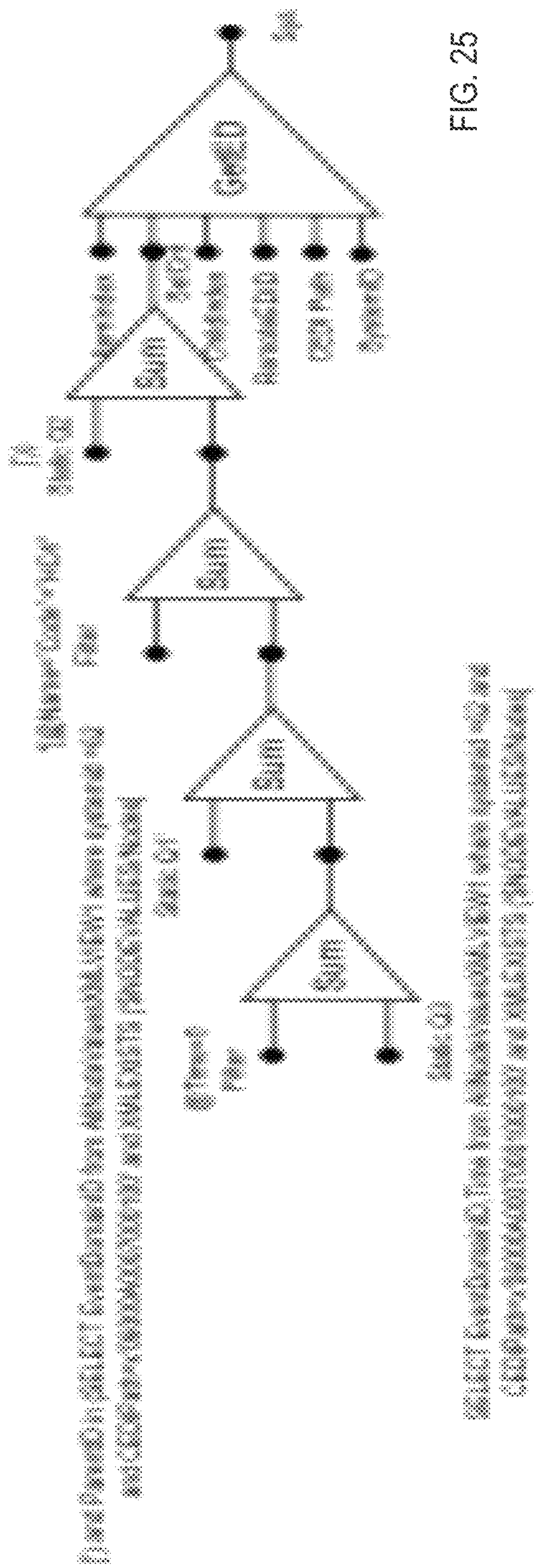

GetED Expansion:

FIG. 24 provides a schematic example of one filter, whereas FIG. 25 provides a schematic example of two filters.

NewED Element

The New Element creates a new DED based on the specified Section. If a set of input parameters is provided the New ED will be initialized by valuating it using the input parameters. The output node of New Element is a SysPointer. The New ED Element may have variation of parameters as outlined in the Table below.

| Ver | Function Syntax | Valuate Element Class |
|---|---|---|
| 1 | NewED (<SectionName>) | Hi_ecNewED |
| 2 | NewED (<SectionName>, <ParmAsgnStatements>) | Hi_ecNewED1 |
| 3 | NewED (<SectionName>, <SaveExp>) | Hi_ecNewED2 |
| 4 | NewED <SectionName>, <ParmAsgnStatements>, <SaveExp>) | Hi_ecNewED3 |

<SectionName> is a hard coded section name.

The <ParmAsgnStatements> is a list of assignment statements in the form <Remote Variable>=<Expression> where the RemoteVariable is one of the following names in the remote ED: an out variable; a state variable; and Mode—this points to ED mode The <SaveExp> is a Boolean expression that indicates whether to save or not the newly created ED.

The HiLDDE syntax of the New function is provided below, as exemplified thereafter.

New(SectionName)

Example 1

```
Section ArrayEx.COI.
{
. . . .
Section ArrayEx.NewInst.
{
  system ArrayExNew(ArrayEx.COI.);
  ArrayExNew=New(ArrayEx.COILoad.);
```

Example 2

```
Section ULPolicy.Policy.
input
  system Insured(ULPolicy.Insured.),
  decimal GSI=0,
  decimal OIC=0,
  decimal EADB,
  decimal BADB,
  decimal RP0,
  decimal ISP0,
  decimal PID,
  decimal DBO,
  decimal AISIO,
  decimal MODP;
  . . . .
  {
  . . . .
  }
  Section ULPolicy.Illustration.
  {
    integer
      res1;
    system
      Policy(ULPolicy.Policy.);
    string
      PolicyNo="P0000001",
    . . . .
    // Create a new Policy instance
    Policy=New (ULPolicy.Policy.,
      Insured=Insured,
      GSI=14000,
      OIC=0,
      EADB=0,
      BADB=0,
      RP0=12000,
      ISP0=100000,
      PID="2011-10-23",
      DBO=false,
      AISIO=false,
      MODP="m");
  }
```

The returning SysVar should be declared as a System Variable of an existing SED. The SectionName argument is a literal specifying the name of an existing SED. The SectionName must match with the Section name of the returning SysVar.

Figure 55:
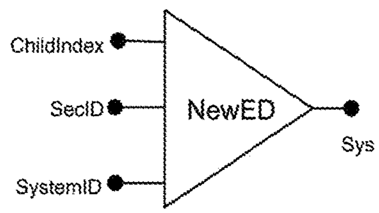
FIG. 55 is a schematic diagram of the NewED element, in accordance with one embodiment.

The NewED Element is schematically illustrated in FIG. 55.

The output Node is a System node of Hi_nrIntermediate Role.

The Node 2 is the SystemID of the Source system. The Node Role is Integer Hi_nrConstant. The SystemID=0 indicates the current system.

Node 3 is an integer node of Hi_nrConstant Role that caries the Section_ID 50 of the Source System that belongs to SectionName.

The Node 4 is an integer node of Hi_nrConstant Role that caries the ChildIndex where the returning ED will be hosted in the parent ED.

Figure 56:
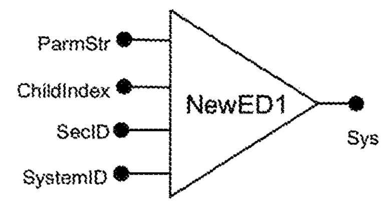
FIG. 56 is a schematic diagram of the NewED1 element, in accordance with one embodiment.

The NewED1 Element is shown in FIG. 56.

The output Node is a System node of Hi_nrIntermediate Role.

The Node 2 is the SystemID of the Source system. The Node Role is Integer Hi_nrConstant. The SystemID=0 indicates the current system.

Node 3 is an integer node of Hi_nrConstant Role that caries the Section_ID of the Source System that belongs to SectionName.

The Node 4 is an integer node of Hi_nrConstant Role that caries the ChildIndex where the returning ED will be hosted in the parent ED.

Figure 57:
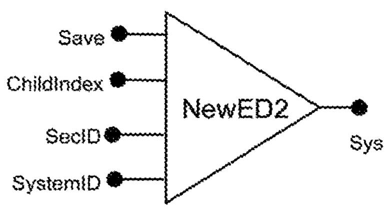
FIG. 57 is a schematic diagram of the NewED2 element, in accordance with one embodiment.
Figure 58:
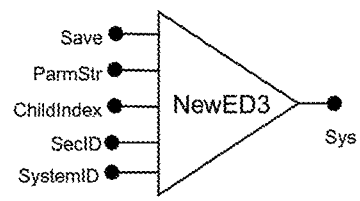
FIG. 58 is a schematic diagram of the NewED3 element, in accordance with one embodiment.

The Node 5 is type Bin and contains mapping information of local and remote parameter nodes. The mapping consists in a pair of node indexes, where the first node index is the local node and the second is the index of the remote node. The node indexes are 16 bit integers. The Node Role is Hi_nrConstant. Similarly, the NewED2 and NewED3 elements are shown in FIGS. 57 and 58, respectively.

Valuate Element

The Valuate Function valuates an ED specified by a Section name. The target Section to be valuated can be a Section of a BED or DED. A Valuate Element is created for each Valuate function. The HiLDDE Syntax of the Valuate Function is the following:

| Ver | Function Syntax | Element Class |
|---|---|---|
| 1 | Valuate (<EDPath> [, <ParmAsgnStatements>]) | Hi_ecValuateED |
| 2 | Valuate (<SysExp> [, <ParmAsgnStatements>]) | Hi_ecValuateED1 |

<EDPath> is a relative or absolute path composed with a mixture of Section Names and system variables that contains at least one system variable, as illustrated in FIG. 49.

<SysExp> is an expression that returns a System Variable specifying the ED to be valuated.

The <ParmAsgnStatements> is a list of assignment statements in the form <Remote Variable>=<Expression> where the RemoteVariable is one of the following names in the remote ED: an out variable; a state variable; and Mode—this points to ED mode.

The Valuate Function returns an integer which is the error code generated during the valuation of ED. If no error, the return code is 0.

Example

```
Section ULPolicy.Policy.
string key PolicyNo;
input
  system Insured(ULPolicy.Insured.),
  decimal GSI=0,
  decimal OIC=0,
  decimal EADB,
  decimal BADB,
  decimal RP0,
  decimal ISP0,
  decimal PID,
  decimal DBO,
  decimal AISIO,
  decimal MODP;
. . . .
}
. . . .
  }
Section ULPolicy.Illustration.
{
  integer
    res1;
  system
    Policy(ULPolicy.Policy.);
  string
    PolicyNo="P0000001",
  . . . .
  // Create a new Policy instance
  Policy=New(ULPolicy.Policy.,PolicyNo);
  // Version 2
  res1=Valuate (Policy,
    Insured=Insured,
    GSI=14000,
    OIC=0,
    EADB=0,
    BADB=0,
    RP0=12000,
    ISP0=100000,
    PID="2011-10-23",
    DBO=false,
    AISIO=false,
    MODP="m");
}
```

Version 1

Figure 59:
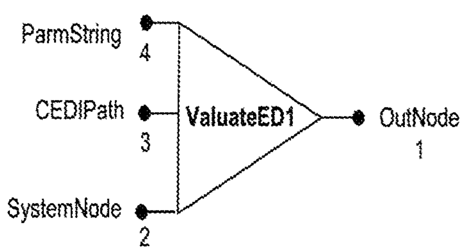
FIG. 59 is a schematic diagram of the Hi_ecValuateED1 Element, in accordance with one embodiment.

The Hi_ecValuateED1 Element is shown in FIG. 59.

The output Node is the return code of the valuation operation. Node Role is Hi_nrIntermediate.

The Node 2 points to a System Node. The Node Role is Hi_nrIntermediate.

The Node 3 is type Bin and carries the CEDI Path relative to the system node. The Node Role is Hi_nrConstant.

The Node 4 is type Bin and contains mapping information of local and remote parameter nodes. The mapping consists in a pair of node indexes, where the first node index is the local node and the second is the index of the remote node. The node indexes are 16 bit unsigned integers. The Node Role is Hi_nrConstant. The Node Index 32,767 is reserved for the Event Domain's "Mode" property.

Version 2

Figure 60:
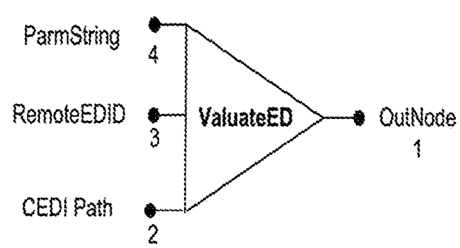
FIG. 60 is a schematic diagram of the Hi_ecValuateED Element, in accordance with one embodiment.

The Hi_ecValuateED Element is shown in FIG. 60.

The output Node is the return code of the valuation operation. Node Role is Hi_nrIntermediate.

The Node 2 is type Bin and carries the CEDI Path. The Node Role is Hi_nrConstant.

The Node 3 is type long integer and stores the RemoteEDID or the relative/absolute flag, depending on the element configuration. See Element configuration below. The Node Role is Hi_nrConstant.

The Node 4 is type Bin and contains mapping information of local and remote parameter nodes. The mapping consists in a pair of node indexes, where the first node index is the local node and the second is the index of the remote node. The node indexes are 16 bit integers. The Node Role is Hi_nrConstant.

There are 3 different configurations of the ValuateED Element that reflect different semantics of the Valuate command. When a section name does not contain System variables, the target EDID is known at compile time and this ID is assigned to the Node 3—RemoteEDID. The Node 2—CEDIPath is left Empty.

In the case when a section name contains System variables, the target EDID can not be determined at compile time but instead the CEDI path can be built at compile time, hence the following two subcases. In the case when the path to the target contains system variables and the target ED Path is relative, the Node 2 is the relative CEDIPath and Node 3=0. In the case when the path to the target contains system variables and the target ED Path is absolute (starting from root section), the Node 2—CEDIPath contains the absolute CEDIPath and Node 3< >0.

The Valuate Element is build in phase 3 based on the Valuate function. Each of the argument assignment expressions is expanded in a series of Elements resulting in an Assignment Element. The output node index of the Assignment Element is added in the first position of the pair. Then the remote parameter name is used to find the remote parameter node index, which is added in the second position of the pair. The process is repeated for all argument assignment expressions.

MoveED Element

The Move ED Function moves a saved ED to a specific location specified by an ED Path. The target location might be any ED, either BED or DED. The target ED should contain a CED of the same section (type) as the moving ED. The moving ED is removed from the CEDs of the hosting ED and becomes a new CED instance in the target ED.

The HiLDDE Syntax of the MoveED function is provided in the Table below.

| Ver | Function Syntax | Valuate Element Class |
|---|---|---|
| 1 | MoveED (<SysExp>, <EDPath>) | Hi_ecMoveED |
| 2 | MoveED (<EDSelQuery>, <EDPath>) | Hi_ecMoveED1 |

<EDPath> is a relative or absolute ED path defined as illustrated in FIG. 49.

<EDSelQuery>=<EDPath>[WhereExpression1,Index1]

WhereExpressionN specifies the selection criteria for identifying the ED. The selection criteria is a string expression that returns an SQL where clause search condition. Only node names of the current ED can be referred in the search condition. The valid node roles that can be referred in the selection criteria are state and input roles. All child EDs can be specified following the main ED along with their search conditions. The Child EDs should be specified in the same order as their hierarchy in the ED tree.

IndexN specifies the item index to be returned. In general more than one ED may satisfy the selection criteria.

<SysExp> is an expression that returns a variable of the type system.

The MoveED Function returns an integer which is the error code generated during the move operation. If no error, the return code is 0.

Example: MoveED Element

Figure 61:
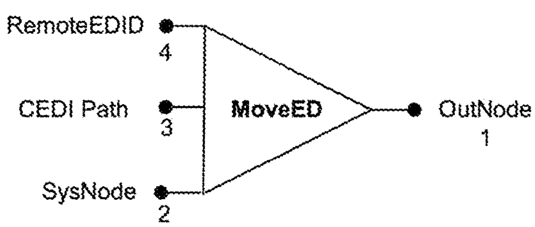
FIG. 61 is a schematic diagram of the Hi_ecMoveED Element, in accordance with one embodiment.

The Hi_ecMoveED Element is shown in FIG. 61.

The output Node is the return code of the valuation operation. Node Role is Hi_nrIntermediate.

The Node 2 attaches to an System node that cares the system to be moved. The Node Role is Hi_nrIntermediate.

The Node 3 is type Bin and carries the CEDI Path. The Node Role is Hi_nrConstant.

The Node 4 is type long integer and stores the RemoteEDID or the relative/absolute flag, depending on the element configuration. See Element configuration below. The Node Role is Hi_nrConstant.

There are 3 different configurations of MoveED Element that reflect different semantics of the MoveED command. When a EDPath does not contain System variables the target EDID is known at compile time and this ID is assigned to the Node 4 —RemoteEDID. The Node 3—CEDIPath is left Empty.

In the case when a EDPath contains System variables, the target EDID can not be determined at compile time but instead the CEDI path can be built at compile time, hence two following subcases. In the case when the EDPath contains system variables and it is relative, the Node 3 is the relative CEDIPath and Node 4=0. In the case when EDPath contains system variables and it is absolute (starting from root section), the Node 3—CEDIPath contains the absolute CEDIPath and Node 4< >0.

MoveED1 Element

Figure 62:
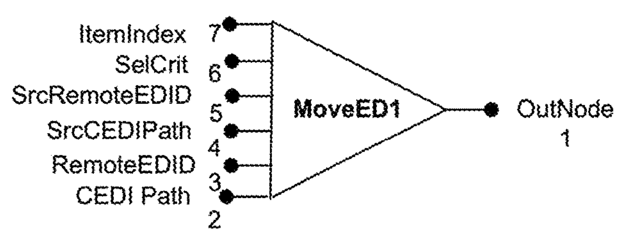
FIG. 62 is a schematic diagram of the Hi_ecMoveED1 Element, in accordance with one embodiment.

The Hi_ecMoveED1 Element is shown in FIG. 62.

The output Node is the return code of the valuation operation. Node Role is Hi_nrIntermediate.

The Node 2 is type Bin and carries the CEDI Path of the target ED. The Node Role is Hi_nrConstant.

The Node 3 is type long integer and stores the RemoteEDID of the target ED or the relative/absolute flag, depending on the element configuration. See Element configuration below. The Node Role is Hi_nrConstant.

The Node 4 is type Bin and carries the CEDI Path of the source ED. The Node Role is Hi_nrConstant.

The Node 5 is type long integer and stores the RemoteEDID of the source ED or the relative/absolute flag, depending on the element configuration. See Element configuration below. The Node Role is Hi_nrConstant.

The Node 6 is attached to the output node of the where clause expression. This is a string expression that returns a string in the format of the where clause of the SQL language and is used to identify the source ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

The Node 7 is integer value indicating the ED item index in the search result set. More than one ED may meet the search criteria so the index indicates which ED will be picked. This node can be of any type compatible with Integer. The Node Role is Hi_nrIntermediate.

There are 3 different configurations of node pairs 2-3 and 4-5 of the MoveED1 Element that reflect different semantics of the MoveED1 command.

When a EDPath does not contain System variables, the target EDID is known at compile time and this ID is assigned to the Node 3—RemoteEDID. The Node 2 —CEDIPath is left Empty.

In the case when a EDPath contains System variables, the target EDID can not be determined at compile time but instead the CEDI path can be built at compile time, hence the two following subcases. In the case when the EDPath contains system variables and it is relative, the Node 2 is the relative CEDIPath and Node 3=0. In the case when EDPath contains system variables and it is absolute (starting from root section) the Node 2—CEDIPath contains the absolute CEDIPath and Node 3< >0.

CopyED Element

The Copy ED Function copies a saved ED to a specific location specified by an ED Path. The target location might be any ED, either BED or DED. The target ED should contain a CED of the same section (type) as the moving ED. The moving ED is removed from the CEDs of the hosting ED and becomes a new CED instance in the target ED.

The HiLDDE Syntax of the CopyED function is defined as per the Table, below.

| Ver | Function Syntax | Valuate Element Class |
|---|---|---|
| 1 | CopyED (<SysExp>, <EDPath>) | Hi_ecCopyED |
| 2 | CopyED (<EDSelQuery>, <EDPath>) | Hi_ecCopyED1 |

<EDPath> is a relative or absolute ED path defined as illustrated in FIG. 49.

<EDSelQuery>=<EDPath>[WhereExpression1,Index1]

WhereExpressionN specifies the selection criteria for identifying the ED. The selection criteria is a string expression that returns an SQL where clause search condition. Only node names of the current ED can be referred in the search condition. The valid node roles that can be referred in the selection criteria are state and input roles. All child EDs can be specified following the main ED along with their search conditions. The Child EDs should be specified in the same order as their hierarchy in the ED tree.

IndexN specifies the item index to be returned. In general more than one ED may satisfy the selection criteria.

<SysExp> is an expression that returns a variable of the type system.

The CopyED Function returns an integer which is the error code generated during the move operation. If no error, the return code is 0.

Example: CopyED Element

Figure 63:
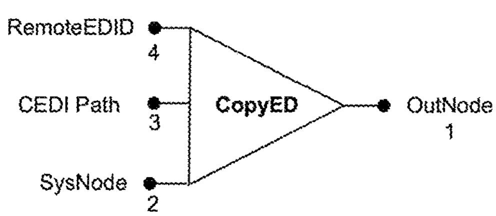
FIG. 63 is a schematic diagram of the Hi_ecCopyED Element, in accordance with one embodiment.

An example of the Hi_ecCopyED Element is shown in FIG. 63.

The output Node is the return code of the valuation operation. Node Role is Hi_nrIntermediate.

The Node 2 attaches to an System node that cares the system to be moved. The Node Role is Hi_nrIntermediate.

The Node 3 is type Bin and carries the CEDI Path. The Node Role is Hi_nrConstant.

The Node 4 is type long integer and stores the RemoteEDID or the relative/absolute flag, depending on the element configuration. See Element configuration below. The Node Role is Hi_nrConstant.

There are 3 different configurations of CopyED Element that reflect different semantics of the CopyED command. When a EDPath does not contain System variables the target EDID is known at compile time and this ID is assigned to the Node 4 —RemoteEDID. The Node 3—CEDIPath is left Empty.

In the case when a EDPath contains System variables, the target EDID can not be determined at compile time but instead the CEDI path can be built at compile time, hence the following two subcases. In the case when the EDPath contains system variables and it is relative, the Node 3 is the relative CEDIPath and Node 4=0.

In the case when EDPath contains system variables and it is absolute (starting from root section), the Node 3—CEDIPath contains the absolute CEDIPath and Node 4< >0.

CopyED1 Element

Figure 64:
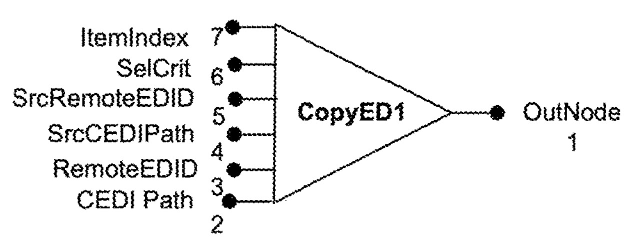
FIG. 64 is a schematic diagram of the Hi_ecCopyED1 Element, in accordance with one embodiment.

An example of the Hi_ecCopyED1 Element is shown in FIG. 64.

The output Node is the return code of the valuation operation. Node Role is Hi_nrIntermediate.

The Node 2 is type Bin and carries the CEDI Path of the target ED. The Node Role is Hi_nrConstant.

The Node 3 is type long integer and stores the RemoteEDID of the target ED or the relative/absolute flag, depending on the element configuration. See Element configuration below. The Node Role is Hi_nrConstant.

The Node 4 is type Bin and carries the CEDI Path of the source ED. The Node Role is Hi_nrConstant.

The Node 5 is type long integer and stores the RemoteEDID of the source ED or the relative/absolute flag, depending on the element configuration. See Element configuration below. The Node Role is Hi_nrConstant.

The Node 6 is attached to the output node of the where clause expression. This is a string expression that returns a string in the format of the where clause of the SQL language and is used to identify the source ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

The Node 7 is integer value indicating the ED item index in the search result set. More than one ED may meet the search criteria so the index indicates which ED will be picked. This node can be of any type compatible with Integer. The Node Role is Hi_nrIntermediate.

There are 3 different configurations of node pairs 2-3 and 4-5 of the CopyED1 Element that reflect different semantics of the CopyED1 command. When a EDPath does not contain System variables, the target EDID is known at compile time and this ID is assigned to the Node 3—RemoteEDID. The Node 2—CEDIPath is left Empty.

In the case when a EDPath contains System variables, the target EDID can not be determined at compile time but instead the CEDI path can be built at compile time, hence the two following subcases. In the case when the EDPath contains system variables and it is relative, the Node 2 is the relative CEDIPath and Node 3=0. In the case when EDPath contains system variables and it is absolute (starting from root section), the Node 2—CEDIPath contains the absolute CEDIPath and Node 3< >0.

SaveED Element

The Save ED Function saves the definition of a newly defined DED in the database. The DED is specified by a System variable.

The DED is saved as a Child ED in a target ED. A definition of a CED with the same Section_ID as the DED that is being saved should exist in the target ED, otherwise the save fails. In the syntax version 1, the target ED is the same ED where the SaveED function is valuated. In the version 2, the target ED is specified by <EDPath>.

The HiLDDE Syntax of the SaveED function is the following:

| Ver | Function Syntax | Valuate Element Class |
|---|---|---|
| 1 | SaveED(<SysExp>, <Exp>) | Hi_ecSaveED |
| 2 | SaveED(<SysExp>, <EDPath>, <Exp>) | Hi_ecSaveED1 |
| 3 | SaveED(<EDPath>, <EDPath>, <Exp>) | Hi_ecSaveED2 |

<EDPath> is a relative or absolute ED path defined as illustrated in FIG. 49.

<SysExp> is an expression that returns a variable of the type system.

The SaveED Function returns an integer which is the error code generated during the move operation. If no error, the return code is 0.

Example: SaveED Element

Figure 65:
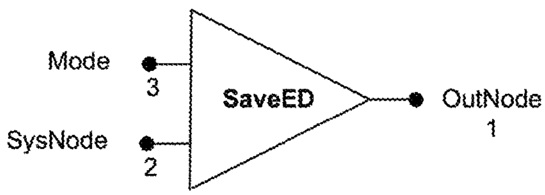
FIG. 65 is a schematic diagram of the Hi_ecSaveED Element, in accordance with one embodiment.

The Hi_ecSaveED Element is shown in FIG. 65.

The output Node is the return code of the valuation operation. Node Role is Hi_nrIntermediate.

The Node 2 attaches to an System node that caries the system to be saved. The Node Role is Hi_nrIntermediate.

Node 3 attaches to a string expression that returns "ref' or "val" which determines the save Mode by reference or value. Node 3 is string Hi_nrIntermediate.

SaveED1 Element

Figure 66:
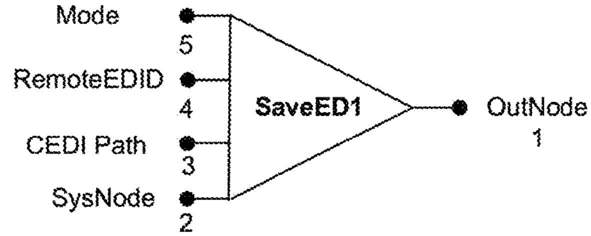
FIG. 66 is a schematic diagram of the Hi_ecSaveED1 Element, in accordance with one embodiment.

The Hi_ecSaveED1 Element is shown in FIG. 66.

The output Node is the return code of the valuation operation. Node Role is Hi_nrIntermediate.

The Node 2 attaches to an System node that caries the system to be saved. The Node Role is Hi_nrIntermediate.

The Node 3 is type Bin and carries the CEDI Path. The Node Role is Hi_nrConstant.

The Node 4 is type long integer and stores the RemoteEDID or the relative/absolute flag, depending on the element configuration. See Element configuration below. The Node Role is Hi_nrConstant.

Node 5 attaches to a string expression that returns "ref" or "val" which determines the save Mode by reference or value. Node 3 is string Hi_nrIntermediate.

There are 3 different configurations of SaveED Element that reflect different semantics of the SaveED command. When a EDPath does not contain System variables, the target EDID is known at compile time and this ID is assigned to the Node 4 —RemoteEDID. The Node 3—CEDIPath is left Empty.

In the case when a EDPath contains System variables, the target EDID can not be determined at compile time but instead the CEDI path can be built at compile time, hence the two following subcases. In the case when the EDPath contains system variables and it is relative, the Node 3 is the relative CEDIPath and Node 4=0. In the case when EDPath contains system variables and it is absolute (starting from root section), the Node 3—CEDIPath contains the absolute CEDIPath and Node 4< >0.

SaveED2 Element

Figure 26:
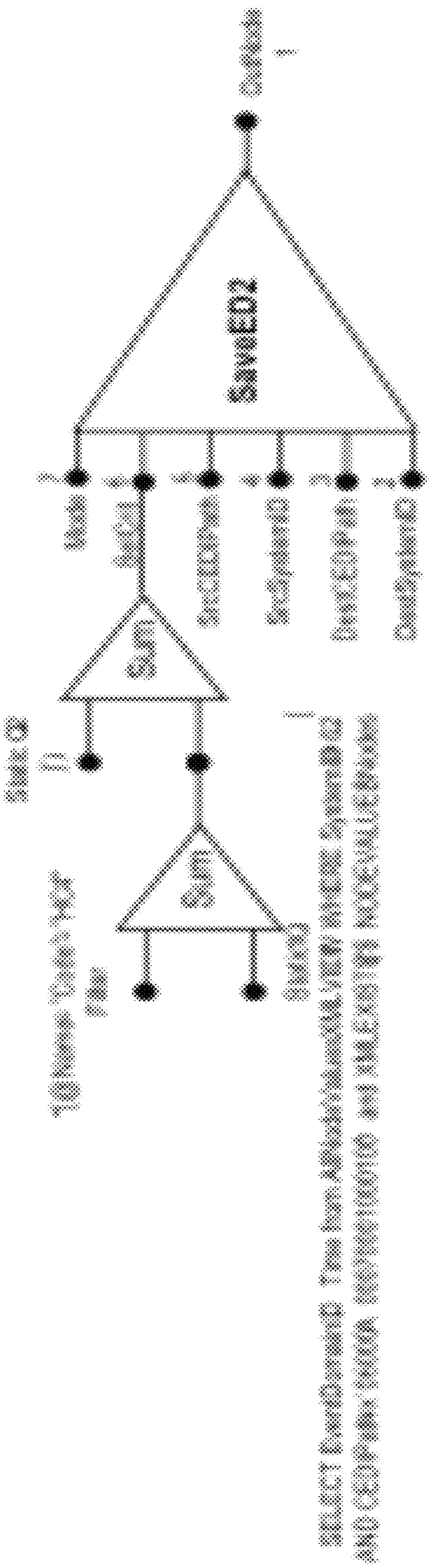
FIG. 26 is a graphical representation of a Hi_ecSaveED2 Element, in accordance with one embodiment.

The Hi_ecSaveED2 Element is shown in FIG. 26.

The output Node is the return code of the valuation operation. Node Role is Hi_nrIntermediate.

The Node 2 is the SystemID of the address where the system is to be save to. This is an integer note. The Node Role is Hi_nrConstant.

The Node 3 is type Bin and carries the CEDI Path. The Node Role is Hi_nrConstant.

The Node 4 is type long integer and stores the ChildIndex for the DED pointed by CEDIPath. The Node Role is Hi_nrConstant.

The Node 5 is attached to the output node of the where clause expression. This is a string expression that returns a string in the format of the where clause of the SQL language and is used to identify the target ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

The Node 6 is attached to the output node of the where clause expression. This is a string expression that returns a string in the format of the where clause of the SQL language and is used to identify the source ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

Node 7 attaches to a string expression that returns "ref" or "val" which determines the save Mode by reference or value. Node 3 is string Hi_nrIntermediate.

DeleteED Element

The DeleteED Function deletes a DED from the database. The DED to be deleted is specified in two ways. In the syntax version 1 it is specified by a system variable. In this case the DED needs to be in the memory before it is deleted. In the syntax version 2, the DED is specified by a query expression. In this case the DED will not be loaded in the memory.

The HiLDDE Syntax of the DeleteED function is the following:

| Ver | Function Syntax | Valuate Element Class |
|---|---|---|
| 1 | DeleteED(<SysExp>) | Hi_ecDeleteED |
| 2 | DeleteED(<EDSelQuery>) | Hi_ecDeleteED1 |

<SysExp> is an expression that returns a variable of the type system.

<EDSelQuery>=<EDPath>[WhereExpression1,Index1]

<EDPath> is a relative or absolute path composed as a sequence of Section Names and system variables separated by dots, as defined above.

WhereExpressionN specifies the selection criteria for identifying the ED. The selection criteria is a string expression that returns an SQL where clause search condition. Only node names of the current ED can be referred in the search condition. The valid node roles that can be referred in the selection criteria are state and input roles. All child EDs can be specified following the main ED along with their search conditions. The Child EDs should be specified in the same order as their hierarchy in the ED tree.

IndexN specifies the item index to be returned. In general more than one ED may satisfy the selection criteria.

The DeleteED Function returns an integer which is the error code generated during the move operation. If no error, the return code is 0.

Example ret=DeleteED(

ULPolicy.AgeParm.Item.["NodeName='age' and IntValue="+ToString(age)+" and IntTime="+ToString(1),1], ..Item.["NodeName='coi' and DecValue>"+ToString(10.2)+" and DecTime="+ToString(1),1]);

DeleteED Element

Figure 67:
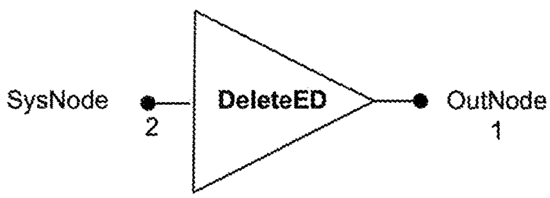
FIG. 67 is a schematic diagram of the Hi_ecDeleteED Element, in accordance with one embodiment.

The Hi_ecDeleteED Element is shown in FIG. 67.

The output Node is the return code of the valuation operation. Node Role is Hi_nrIntermediate.

The Node 2 attaches to an System node that cares the system to be moved. The Node Role is Hi_nrIntermediate.

DeleteED1 Element

Figure 68:
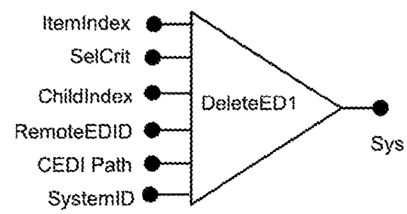
FIG. 68 is a schematic diagram of the Hi_ecDeleteED1 Element, in accordance with one embodiment.

The Hi_ecDeleteED1 Element is shown in FIG. 68.

The output Node is a System node of Hi_nrIntermediate Role.

The Node 2 is the SystemID of the Source system. The Node Role is Integer Hi_nrConstant. The SystemID=0 indicates the current system.

The Node 3 is type Bin and carries the CEDI Path. The Node Role is Hi_nrConstant.

The Node 4 is type long integer and stores the RemoteEDID or the relative/absolute flag, depending on the element configuration. The Node Role is Hi_nrConstant.

There are 3 configurations on the nodes 3 and 4. When an EDPath does not contain System variables, the target EDID is known at compile time and this ID is assigned to the Node 3—RemoteEDID. The Node 2—CEDIPath is left Empty.

In the case when an EDPath contains System variables, the target EDID can not be determined at compile time but instead the CEDI path can be built at compile time, hence the two following subcases. In the case when the path to the target contains system variables and the target ED Path is relative, the Node 2 is the relative CEDIPath and Node 3=0. In the case when the path to the target contains system variables and the target ED Path is absolute (starting from root section), the Node 2—CEDIPath contains the absolute CEDIPath and Node 3< >0.

The Node 5 is an integer node of Hi_nrConstant Role that caries the ChildIndex where the returning ED will be hosted in the parent ED.

The Node 6 is attached to the output node of the where clause expression. This is a string expression that returns a string in the format of the where clause of the SQL language and is used to identify the target ED. The where clause expression uses references to the nodes of the current Section, including the built-in nodes like Time, Mode etc. Only the node names references are allowed in the where clause expression. The System name and Section name are already identified. The "where" token is not needed. The node type is string. The Node Role is Hi_nrIntermediate.

The Node 7 is the attached to the output node of the TimeExpression. This node can be of any type compatible with Integer. The Node Role is Hi_nrIntermediate.

The Node 8 is the attached to the output node of a parent GetED or GetCED element. This node is of type System. The Node Role is Hi_nrIntermediate.

Iff Element

Figure 69:
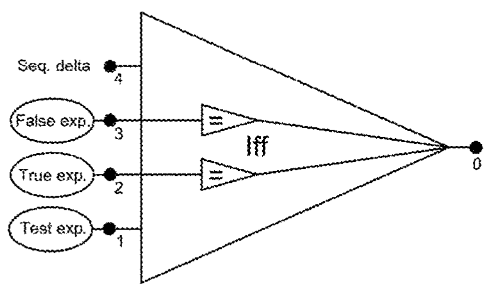
FIG. 69 is a schematic diagram of the Iff Element, in accordance with one embodiment.

The Iff Element is schematically illustrated in FIG. 69.

The output Node 0 is a node of any type and matches the type of node 2 and 3. The node role is Hi_nrIntermediate.

The Node 1 is Boolean node that is connected to the output node of the final element that returns the result of the test condition. The node role is Hi_nrIntermediate.

The Node 2 is a node of any type that is connected to the output node of the final element that returns the result of the expression to be valuated and returned when the condition is true. The node role is Hi_nrIntermediate.

The Node 3 is a node of any type that is connected to the output node of the final element that returns the result of the expression to be valuated and returned when the condition is false. The node role is Hi_nrIntermediate.

The Node 4 is type integer and stores the sequence delta, which indicates the number of elements in valuation sequence to jump in order to reach the beginning of the false expression sequence. The Node Role is Hi_nrConstant.

Valuation Sequence of Iff Function

The composition of the valuation sequence for the Iff Function is summarized in the table, below.

| Block description | Val Seq | |
|---|---|---|
| Test expression | it1<br>it2<br>. . .<br>itn | |
| Iff Element | | |
| Val Seq of True expression | it1<br>it2<br>. . .<br>itn | Valuation sequence of the True expression |
| Identity element | ii1 | Identity Element to transfer the output of the True expression to the output of the Iff Element |
| GoTo Element | ig | GoTo Element to transfer past the end of the val seq of Iff Element |
| Val Seq of False expression | if1<br>if2<br>. . .<br>ifm | Valuation sequence of the False expression |
| Identity element | ii2 | Identity Element to transfer the output of the False expression to the output of the Iff Element |

GoTo Element

The GoTo Element has only one integer output node with role constant. When it's valuated it causes the valuation index to jump by the number stored in the output node.

Figure 70:
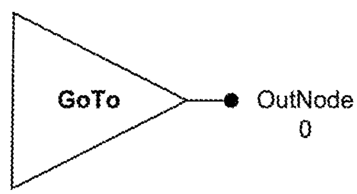
FIG. 70 is a schematic diagram of the GoTo Element, in accordance with one embodiment.

The role of the GoTo Element is Virtual, and depicted in FIG. 70.

EDANRef—ED and Node Reference Element

The ED or Node reference element provides a reference to an ED location and in addition may specify a Node in that ED. The output of the EDANRef element is a system variable representing an ED that exists in the specified location or a scalar variable that represents the value of the referred node that exists in one of the EDs in the specified location. The EDANRef plays the role of the foreign key reference in a relational database.

Figure 71:
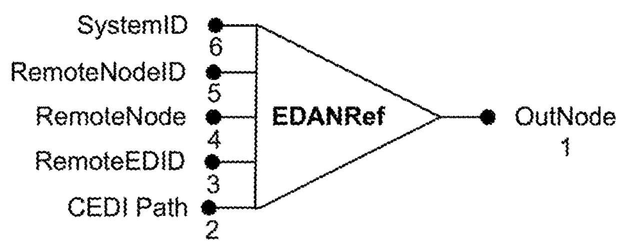
FIG. 71 is a schematic diagram of the EDANRef element, in accordance with one embodiment.

An EDANRef element (illustrated in FIG. 71) is generated when the declaration of an input interface item has the form below.

Section <Section Path>
  input
    <Node Path><Node Name> where <see 1.> is a path to an ED node that is not a system type.

Scalar Node Reference Example

Section ULPolicy.Policy.RPCov.CASHVAL.
  input
    ULPolicy.Policy.RPCov.Withdrawal→CRPWA
      CRPWA System Node Reference Example Section ULPolicy.Policy.RPCov.CASHVAL.
  input
    ULPolicy.Policy.RPCov.Withdrawal→Withdrawal When the target node in the <Node Path> is a system variable, the EDANRef is configured to point to an ED in the specified location and it's output node is a system node that will be assigned with the value of the selected ED. When the target node is a Node of an ED then the configuration of EDANRef provides information about the pointed node. In this case the output node has the same type and value as the pointed node in one of the EDs in the pointed location.

The EDANRef element is an Hi_erInputInterface role.

The Output Node of the EDANRef Hi_nrIntermediate role and can be of any type. This node will generate a Variable node with the name specified in the input interface. This node will be valuated during the Valuate call with the value of the parameter with the same name as the variable.

The Node 2 is a Bin node of Hi_nrConstant Role. It carries the CEDI Path of the remote ED.

The Node 3 is an long integer node of Hi_nrConstant Role. If the element if configured for pointing to a scalar node the value of this node is NodeID for the remote node. If the element is configured to return an ED, the node value is −1.

The Node 4 points to an internal Node in the current ED. The Role of this node is Hi_nrIntermediate. The Node Type can be any type and is the same as the remote Node.

The Node 5 is the Remote Node ID. This is a Hi_nrConstant integer.

The Node 6 is the System ID of referred system. If the reference is on the same system the SystemID=0. The node is Hi_nrConstant integer.

When valuated, the EDANRef element will pass the value of the node 4 to the node 1.

Optionally, if the integrity checking is enabled, the element will check if the value provided in node 4 exits in the specified ED location.

ParmInit

Figure 72:
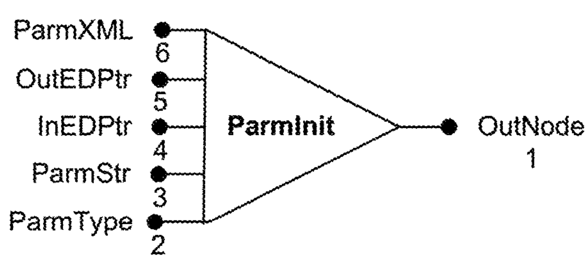
FIG. 72 is a schematic diagram of the ParmInit element, in accordance with one embodiment.

ParmInit (illustrated in FIG. 72) initializes the input parameters of ED based on the arguments provided in the valuation call. The ParmInit role is ParmInit.

ParmInit is not a regular element. It doesn't valuate the output node. Instead, it updates the values of input nodes of OutEDPtr ED specified in ParmStr or parmXMl with the values provided in InEDPtr or ParmXML. ParmInit is placed in a specific position in the valuation sequence, right after the elements of role DefInit. The ParmType determines one of two ways to do the input node initialization. Input arguments are provided in the InEDPtr ED and ParmStr contains references of the argument node IDs in InEDPtr as well as the corresponding input parameter nodes in OutEDPtr; or input arguments and references of input nodes are specified in an XML-formatted string that is provided in ParmXML node.

The input nodes of the element are initialized by the calling ED while the element itself is valuated in the called ED. The reason for this is that the initialization of the input nodes should take place only after the initialization of these nodes with default values.

The ParmInit element should have ID 0 in Elements vector, so it can easily be accessed in runtime.

The ParmInit element is an Hi_erParmInit role.

The Output Node of the ParmInit is an Hi_nrIntermediate role integer.

The Node 2 is an Hi_nrIntermediate role integer. The value 1 indicates initialization from calling ED and value 2 indicates initialization from the XML file.

The Node 3 is an Hi_nrIntermediate role long integer that contains a pointer address to the string that contains references to argument nodes in the calling ED and input nodes in the called ED.

The Node 4 is an Hi_nrIntermediate role long integer that contains a pointer address of the Calling ED.

The Node 5 is an Hi_nrIntermediate role long integer that contains a pointer address of the Called ED.

The Node 6 is an Hi_nrIntermediate role long integer that contains a pointer address to the wstring with XML content that contains references of the input nodes in the called ED as well as values of the respective arguments.

Event Domains and Subsystem Instances

The Event Domain is a single event Subsystem whose structure is defined by the corresponding Section. While Section Object is a definition of a Subsystem that contains HiLDDE code elements, the Event Domain is the runtime instance of the Subsystem. The Event Domain contains data members (Nodes) as well as code elements (Elements and Valuation Sequence). The Elements and Valuation Sequence are common members for all Event Domain instances of the same definition (Section) while the Nodes are specific for each instance.

In comparison to Object Oriented Programming, the Section is similar to a Class and Event Domain is similar to a Class Instance (Object).

The Event Domain contains the following data members, as itemized in the following Table.

| Data member | Description |
|---|---|
| EventDomainID | Unique Event Domain identifier in System level |
| SectionID | SectionID of the defining Section. Unique in System level. |
| Elements | Pointer to the Vector of Elements of the Base Event Domain |
| Nodes | Vector of Node Values of all Nodes of Event Domain |
| Valuation Sequence | Pinter to the Valuation Sequence of the Base Event Domain |
| Child Event Domains | Vector of pointers to Child Event Domains |
| Parent | Pointer to the Parent Event Domain |
| EventIndex | The Index of the Domain's Event in the Parent Event Domain |
| Time | Event Domain Time |
| Mode | Event Domain Mode |

All Event Domain IDs that have the same definition (or are defined by the same Section) share the same SectionID. SectionID is used to identify the Definition or Section of the Event Domain.

Base Event Domains (BEDs)

The BEDs are created during the compile time for each Section. This is done in Stage 2, after the First Pass and before the Second Pass in the BuildEventsTree routine. For each Section the Child Sections are scanned and for each Child Section a Base Event Domain is created. For this reason the Child Sections and corresponding Base Event Domains appear on the same order. The Nodes member of the Base Valuation Sequence is populated in Stage 2 after BuildEventsTree by GenerateNodeIDs routine. All Child Sections are scanned and for each of them an entry is created in the EventNodes vector for the corresponding Section Event. This causes the Child Sections to be in the same sequence as the corresponding events in EventNodes vector. New Elements and Valuation Sequence empty objects are created and assigned to the Base Event Domain. The Elements member of the Base Event Domain is populated during the Stage 3—Second Pass. The Valuation Sequence member of each Base Event Domain is populated after the System Population by Analyze Topology routine of TopologyAnalyses class.

The BEDs are saved in the database during the compile time using the Save method of System class. When a BED is saved all data members of the BED are also saved in the database. This includes Nodes, Elements and ValuationSequence vectors as well as all BEDs in CEDs map recursively.

Dynamic Event Domains (DEDs)

The DEDs are created during the runtime using HiLDDE's New( ) or Get( ) functions. The BED name and DEDs Event name are passed to the New( ) function as run time parameters. HiRuntime creates DEDs using CreateDED method which uses CloneInstance method of the EventDomain class to create o clone of BED. Cloning consist in creating a replica of BED instance with the following characteristics: The Event DomainID, Nodes, ChildEventDomains, EventIndex, Time and Mode members of DED are new members and contain specific information related to DED instance; the values of DED Nodes vector are initialized to the values of BED Nodes; the Elements, ValuationSequence members point to the same objects as the BED; and the SectionID of DED is the same as BED.

Figure 27:
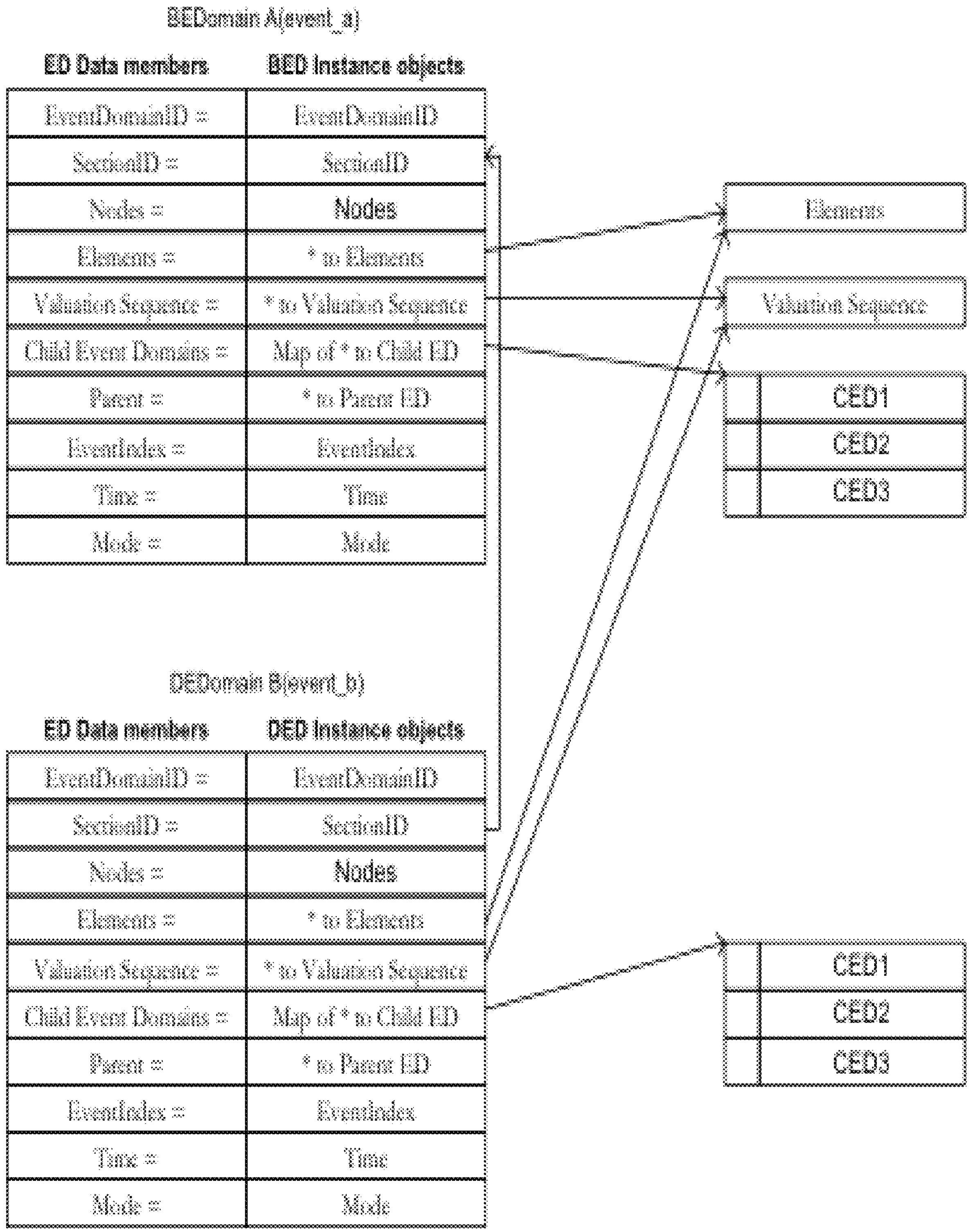
FIG. 27 is a schematic diagram of BED and DED instances, in accordance with one embodiment.

FIG. 27 provides a schematic diagram of BED and DED instances.

The DEDs are saved during the runtime, immediately after their creation by CreateDED method of HiRuntime. The saving of DEDs in the database consists in creating a new ED record in EventDomains table using SaveEventDomains as well as new Nodes records in Nodes vector. The DED Elements and ValuationSequence are not saved as those are the same as BED. The NodeValues of various types are saved in HiRuntime for both BED and DEDs during the process of Node valuations.

Child Event Domains Map

Figure 28:
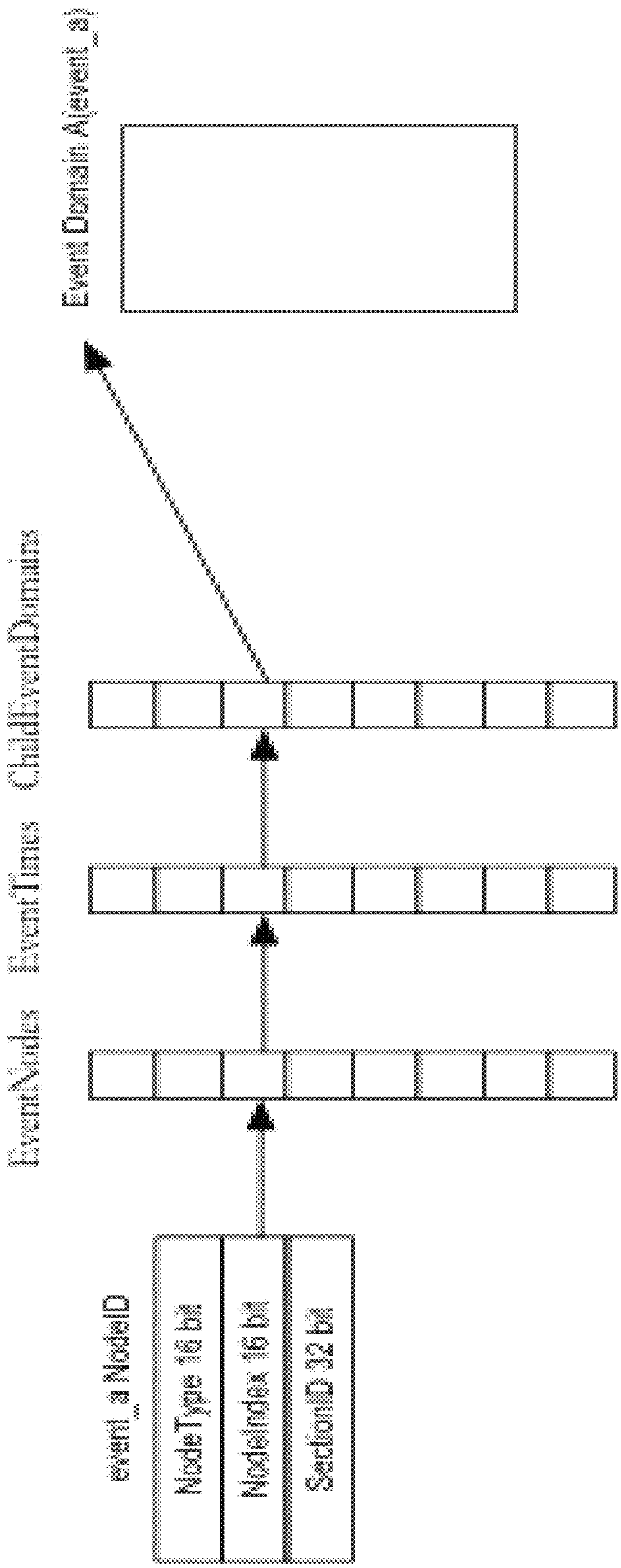
FIG. 28 is a schematic diagram of an Event Node to Child Event Domain relation, in accordance with one embodiment.

The Event Domain can contain any number of Child Event Domains (CED). The pointers to Child Event Domain objects are stored on the ChildEventDomains map using the NodeIndex of the corresponding Event Node as a key. FIG. 28 provides a schematic diagram of an Event Node to Child Event Domain relation.

```
typedef hash_map <NodeIndexT, EventDomain*>
    tChildEventDomains; tChildEventDomains ChildEventDomains;
```

There are two types of Child Event Domains. The Static ED (SED) are also called Base ED and are created during the compile time for each of the Sections. The Dynamic ED (DED) are additional instances that correspond to a System Node. The DED entry in the CED vector is created dynamically at runtime by CreateDED Method. Further details are provided below.

Event Domain Dynamics

In the instantly disclosed implementation, an Event Domain can be in one of three possible modes: Record, Play and Read.

In Record mode, the Event Domain will create a new state based on the existing state and new input. The new Time of the ED is obtained from the database and the state and input is saved. In Record mode the Time of the ED cannot be set to an arbitrary value. The Time can only be advanced by calling GetNextEDTime function, in which case the function will generate a new ED Time.

In Play mode, the input and state of the ED will be obtained from the database based on the ED Time. The elements other than input and state will be valuated. The input and state is not saved in the database. In Play mode the ED Time can be set to an arbitrary value. The next Time can be obtained by calling GetNextEDTime, in which case the function will return the next ED Time available in the database. If the last state is reached the GetNextEDTime will return <last state> code.

In Read mode the Event Domain will read the state variables from the database based on the current ED Time. The elements will not be valuated and the input and state are not saved. In Play mode the ED Time can be set to an arbitrary value. The next Time can be obtained by calling GetNextEDTime, in which case the function will return the next ED Time available in the database. If the last state is reached the GetNextEDTime will return <last state> code.

The Mode is set in runtime using the Mode initialization assignment event.Mode=expression in the Parent Event Domain where event is the Domain's event variable. The default Mode is Record.

The lifetime of BED and DED instances during the runtime is different. BEDs are created by the compiler or loaded from the database when the system object is loaded and remains in the memory until the system object is destroyed. The new instances of DED are created in memory by CreateDED method when HiLDDE New( ) or Get( ) is used. The instance of DED remains in the memory until the next call of the same New or Get function or until the system object is destroyed. Every time a new DED is created the old instance is deleted from the memory first. However, the DED data are not lost as those are already saved to the database immediately after creation or update.

The DED instance is loaded from database when the Get( ) function is called. If an instance of DED has been created earlier by a previous call of the same Get( ) function, the old instance will be deleted first and removed from CED vector. The new instance will be created and added to the CED vector using the corresponding EventIndex as a key as well as in EventsTree map using EDID as a key. A loaded DED doesn't need to be saved back to the database as it's structure doesn't change during program execution. The only DED member that is changing is Nodes values that are automatically saved based on the NodeType. The load of DED from the database is done by GetDED method of HiRuntime class and consists in 1) deleting the existing DED assigned to the Get( ) function; 2) creating the DED by a Section cloning process; and 3) then populating the following:

1. Identifying the EDID Based on Node Values.

User Function implementation

```
//FuncDec
// Type
// integer:integer
// Function:Function
// ID
// ID:Funct4
// (:(
// ParList
// Type
// decimal:decimal
// LocVar
// ID:c
// ,:,
// . . . .
// ):)
// Block
```

The Function is treated as an Element that is mapped to a virtual BED. The calling function is seen as an Element of a specific Class that is created during the compile time. The Function code is handled as a Section that is created also during the compile time as a child of the main section. The Function arguments are seen as Element's input Nodes and mapped to Section's Input Interface. The Section's output interface is mapped to Function's return value which in turn is the value of the output node of the Function Element.

Compile Time:

During the first pass a new Section the represents the function is added in the root section. The function body is the section body. An output interface is added to the section. This represents the return value of the function. Then a new Element Class is added in the ElementDefVec. The Class Token and Class Description are set to Function Name. The Class Role is set to Intermediate. The Output Node Type of the Class is the Function return type. The first input node of the element is a constant integer that will be assigned to the SectionID representing the function. The other Input Node Types of the Element are the function parameter types in order of appearance. Since the element node definitions match the input parameter types and names, the compiler will treat the element as a predefined element during the processing of elements in the second pass.

All the functions, regardless of where they are keyed in the code, become children of the root section and must have unique names. In some embodiments, Function overrides (i.e. with the same name but different signature) may be allowed upon introducing a Functions Map in the SectionsTree class. The Function ID, Class ID>Hi_ecLastElement, is reserved for User Defined Functions and is created using the following components. The function section will have one Output Interface Node with the same name and type as the Function. For each of the Function parameters a new Input Node is created in the NodesData collection of the Function's virtual Section. These input nodes will be on top of Nodes vector of the virtual section and will have one to one correspondence to the Function parameters.

During runtime, the Class ID>Hi_ecLastElement indicates a user function. Then the BED ID is retrieved from the first input node of the element.

The virtual Function Section is populated during the second pass using the existing PopulateBlock code.

An Element of a Function's Class is created during the second pass. The second node of the element is populated with the Section ID (which is the same as the BED), which is found using the functions name (same as the section name). The rest of the element nodes are created automatically as they would for a pre defined element. This is because a matching Element Class for the function has already been created during the first pass from the function declaration.

During the Topology Analyses stage the Function's virtual section is analysed as a Section and a valuation Sequence is generated and associated with it. Seeing the calling Function as an Element of a specific class is necessary to use the existing logic for properly parsing the Function Element and its argument returning expressions. In the calling syntax, the function parameters can be any expression.

During runtime, the values of the input nodes of the Function Element are passed to the values of the Input Interface Nodes of the PS. Then the function is valuated as a normal Section. The value of the Section's Output Interface is passed to Function's Element output Node.

Recursion Implementation

Recursion is the valuation of the same ED repetitively until a certain condition is met. In HiLDDE, the recursion is triggered by valuating to true the Section's Event. It is important to notice that the recursion is triggered inside the Section that is being valuated rather than outside of it. In the HiLDDE code, the recursion is coded by valuating to true the Section's Event Node inside of Sections code. For example:

```
Section ArrayEx.COILoad.(COILoad)
{
  . . . .
  COILoad=Iff(age< >" ",true,false);
  . . . .
}
```

The ED's Event node is a special Event Node that is found in the first position of the EventNodes vector.

The valuation of an ED when its Event Node is set to true inside the ED is treated differently from the case when Event Node is set to true outside of the ED. This is to avoid a large (or infinite) number of recursive calls of ValuateEventDomain method in HiLDDE runtime class HiRuntime, which could cause a stack overflow. To achieve that, the Assignment Element Role is set to Hi_erRecursion when it is used to valuate the EDs Event Node inside the ED. When the Hi_erRecursion role is detected for this element, instead of recursively calling ValuateEventDomain method with the current EDID, the HiRuntime simply turns the event ON and restarts valuating the current Valuation Sequence by setting the CurElIndex to 0. The recursive Assignment Element is identified in PopulateAssignStm function of Populate routine by comparing NodeName with Section's NodeName. If those match the Element's Role is set to Hi_erRecursion.

Initialization

Initialization of Intermittent, State and Input variables is allowed during declaration. Only constants can be used to initialize variables. Initialization assigns the specified default value of the variable. The assignment of the default value takes place every time the ED is valuated. The sequencing of the initialization is explained below. An intermittent or state variable that has been assigned a default value can not be valuated in the code because it's considered already valuated. The default value will be overwritten by the argument when the variable is specified as input parameter. If no argument is provided during the valuation call of the ED the input variable will use it's default value. The state variables can be initialized during the ED valuation call if their name is specified in the argument list of the valuation call. The argument list of the valuation call can contain input and state variables, any of them or none in any order. Previous state variables cannot be assigned default value or be initialized. This is because the previous variable will be assigned the value of the state variable during the initialization of ED valuation.

The assignment of default value to a state variable is different from initialization. The default value is assigned every time the ED is valuated. The initial value is assigned to the state variable only once, as the initial value of the variable at state 0.

Below is an example of assigning the default value to an Intermittent variable.

```
Section ULPolicy.Policy.
  {
    decimal ADBR=1,
      ADBR1;
    ADBR1=ADBR+1;
  }
```

Below is an example of assigning the default value to a state variable. This will cause the state variable to have the same value (1) during all ED valuations.

```
Section ULPolicy.Policy.
  {
    decimal ADBR=1 previous ADBR_p;
    // 'ADBR=ADBR_p+1' can not be specified
  }
```

Initializing a State Variable Through an Input Argument

The valuation call from ULPolicy.Illustration. will cause the state variable to have the initial value of 1. In the next valuation call from within ULPolicy.Policy. the ADBR state variable will have the initial value 2.

```
Section ULPolicy.Policy.
  {
    decimal ADBR previous ADBR_p;
    ADBR=ADBR_p+1;
    ret=Valuate(ULPolicy.Policy.);
  }
Section ULPolicy.Illustration.
  {
    ret=Valuate(ULPolicy.Policy.,
      ADBR=1);
  }
```

Initializing the Input Variable Via Default Value and Input Arguments:

In the first valuation call from ULPolicy.Illustration. the ADBR variable is initialized with the default value 1 as the input variable is not specified in the calling arguments. In the second valuation call from ULPolicy.Illustration. the ADBR variable is initialized with the specified value 15 of the input argument, which overrides the default value.

```
Section ULPolicy.Policy.
  Input decimal ADBR=1;
  {
    decimal ADBR1;
    ADBR1=ADBR+1;
  }
Section ULPolicy.Illustration.
  {
    ret=Valuate(ULPolicy.Policy.);
    ret1=Valuate(ULPolicy.Policy.,
      ADBR=15);
  }
```

Initialization of a State Variable

The value of the init specification is assigned only once to the state variable ADBR as its initial value at state 0. The valuation call from ULPolicy.Illustration. will change the state variable value to 2 in the state 1.

```
Section ULPolicy.Policy.
  {
    decimal ADBR previous ADBR_p init 1;
    ADBR=ADBR_p+1;
  }
Section ULPolicy.Illustration.
  {
    ret=Valuate(ULPolicy.Policy.);
  }
```

The sequence of the initialization during the ED valuation is explained below.

Preservation of Foreign References

The following entities are used as foreign references and as such their IDs should be preserved when a new version of the system is compiled.

SystemID
EventDomainID
SectionID
Child Event Domain Iindex (CEDI)
Node Index (for Variable nodes only, not for Internal nodes)

To achieve this, all structures that are used to store those objects should be maps using the object's ID as a key. When a new item is added, the existing item is first checked in the existing system using the item's Name. If an existing item is found, the existing ID is used to create the new one.

Internal nodes are not used for foreign references as those are invisible from the HiLDDE code, so any ID can be used for those and these IDs do not need to be consistent from version to version of the same system. In order to avoid conflicting with Variable nodes, negative numbers are used for Internal IDs and positive numbers for Variable IDs. Node ID 0 is reserved and means undefined.

Section Functions

```
Section ._SimpleForm2.=(self over Section(System.Controls.VisualControl.))
{
  Section ._Valuate.=(self over Section(System.Controls._Command.))
  {
  }
  Section ._Delete.=(self over Section(System.Controls._Command.))
  {
  }
  Section ._Print.=(self over Section(System.Controls._Command.))
  {
  }
  Section ._Export.=(self over Section(System.Controls._Command.))
  {
  }
}
```

TransferElement

The TransferElement transfers an assignment element and the associated expression in the valuation sequence from SrcElements in the DestSec Elements vector.

TransferElements

Transfers Elements from SrcSec/SrcED to DestSec/DestED.

TransferElements1

Transfers Elements from SrcSec/SrcED to DestSec/DestED including child sections. SrcSec and DestSec must have the same subsection structure RemoveAssignElement Removes an assignment element and the associated expression RemoveAssignElementNodes Removes the internal nodes associated with the assignment element expression TransferElementNodes Transfers element nodes from SrcEl in SrcSec into CurEl in current section.

TransferElParamaters

Figure 73:
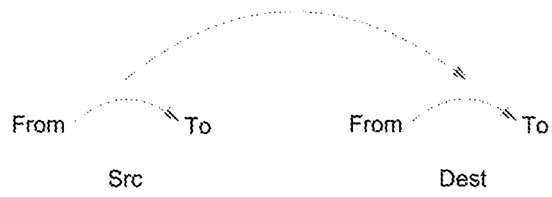
FIG. 73 is a flow diagram illustrating the TransferCEDIPathAndRemEDID, in accordance with one embodiment.

Remap parameter indexes from SrcSec to DestSec Coordinate transformations take place on Elements with interfaces:

ValuateED
ValuateED1
NewED1
NewED3
GNV
IIE
EDANRef
GetED
SaveED1
TransferCEDIPathAndRemEDID Transfers CEDIPath and RemoteEDID parameter Element nodes from SrcSec/SrcED to DestSec/DestED (as illustrated in FIG. 73)

```
ErrT Populate::TransferCEDIPathAndRemEDID(Section *SrcFromSec, Section *DestFromSec,
EventDomain *SrcFromED,
  EventDomain *DestFromED, HiBinT *SrcCEDIPath,
    EventDomainIDT *SrcRemEDID,HiBinT *DestCEDIPath,
  EventDomainIDT *DestRemEDID, EventDomain **SrcToED, EventDomain **DestToED,
  Section **SrcToSec, Section **DestToSec, bool RemoveRefs, EDSystem *ToSys,EDSystem *SrcSys)
SrcFromSec:
  Section.Locations._Login_right.Security_Login_.
  {
    // Get the user Account
    Account=GetED (Security.Accounts.Account→
      ["@Code=\" "+UserID+"\" and @Time=0",1]);
  }
DestFromSec:
  Section.Locations._Login_right._self_over_Security_Login_.
  {
    // Get the user Account
    Account=GetED (Security. Accounts. Account→
      ["@Code=\" "+UserID+"\" and @Time=0",1]);
  }
```

TransferParmStr

Transfers Parm str SrcSec to DestSec

List of Section Functions

SecFunc_OpOver

SecFunc_OpSelf—Returns the child section "_self" from ParentSec

SecFunc_Section—Returns the child section "_self" from ParentSec

SecFunc_Equal—Copies the content from RightSec to OutSec

How the HiLDDE Compiler works

Population

The population will use the parsed source code to populate the System's Collection with structured data. The system collections to be populated are:

```
System
  Sections        // Collection of sections
    Elements
    Interfaces
  Elements        // Collection of elements
  ElementIDs      // Collection of Element IDs
  NodesData       // Collection of raw Node Data
  NodeIDs         // Collection of Node IDs
  Nodes           // Collection of Node Values and all other node data
```

In the instantly described implementation, the collections are populated in stages, as follows:

Stage 1: Populate System, Sections, partially NodesData, partially Interfaces

Stage 2: Complete NodesData and Interfaces and populate Nodes and NodeIDs.

Stage 2.1: Generate EventIDs of Event nodes and populate Nodes, NodeIDs and remaining NodesData fields for Event nodes only.

Stage 2.2: Populate Nodes and NodeIDs and remaining NodesData for all other types of nodes, except Event.

Stage 2.3: Populate NodeID information in Interfaces collection.

Stage 3: Populate Elements

Stage 1

During the first stage, the data structures listed in bold/italic in the following structure table are populated with raw data from the parsed source code.

| | |
|---|---|
| System | |
| ***SystemID*** | |
| ***SystemName*** | |
| Sections | // Collection of sections |
| Elements | // Collection of section elements |
| ***Interfaces*** | ***// Collection of section interfaces*** |
| ***LocalNode*** | |
| ***NodeName*** | ***// The string name of the node.*** |
| ID | // Node ID is built later by topology analyzer |
| ***EventName*** | ***// The string name of the event.*** |
| EventID | // Event ID is built later by topology analyzer |
| ***EventOffset*** | ***// The offset of the event counter (+1,+2 . . . )*** |
| ***SectionName*** | ***// The name of the section where the node is found.*** |
| ***RemoteNode*** | |
| NodeName | ***// The string name of the node.*** |
| ID | // Node ID is built later by topology analyzer |
| EventName | ***// The string name of the event.*** |
| EventID | // Event ID is built later by topology analyzer |
| EventOffset | ***// The offset of the event counter (+1,+2 . . . )*** |
| SectionName | ***// The name of the section where the node is found.*** |
| ***InterfaceType*** | ***//output,input,inout*** |
| Elements | // Collection of system elements |
| ElementIDs | // Collection of all Element IDs in the system |
| ***NodesData*** | ***// Collection of raw Node Data*** |
| ***NodeName*** | ***// The string name of the node. This is captured from the parser.*** |
| ***ID*** | ***// Node ID is built later by topology analyzer*** |
| Full | //This is unique node identifier |
| ***Parts*** | |
| ***NodeType*** | ***//Node type can be 0 to 255*** |
| EventIndex | //Event Index can be 0 to 255. This is the index in the Events vector |
| NodeIndex | //Node index can be 0 to 65,535. This indicates the index in Node's vector |
| ***EventName*** | ***// The string name of the event. This is captured from the parser.*** |
| ***EventID*** | ***// Event ID is built later by topology analyzer*** |
| Full | //This is unique node identifier |
| ***Parts*** | |
| ***NodeType*** | ***//Node type can be 0 to 255*** |
| EventIndex | //Event Index can be 0 to 255. This is the index in the Events vector |
| NodeIndex | //Node index can be 0 to 65,535. This indicates the index in Node's vector |
| ***EventOffset*** | ***// The offset of the event counter (+1,+2 ...)*** |
| ***SectionName*** | ***// The name of the section where the node is found.*** |
| NodeIDs | // Collection of all Node IDs in the system |
| Nodes | // Collection of Node Values and all other node data |

The First Pass of parse tree scanning is targeting the Node Definitions as well as Section Interfaces. Due to the Descriptive nature of the program code, the declarations and statements do not appear in a fixed order. Although all Nodes need to be declared, the statements may appear before the declaration of the Nodes they involve. As such the whole code needs to be scanned for Node Declaration and Interfaces sections.

Stage 2

During the second stage, the Nodes and NodeIDs collections are populated as well as NodesData collection completed with missing data. The second stage consists in three sub stages, as introduced above.

Sub stage 1 (2.1) generates EventIDs of Event nodes and populates Nodes, NodeIDs and remaining NodesData fields for Event nodes only. The NodesData collection is scanned for Event nodes only. The unique identifier key of an Event node consists of two fields: SectionName and NodeName.

For each Event node of NodesData collection item the previous Event items of the collection are scanned for a match of the key. If a match is found, a "Duplicate Node Declaration" error is produced. Otherwise:

Add a new node of Type Event in the Node collection, which generates the NodeIndex;

Complete the ID.NodeIndex information in the NodesData collection item. NodeID is now completed with 2 parts that are needed for Event Nodes: NodeType and NodeIndex. The EventIndex is 0; and Add the NodeID in the NodeIDs collection.

Below is a tabled representation of the data structure after Stage 2.1, showing evolution in bold/italic/underline:

| | |
|---|---|
| System | |
| ***SystemID*** | |
| ***SystemName*** | |
| Sections | // Collection of sections |
| Elements | // Collection of section elements |
| ***Interfaces*** | ***// Collection of section interfaces*** |
| ***LocalNode*** | |
| ***NodeName*** | ***// The string name of the node.*** |
| ID | // Node ID is built later by topology analyzer |
| ***EventName*** | ***// The string name of the event.*** |
| EventID | // Event ID is built later by topology analyzer |
| ***EventOffset*** | ***// The offset of the event counter (+1,+2 ...)*** |
| ***SectionName*** | ***// The name of the section where the node is found.*** |
| ***RemoteNode*** | |
| ***NodeName*** | ***// The string name of the node.*** |
| ID | // Node ID is built later by topology analyzer |
| ***EventName*** | ***// The string name of the event.*** |
| EventID | // Event ID is built later by topology analyzer |
| ***EventOffset*** | ***// The offset of the event counter (+1,+2 ...)*** |
| ***SectionName*** | ***// The name of the section where the node is found.*** |
| ***InterfaceType*** | ***// output,input,inout*** |
| Elements | // Collection of system elements |
| ElementIDs | // Collection of all Element IDs in the system |
| ***NodesData*** | ***// Collection of raw Node Data*** |
| ***NodeName*** | ***// The string name of the node. This is captured from the parser.*** |
| ***ID*** | ***// Node ID is built later by topology analyzer*** |
| Full | // This is unique node identifier |
| ***Parts*** | |
| NodeType | // Node type can be 0 to 255 |
| | ***// Event Index can be 0 to 255. This is the*** |
| ***EventIndex***EventIndex ***index inthe Events vector*** | |
| ***NodeIndex*** | ***// Node index can be 0 to 65,535. This indicates theindex in Node's vector*** |
| ***EventName*** | ***// The string name of the event. This is captured from the parser.*** |
| ***EventID*** | ***// Event ID is built later by topology analyzer*** |
| Full | // This is unique node identifier |
| ***Parts*** | |
| ***NodeType*** | ***// Node type can be 0 to 255*** |
| EventIndex | // Event Index can be 0 to 255. This is the index in the Events vector |
| NodeIndex | // Node index can be 0 to 65,535. This indicates the index in Node's vector |

-continued

| | |
|---|---|
| EventOffset | // The offset of the event counter (+1,+2 . . . ) |
| SectionName | // The name of the section where the node is found. |
| NodeIDs | // Collection of all Node Ids in the system |
| Nodes | // Collection of all NodeValues and all other node data |
| StrNodes | |
| DecNodes | |
| IntNodes | |
| BoolNodes | |
| EventNodes | |
| Name | // Full node name (Section.Node) |
| ID | // The unique NodeID |
| NodeRole | // Input, State Var, Intermediate ... |
| Value | // This holds the value of the node of all types. |
| DateNodes | |

Sub stage 2 (2.2) Populates Nodes and NodeIDs and remaining NodesData for all other types of nodes, except Event. The NodesData collection is scanned for nodes other than Event type. The unique identifier key of a regular node consists in 4 fields: Section Name; Node Name; Event Name; and Event Offset. For each regular node of NodesData collection the previous regular node items of the collection are scanned for a match of the key. If a match is found, a "Duplicate Node Declaration" error is produced. Otherwise:

Add a new node of the specified NodeType in the Node collection and generate the NodeIndex;

Retrieve the EventIndex of Node from NodeData and complete the NodeID; The NodeID is now completed with all 3 parts that are needed for regular Nodes: Node Type, NodeIndex and EventIndex;

Complete the ID and EventID fields of the NodesData collection item; and

Add the NodeID in the NodeIDs collection.

The completed data for this sub stage is shown in the table below:

| | |
|---|---|
| System | |
| SystemID | |
| SystemName | |
| Sections | // Collection of sections |
| Elements | // Collection of section elements |
| Interfaces | // Collection of section interfaces |
| LocalNode | |
| NodeName | // The string name of the node. |
| ID | // Node ID is built later by topology analyzer |
| EventName | // The string name of the event. |
| EventID | // Event ID is built later by topology analyzer |
| EventOffset | // The offset of the event counter (+1,+2 . . . ) |
| SectionName | // The name of the section where the node is found. |
| RemoteNode | |
| NodeName | // The string name of the node. |
| ID | // Node ID is built later by topology analyzer |
| EventName | // The string name of the event. |
| EventID | // Event ID is built later by topology analyzer |
| EventOffset | // The offset of the event counter (+1,+2 . . . ) |
| SectionName | // The name of the section where the node is found. |
| InterfaceType | // output,input,inout |
| Elements | // Collection of system elements |
| ElementIDs | // Collection of all Element IDs in the system |
| NodesData | // Collection of raw Node Data |
| NodeName | // The string name of the node. This is captured from the parser. |
| ID | // Node ID is built later by topology analyzer |
| Full | // This unique node identifier |
| Parts | |
| NodeType | // Node type can be 0 to 255 |
| EventIndex | // Event Index can be 0 to 255. This is the index inthe Events vector |
| NodeIndex | // Node index can be 0 to 65,535. This indicates theindex in Node's vector |
| EventName | // The string name of the event. This is captured from the parser. |
| EventID | // Event ID is built later by topology analyzer |
| Full | // This is unique node identifier |
| Parts | |
| NodeType | // Node type can be 0 to 255 |
| EventIndex | // Event Index can be 0 to 255. This is the index inthe Events vector |
| NodeIndex | // Node index can be 0 to 65,535. This indicates theindex in Node's vector |
| EventOffset | // The offset of the event counter (+1,+2 . . . ) |
| SectionName | // The name of the section where the node is found. |
| NodeIDs | // Collection of all Node Ids in the system |
| Nodes | // Collection of Node Values and all other node data |
| StrNodes | |
| Name | // Full node name (Section.Node) |
| ID | // The unique NodeID |
| NodeRole | // Input, State Var, Intermediate ... |
| Value | // This holds the value of the node of all types. |
| DecNodes | |
| Name | // Full node name (Section.Node) |
| ID | // The unique NodeID |
| NodeRole | //Input, State Var, Intermediate ... |
| Value | // This holds the value of the node of all types. |
| IntNodes | |
| Name | // Full node name (Section.Node) |
| ID | // The unique NodeID |
| NodeRole | //Input, State Var, Intermediate ... |
| Value | // This holds the value of the node of all types. |
| BoolNodes | |
| Name | // Full node name (Section.Node) |
| ID | // The unique NodeID |
| NodeRole | //Input, State Var, Intermediate ... |
| Value | // This holds the value of the node of all types. |
| EventNodes | |
| Name | // Full node name (Section.Node) |
| ID | // The unique NodeID |
| NodeRole | // Input, State Var, Intermediate ... |
| Value | // This holds the value of the node of all types. |
| DateNodes | |
| Name | // Full node name (Section.Node) |
| ID | // The unique NodeID |
| NodeRole | // Input, State Var, Intermediate ... |
| Value | // This holds the value of the node of all types. |

Sub stage 3 (2.3) populates NodeID information in Interfaces collection. Interfaces element consists in a mapping of a local node to a remote node. Both nodes have the same NodeID but different Node Name. The local node is a node that is used in the current section while the remote node is a node that is used in another section or in the system level. The remote node might also be pointing to another interface node in the target section, instead of a real node. For each Interface item, call a function Get_Node_ID using the Remote Node key. If the function returns a NodeID, populate both NodeID properties of Local and Remote Nodes. If no NodeID is found, return "Undeclared Interface Node".

The Get_Node_ID function is a recursive function. It will first try to find a Node match in NodesData collection using the provided key. If a match is found, it returns the NodeID from NodesData collection. If no match is found in NodesData, it scans the Interface collection for a Local node match using the same key. If a match is found, it calls itself using the remote node key of the matched Interface item as parameters. If no match is found in Interfaces, it returns 0.

Below is a tabled representation of the data structure after Sub Stage 3 (2.3):

| | |
|---|---|
| System | |
| SystemID | |
| SystemName | |
| Sections | // Collection of sections |
| Elements | // Collection of section elements |
| Interfaces | // Collection of section interfaces |
| LocalNode | |
| NodeName | // The string name of the node. |
| ID | // Node ID is built later by topology analyzer |
| EventName | // The string name of the event. |
| EventID | // Event ID is built later by topology analyzer |
| EventOffset | // The offset of the event counter (+1,+2 . . . ) |
| SectionName | // The name of the section where the node is found. |
| RemoteNode | |
| NodeName | // The string name of the node. |
| ID | // Node ID is built later by topology analyzer |
| EventName | // The string name of the event. |
| EventID | // Event ID is built later by topology analyzer |
| EventOffset | // The offset of the event counter (+1,+2 . . . ) |
| SectionName | // The name of the section where the node is found. |
| InterfaceType | // output,input,inout |
| Elements | // Collection of system elements |
| ElementIDs | // Collection of all Element IDs in the system |
| NodesData | // Collection of raw Node Data |
| NodeName | // The string name of the node. This is captured from the parser. |
| ID | // Node ID is built later by topology analyzer |
| Full | // This is unique node identifier |
| Parts | |
| NodeType | // Node type can be 0 to 255 |
| EventIndex | // Event Index can be 0 to 255. This is the index in the Events vector |
| NodeIndex | // Node index can be 0 to 65,535. This indicates the index in Node's vector |
| EventName | // The string name of the event. This is captured from the parser. |
| EventID | // Event ID is built later by topology analyzer |
| Full | // This is unique node identifier |
| Parts | |
| NodeType | // Node type can be 0 to 255 |
| EventIndex | // Event Index can be 0 to 255. This is the index in the Events vector |
| NodeIndex | // Node index can be 0 to 65,535. This indicates the index in Node's vector |
| EventOffset | // The offset of the event counter (+1,+2 . . . ) |
| SectionName | // The name of the section where the node is found. |
| NodeIDs | // Collection of all Node IDs in the system |
| Nodes | // Collection of Node Values and all other node data |
| StrNodes | |
| Name | // Full node name (Section.Node) |
| ID | // The unique NodeID |
| NodeRole | // Input, State Var, Intermediate ... |
| Value | // This holds the value of the node of all types |
| DecNodes | |
| Name | // Full node name (Section.Node) |
| ID | // The unique NodeID |
| NodeRole | // Input, State Var, Intermediate ... |
| Value | // This holds the value of the node of all types |
| IntNodes | |
| Name | // Full node name (Section.Node) |
| ID | // The unique NodeID |
| NodeRole | //Input, State Var, Intermediate ... |
| Value | // This holds the value of the node of all types |
| BoolNodes | |
| Name | // Full node name (Section.Node) |
| ID | // The unique NodeID |
| NodeRole | //Input, State Var, Intermediate ... |
| Value | // This holds the value of the node of all types |
| EventNodes | |
| Name | // Full node name (Section.Node) |
| ID | // The unique NodeID |
| NodeRole | // Input, State Var, Intermediate ... |
| Value | // This holds the value of the node of all types |
| DateNodes | |
| Name | // Full node name (Section.Node) |
| ID | // The unique NodeID |
| NodeRole | // Input, State Var, Intermediate ... |
| Value | // This holds the value of the node of all types |

Stage 3

During the third stage, the Elements are now populated. The population of Elements consists in exploding the expressions into pre-defined elementary functions (Elements) and adding these elements in the System's Elements collection. This process may also generate new Internal nodes that are needed to valuate the elementary functions.

The Element population is guided by the recursive routine PopulateElement. The process starts with the detection of Op_Assign token in PopulateNormalStm routine. This token indicates the left side of an assignment operation which will expanded to a tree diagram of elements with the output node of the base element assigned to the variable on the left side of the expression. The PopulateNormalStm routine creates a blank Element of class Unknown (without any nodes) and calls PopulateElement routine with the newly created element as argument for each of the Op_Assign child tokens.

Each expression specification in grammar has indeed only three Op_Assign child tokens. The first is the token belonging to left side variable. The second is Assign operator (=) and the third is the token belonging to the beginning of the right side expression. This means that the PopulateElement will be called three times by PopulateNormalStm, with each of these tokens as argument.

The PopulateElement is a recursive routine and it will call itself with the current element and current token until all tokens of the Op_Assign parse tree tokens are scanned in sequence. PopulateElement is responsible for expanding the expression and populating respective elements of all types.

For each call the PopulateElement routine has a CurrentElement object and the Current Token as arguments. In the first call the CurrentElement is the blank element that was created by PopulateNormalStm and the Current Token belonging to left side variable. The PopulateElement will perform the following processing.

Step 1

Determine the Class of the Current Element by calling the GetElementClass function of ElementDefs object with the name of Current Token as argument. In the case of the example below, in the first call, the Current Token is LocalVar.

Then, based on the Element's Class, one of the three following processes is performed:

Step 1A—for a Variable Class (LocalVar or Var), Populate a Variable Node

The process calls the PopulateVariableNode routine to scan the variable parse tree and populate a NodesData structure, then tries to obtain the NodeID of the variable from Nodes collection using Section Name, Node Name, Event Name and Event Offset as arguments. If a node is not found, it means the variable is not declared. In this case, an error is recorded in the compile log.

Add a new Node in the Current Element and assign the NodeID of the variable to it.

Check if the newly added node is an Input or Output node. The output node is the first Node in Elements Nodes collection with an index of 1.

If the Node is an Output Node, check the Event offset value. If it is 0, it means that a state variable has appeared in the left side of the expression. In this case record an error in the compile log.

Figure 74:
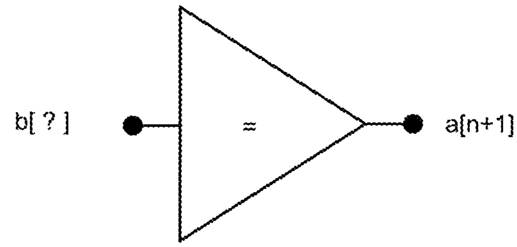
FIG. 74 is a schematic diagram illustrating an exemplary case of the PopulateVariableNode routine in the case where the class of the current element is unknown, in accordance with one embodiment.

If the Node is an Input Node perform the following:

Check the Class of the Current Element. If the Class is Unknown, it means that the right side expression is a single variable. In this case we have identified an Identity operation (a[n+1]=b[?]), so assign the Element's class to Identity (this is illustrated in FIG. 74). b[?]=a[n+l]

Figure 75:
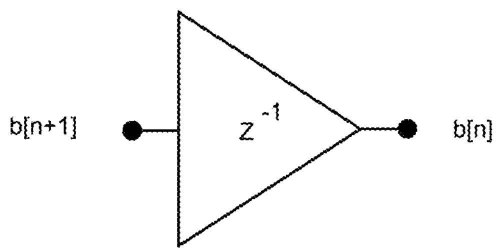
FIG. 75 is a schematic diagram illustrating an exemplary case of the PopulateVariableNode routine where the current node is expanded, in accordance with one embodiment.

Next, check the Event Offset of the Node. If the event offset is 0, we have detected a state variable node. In this case the current node will be expanded as following: b[n]→$Z^{-1}$*b[n+1] and the new Delay element will be introduced (this is illustrated in FIG. 75).

This element will be implemented and populated by the following steps:

- Create the new Delay element;
- Add the Output Node of the Delay Element;
- Set the output node ID of the Delay element the same as the detected node;
- Add the Input Node of the Delay Element; Obtain the NewNodeID of the Node with event offset 1 greater than the detected node;
- Check if this NewNodeID is a declared node;
- Set the Input node ID of the Delay element the same as NewNodeID; and
- Call PopulateElement routine with the CurentElement as argument for all child tokens of the current token.

Step 1B—for an Event Class (EC), Populate an Event Node:

The process calls the PopulateVariableNode routine to scan the variable parse tree and populate a NodesData structure. It then tries to obtain the NodeID of the variable from Nodes collection using Section Name, Node Name, Event Name and Event Offset as arguments. If a node is not found, it means the variable is not declared. In this case an error is recorded in the compile log.

Figure 76:
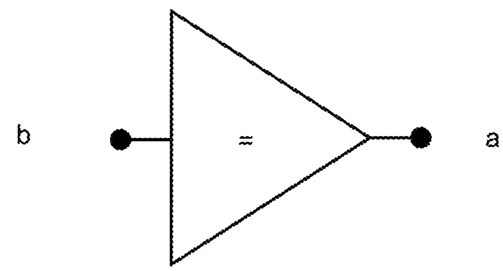
FIG. 76 is a schematic diagram illustrating an exemplary case of the PopulateVariableNode routine where the process assigns the Element's class to Identity, in accordance with one embodiment.

Add a new Node in the Current Element and assign the NodeID of the variable to it. If the node is an input node and the element is Undefined, then the process has detected an Identity element (a=b), so the process assigns the Element's class to Identity (this is illustrated in FIG. 76).

Step 1C—for Every Other Element Class, Create a New Element of the Given Class

The process calls CreateElement routine with the new Class and Current Element as arguments. The creation of the new Element will be described below in the next paragraph. If the new element of the required class cannot be created, an error is recorded in the compile log.

If the newly created Element is a Literal then the process calls the routine PopulateLiteral for each of the children tokens of the current token. The PopulateLiteral routine will be described further below.

If the newly created Element is any other Element, the process again calls the recursive routine PopulateElement for each of the child tokens of the current token.

Every time a "regular" element is found in the parse tree, the PopulateElement routine is called with the current token and Current Element. The recursive calls to this routine terminate only when a Literal or Variable/Event node is encountered.

CreateElement Routine:

The CreateElement routine takes the Class of the new element and the CurrentElement as arguments and returns a New Element.

If the class of the new Element is Unknown, this means that the CurrentElement is the initial element created by the PopulateNormalStm routine. This is a blank element whose output node is assigned to the variable of the left side of the assign operation. In this case, we don't need to create a new element. Instead, we just assign the Class parameter to the CurrentElement and return it as a New Element.

If the Class of the new element if known, then we have to do with an element in the right side of the assign operator in which case we do the following:

Obtain the type of the Output Node of the current element by calling GetOutputNodeType of ElementDefs class with New Element's Class as argument. If the Output Node Type can't be determined add an error message to the Compiler Log. This is not a coding error, but rather a compiler error or Elements definition table problem.

Figure 77:
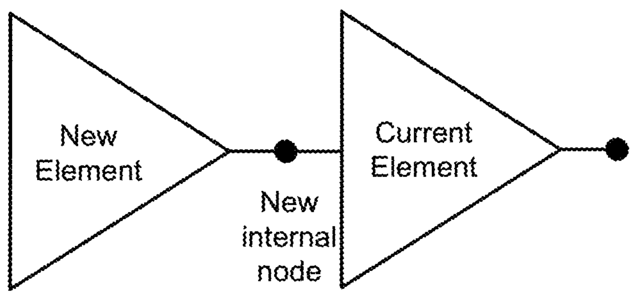
FIG. 77 is a schematic diagram illustrating the AddInternalNode routine with New Element Output Node Type and CurrentElement as arguments, in accordance with one embodiment.

Add a new internal node in the Current Element by calling AddInternalNode routine with New Element Output Node Type and CurrentElement as arguments. The AddInternalNode will be explained later. The newly created node will be used to connect the output node of the New Element, as illustrated in FIG. 77.

If a new internal node can't be added, exit from CreateElement routine by returning NULL. A common reason for failing to add a new internal node might be the fact that the type of the output node of the new element is not one of the accepted types for the specific input node of the current element. In other words, one of the arguments of a function is of a type that is not accepted by the respective argument, e.g. a string function parameter is expected but an integer argument is assigned. This is a coding error and an error is recorded in the compiling log already by the AddInternalNode routine.

Add a new Element; Add the Output Node of the new Element; Assign the NodeID of the created input node of the current element to the Output Node of the New Element, so these nodes are "linked" together; and Set the value of Class parameter to the Class property of the newly created Element.

PopulateLiteral Routine:

The Populate Literal routine takes the CurrentElement and the Literal and sets the value of the current node of the Element to the Literal's value. This routine obtains the Element's Output node type and address from the Nodes vector of the respective type; converts the value of Literal to the appropriate type and store it the Node's address in the Nodes vector of the respective type; and assigns the Class of the Literal Element.

AddInternalNode routine:

The AddInternalNode routine takes the Type of the new Element's Output Node and the CurrentElement and creates a New internal node to the CurrentElement. If the new node is created successfully, its pointer is returned by the function. If not, the function returns NULL.

The new node is not only added to the element but also to the System's Node collection. A new Node ID is generated which is treated as an internal intermitted variable created in the process of expression expansion. These variables are stored permanently in the System's Nodes collection. As such those have a penalty in the memory size but a benefit in performance as those do not need to be created dynamically every time an expression is valuated. This approach has a similar effect as inline functions.

First the NodeOverrideExists function of ElementDefs class is called to determine if the target node of the CurrentElement can accept a node of the type specified by NewElementOutType. This function requires the NewElementOutType, CurrentElement and the index of the target node in CurrentElement. If the type of the Output Node of the new Element is not in the list of accepted types of the target node, an error is recorded in the compile log and the function exits with NULL value.

Figure 78:
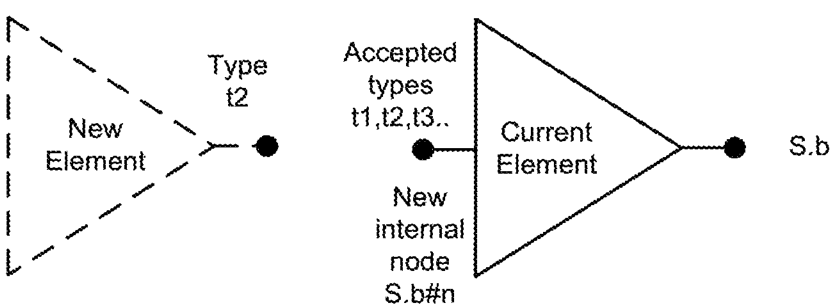
FIG. 78 is a schematic diagram illustrating the AddInternalNode routine, in accordance with one embodiment.

The following procedure is for the specific Output Node type:

Add a new Internal Node in System's Nodes collection of the specified type;

Set properties of the new Node and generate a new NodeID;

Set the EventIndex of the new node the same as the Output Node of the Current Element;

Set the NodeType of the new node to NewElementOutType;

Initialize the value of New Internal Node of the specific type. The values of the nodes are stored in Value property of Nodes collection of the specific type;

Add a new node in the Nodes collection of Element;

Assign to ID of the newly created node to the value to the generated Internal Node ID; and Generate the Name of the New Internal Node as OutputNodeName#InternalNodeIndex where OutputNodeName is the name of the OutputNode and InternalNodeIndex is the index of the New Node in Element's Nodes collection (this is schematically illustrated in FIG. 78).

Population Examples

Literal Element

A Literal Input Element is detected when one of the Literal tokens is detected. A Literal Element is an Input element with only the Output node. If the Literal is the right side of an expression, the Output node of the Literal element is attached to the variable of the left side of the assignment operator. If the Literal is part of an expression, the Output Node of the Literal is attached to a new generated Internal Node, which is an Input Node of another Element.

AAA1[n+1]="hdsgf"

AAA1[n+1]="hdsgf"

Figure 79:
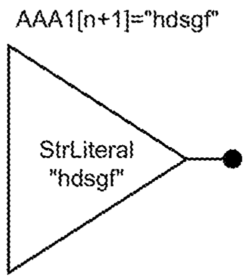
FIG. 79 is a schematic diagram illustrating the Literal Input Element, in accordance with one embodiment.

When the Literal is part of the right side expression, a new Literal element is created with a new Internal node as the Output node, as illustrated in FIG. 79.

Delay Element

Figure 80:
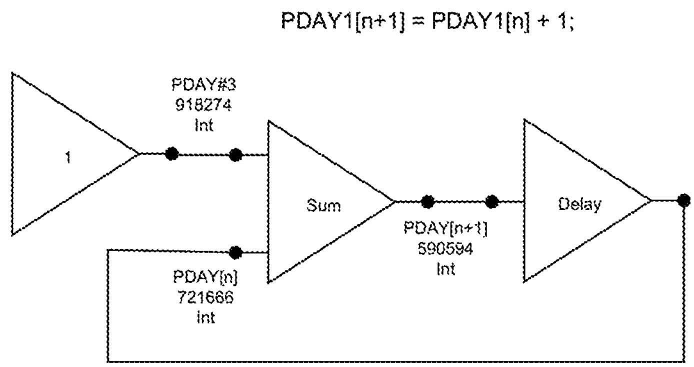
FIG. 80 is a schematic diagram illustrating a Delay Element, in accordance with one embodiment.

A Delay Element is generated when a state variable is encountered. The state variables have an event offset of 0. The Output Node of the Delay element is attached to the Sate Variable Node x[n]. The Input Node of the Delay Element is attached to the Node x[n+1]. This is illustrated in FIG. 80.

$$PDAY1[n+1]=PDAY1[n]+1;$$

Identity Element

Figure 81:
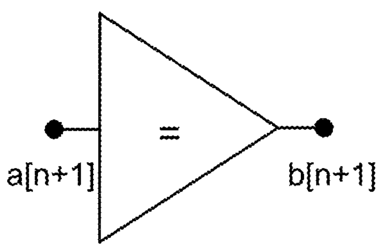
FIG. 81 is a schematic diagram illustrating a Identity Element, in accordance with one embodiment.

An Identity Element is created when the right side of the expression is a single Variable. The Input Node of the Identity Element points to the right side Variable and the Output Node to the left side Variable of the assignment operator. This is illustrated in FIG. 81.

$$b[n+1]=a[n+1]$$

Expression Expansion

When the right side of an assignment operator is a compound expression (i.e. not a single variable or literal), the Expression is exploded into elementary Elements. The end result of the Expression valuation is stored in the output Node of an Element of a certain Class. Let's call the Element the Output Element of the Expression. The Output Node of the Output Element is assigned to the variable of the left side of the assignment operator. Accordingly, in cases when the right side of the assignment operator is a compound expression, no Identity element is generated.

Figure 82:
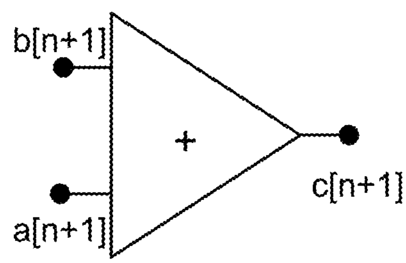
FIG. 82 is a schematic diagram illustrating an example of a simple compound expression, in accordance with one embodiment.

The following provides an example of a simple compound expression, as illustrated in FIG. 82:

$$c[n+1]=a[n+1]+b[n+1]$$

HiLDDE Application Server

Figure 32:
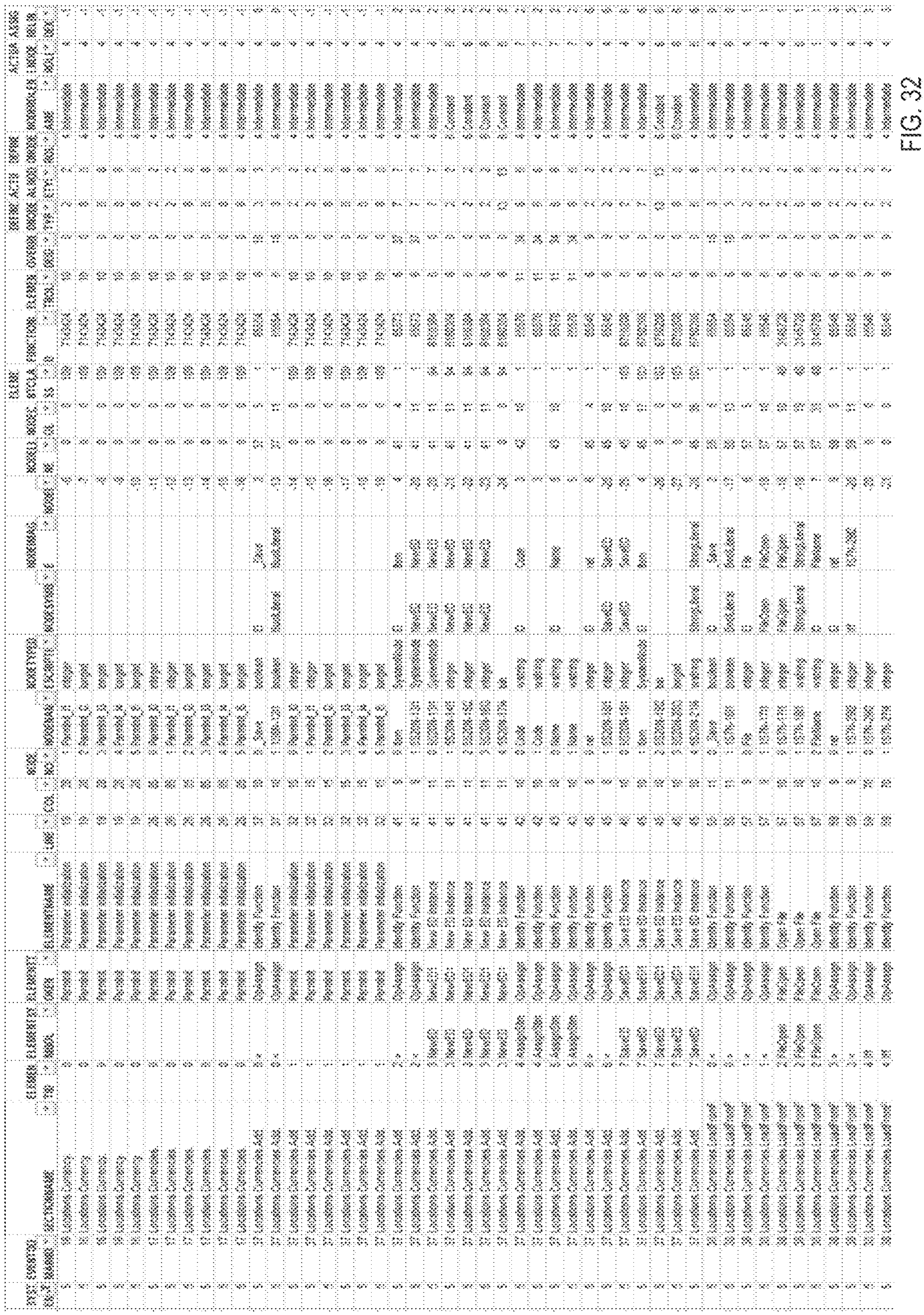

In the core of the HiLDDE Application Server is a function processor that executes the HiLDDE internal functions. The HiLDDE program that is executed by the Application Server is a sequence of such functions provided by the Valuation Sequence that is associated with each ED. A sample of a Valuation Sequence is shown in FIG. 32. The list of internal HiLDDE functions is not the same as HiLDDE language functions. Internal functions are atomic functions that are recognised by the HiLDDE functions processor. The HiLDDE language assignment statements are broken down in internal HiLDDE functions by the HiLDDE Compiler. The compiled code is stored in the HiLDDE database as "Valuation Sequence", which is a sequence of HiLDDE internal functions that should be executed in the provided sequence in order to produce the results intended by the HiLDDE application code.

Figure 37:
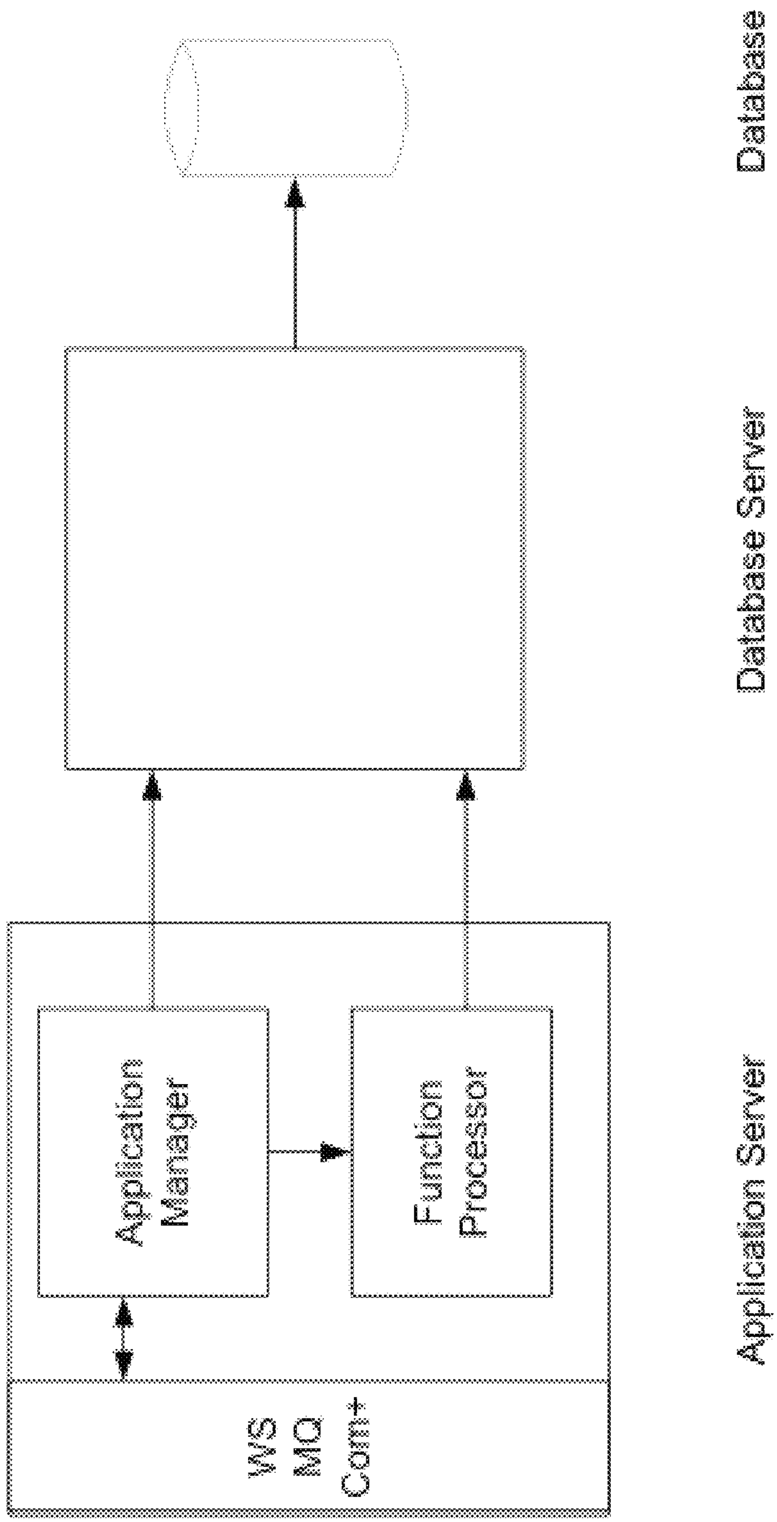
FIG. 37 is a schematic view of an Application Server within the context of the HiLDDE platform of FIG. 4, showing exemplary Application Server interfaces with an associated Database Server and downstream database, in accordance with one embodiment.

FIG. 37 provides a schematic view of the Application Server and how it ultimately interfaces with the Database Server and downstream database, in accordance with an instantly described implementation of the system at hand. The HiLDDE Application Server generally exposes an interface to the HiLDDE presentation server in a form of a list of operations. When a request comes from this interface, the HiLDDE Application Manager processes the request based on the request type. If the request is a Valuation request, the subject ED is loaded first into the memory and then the request is passed to the Function Processor to execute the HiLDDE internal code. Otherwise, it is processed by the Application Manager functions. Both the Application Manager and the Function Processor communicate with the HiLDDE database via the Database Server.

Below is a list of Application Manager interface functions, in accordance with the instantly described implementation.

Open session—OpenConnection

Close session—CloseConnection

Returns the session state—State( )

Load a system in memory—LoadEDSys

Unload a system from memory—UnloadEDSys

Valuate ED—ValuateED

Returns the list of ED input parameters as an XML content—GetInputParms

Returns the list of Subsystems as an XML content from—GetSubsystems

Returns the list and values of Output parameters as an XML content —GetOutput

Loads the ED-Time into Parent EDID if it's not loaded—LoadED

Loads the ED Returns the list and values of Output parameters as an XML content—LoadEDAndGetOutput Returns the list of ED input parameters as an XML content from a Database—InquireInputParms Returns the list of Subsystems as an XML content from a Database—InquireSubsystems Returns the list and values of Output parameters as an XML content from a Database—InquireOutput Returns the list of Subsystems as an XML content from a Database—HiInquireSystems Returns a collection of input & output node values of DED instances under a specified CEDIPath—InquireEDInstances Generates a semicolon separated summary of values of the first MaxNodes output nodes—GetOutputSummary HiLDDE Database Server The HiLDDE database server provides a Functional interface to the HiLDDE database. These interface functions are consumed by the HiLDDE Application Server.

The Database Server is also responsible for managing sessions and connections to the database. When a new session is requested by the Client, the Application Server creates a new session instance and a new database server instance. Then the Open function of the Database Server is called, which creates a new data context and associates it with a database connection from connections pool. The consecutive requests from the same user session (in session-based scenario) are associated with the same data context and dynamically associated with one of the connections in the pool. When the session is closed, the database connection is closed, the associated data context, the database instance and the associated ED systems are discarded.

Figure 38:
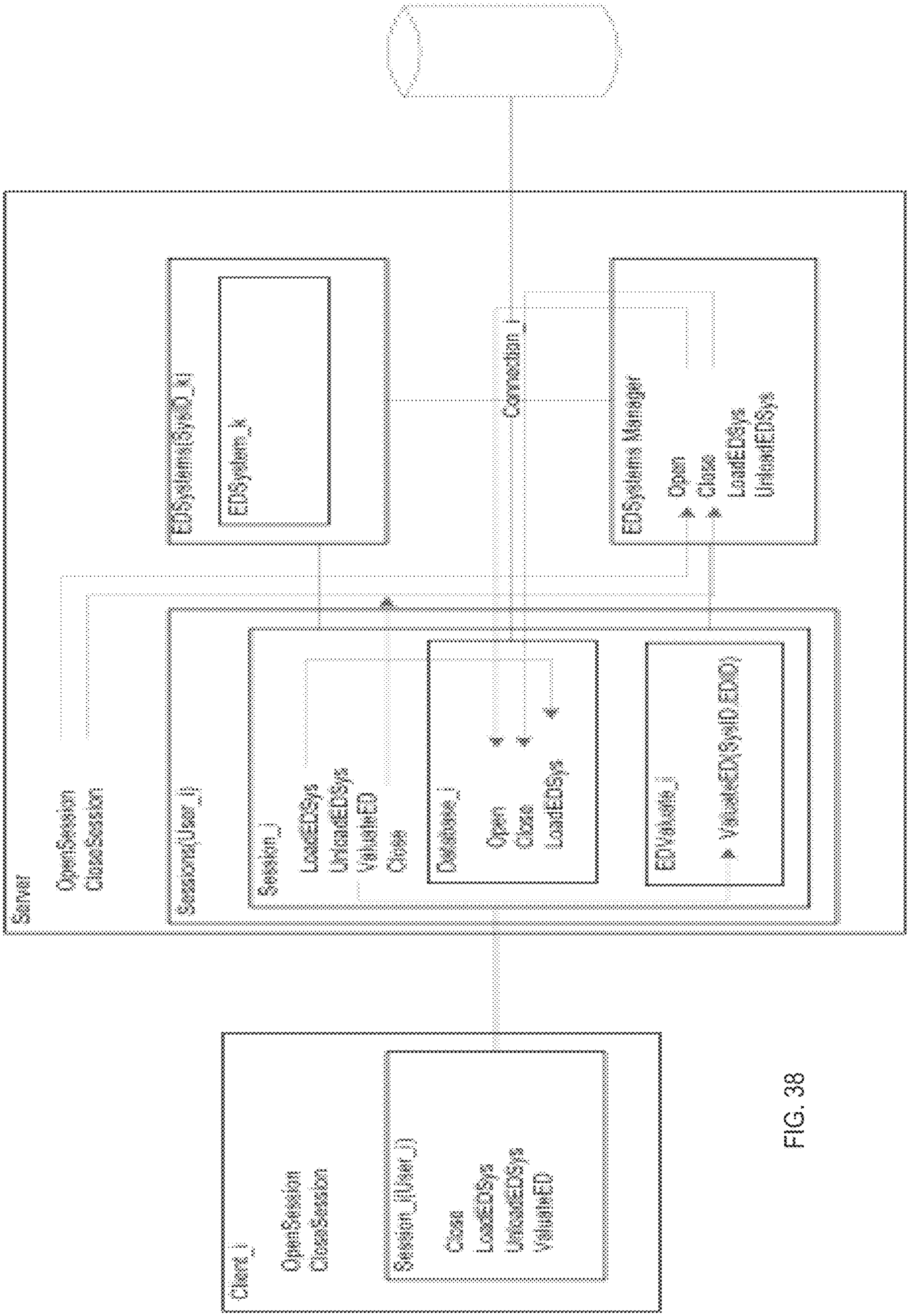
FIG. 38 is a schematic representation of sessions architecture and management, in accordance with one embodiment.

FIG. 38 provides a schematic representation of sessions architecture and management, in accordance with the instantly described implementation.

Database Models

As introduced above, the HiLDDE database data can fall in three categories:

System Definition data, which describes the EDS definition. These data are static and do no change during runtime.

- Systems
- Sections
- Interfaces
- Elements
- Nodes

Application executable code, which is provided in a HiLDDE internal executable language. This consists of a sequence of instructions that can be processed by the HiLDDE application server.

- Valuation Sequence

User Data, which consists of Event Domain instances and States. While the definition of each ED remains static during runtime (stored in the System Definition area of the database) the data members of the new ED instances are stored in the Event Domains area and the States in the Nodes Values area.

- Event Domains Events
- Event Domain States

HiLDDE database can be implemented using several models. The models differ from each other on how they store different data categories:

Relational model: This model uses relational database tables to store all three categories of data. As we have seen the EDS represents structured data, similar to XML, while the implementing data model is a relational table. In this case a significant amount of data shredding and reassembling is required, especially when it comes to user data category. The HiLDDE query language is structured by nature so the HiLDDE queries, which deal with user data, need to be converted to relational queries. As such the relational model has a performance penalty especially when it comes to processing user data, which is reflected to the performance of HiLDDE queries.

Hybrid model (Relational—XML): In this model the Categories 1 and 2 of data are stored in relational tables while the category 3 data as XML data. This requires the implementing database to have solid support for XML and relational data. In this case the HiLDDE queries are easily translated to XQuery due to their structured nature. The queries used by the database server are both relational and XQuery and the database systems that support hybrid queries (relational+XQuery) work best for this model.

Pure XVML: In this case all three data categories are represented as XML data on the implementing database and all types of queries used by the database server are XQuery.

Figure 39:
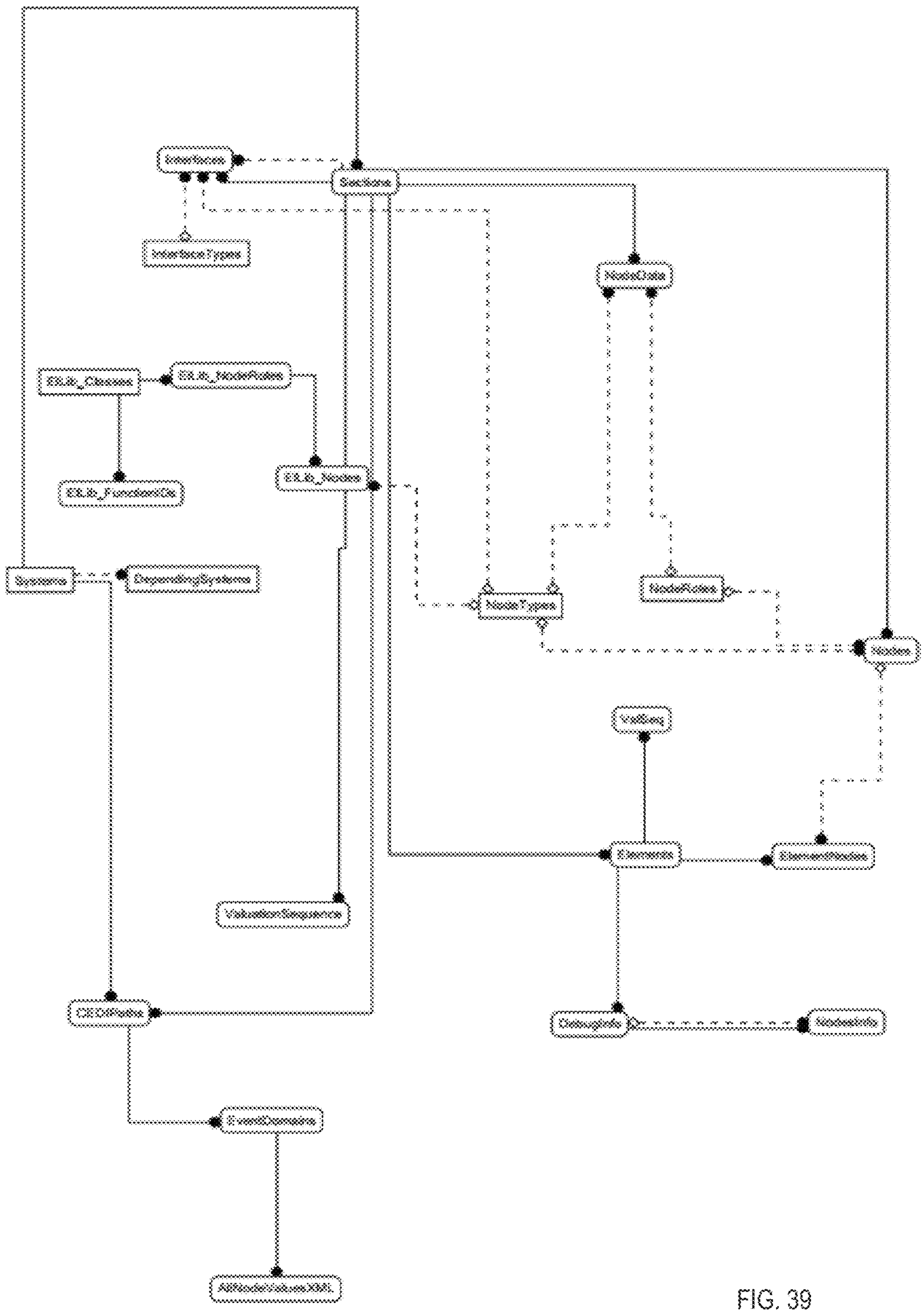
FIG. 39 is a schematic diagram of a hybrid relational-XML data model, as contemplated herein in accordance with one embodiment.

FIG. 39 provides a schematic diagram of a hybrid relational-XML data model, as contemplated herein in accordance with one embodiment.

HiLDDE Presentation Server

As introduced above, the HiLDDE Platform includes a runtime presentation server to accommodate presentation layer components of tierless HiLDDE application code in rendering the user interface (UI). In one embodiment, the presentation server uses two methodologies for rendering user interface screens: Primitive Mappings, in which EDS Input/Output definitions are mapped to specific user controls in the screen, as detailed below; and Forms, in which specialized systems are used to define the UI screens as forms using a variety of controls, attributes and events.

In the context of Primitive Mappings, the HiLDDE Client uses a number of visual controls to render the Input Interface screen, which is used to collect the values of the input parameters of the ED, which can be used when the Valuate method of the ED is called. The types of the controls are determined based on the type of declaration of the Input Interface items. For each of the Input Interface items, the HiLDDE Runtime generates a node in the XML response file that contains the following values and attributes: a Node Name which is the Input Variable Name; an ID attribute which is the Node ID in the ED; a T attribute which is the Node Type; a CT attribute which is the Control Type whose value is a number as indicated in the list of valid controls below. The Node value will depend on the type of the control

```
<?xml version="1.0"?>
<!--InParams for SystemID='20'→
<ED ID="20">
  <GSI ID="1" T="1" CT="1"></GSI>
  <coi ID="3" T="1" CT="1"></coi>
  <Age ID="5" T="2" CT="1"></Age>
</ED>
```

Read Only Text Box

Input Node Declaration Syntax:

Section <Section Path>
  input
    <Section Path><Node Name>["filter"]<Node Name> where <Node Name> specifies a scalar node.

Figure 83:
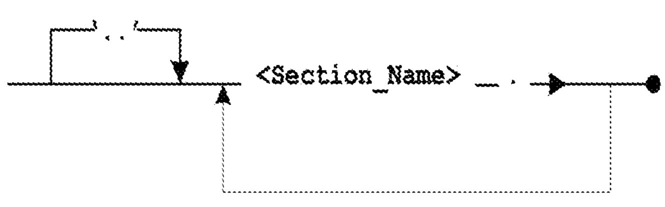
FIG. 83 is a flow diagram of a <Section Path>, dot-separated name of the Section path, in accordance with one embodiment.

The <Section Path> is a dot-separated name of the Section path from where the input variable is taking the value, as schematically illustrated in FIG. 83.

Example

```
Section ULPolicy.Policy.RPCov.CASHVAL.
  input
    ULPolicy.Policy.RPCov.Withdrawal.CRPWA
      CRPWA
  Section ULPolicy.Policy.RPCov.CASHVAL.
  input
    ULPolicy.Policy.RPCov.Withdrawal→CRPWA
      CRPWA
```

Figure 40:
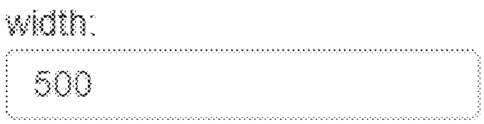
FIGS. 40 to 46 are snapshots of exemplary screen segments.

In this case the value of the input node is determined by the value of the pointed node in the source Section. The value of that node will be passed as in the Value node of the XML element for this input node. The HiLDDE Client will display this value in a read only text box (e.g. exemplary screen segment of FIG. 40).

XML Element Parameters:

CT=1

Value is the value of the source node

Optional Text Box

Input Node Declaration Syntax:

Section <Section Path> input

<Scalar Type><Node Name>=<Value>

Example

Section ULPolicy.Policy.RPCov.CASHVAL.

input integer Age=25

Figure 41:
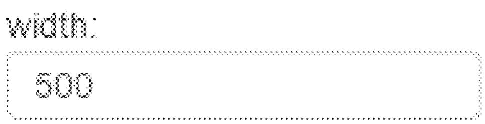

In this case the input node has a default value so the text box will be treated as an optional parameter. The value of the default value should be displayed in the Text Box (e.g. see exemplary screen segment of FIG. 41). The user may change the default value.

XML Element Parameters:

CT=2

Value is the default value of the input node

Mandatory Text Box

Input Node Declaration Syntax:

Section <Section Path> input

<Scalar Type><Node Name>

Example

Section ULPolicy.Policy.RPCov.CASHVAL.

input integer Age

Figure 42:
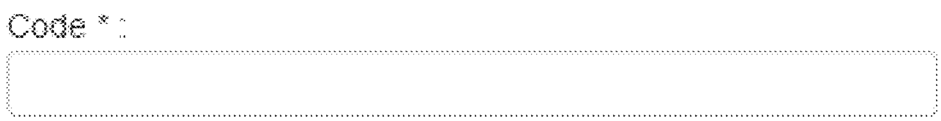

In this case the input node doesn't have a default value so the text box will be treated as a mandatory field. An asterisk should be displayed in the Text Box (e.g. see exemplary screen segment of FIG. 42) and the client should ensure a value is set for this variable before the Valuate method is called.

XML Element Parameters:

CT=3

Value is blank

Radio Button

Input Node Declaration Syntax:

Section <Section Path> input

<Node Path><Node Name> where <Node Path> is a path to an ED node that is not a system type.

Example

Section ULPolicy.Policy.RPCov.CASHVAL.

input

ULPolicy.Policy.RPCov.Withdrawal→["filter" ] CRPWA CRPWA assuming the CRPWA is not a system type node.

In this case the input variable points a node inside an ED. This is reflected by the existence of the → separator, which indicates that the subsystem followed by the → separator is an ED rather than a Section. The input variable has the same type as the pointed ED node but the its value is not determined as there might be more than one ED instances in the pointed location and more than one state for each ED instance. The specific ED has to be selected by the user via HiLDDE Client and its value will be returned back in the input parametersXML of the Valuate method.

Figure 43:
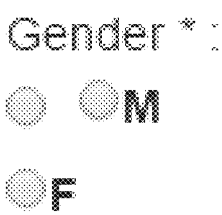

The HiLDDE Client should display a single selection control to select the value of the ED instance variable or the ED instance itself. If the total number of states of all pointed ED instances is less then or equal to Hi_ilRadioButton then the Radio Button control will be used to select the desired ED node value or ED instance (e.g. see exemplary screen segment of FIG. 43).

XML Element Parameters:

CT=4

Value is the value of the selected ED node.

Combo Box

Figure 44:
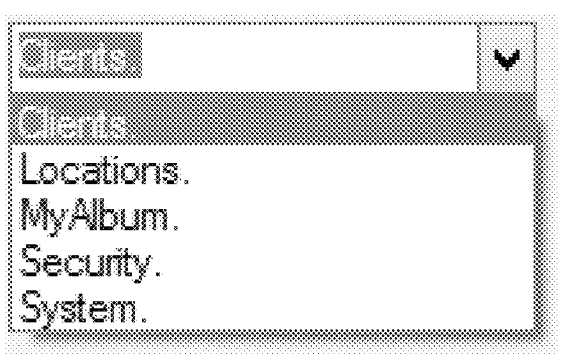

The option follows the same as above with the following difference; if the total number of states of all pointed ED instances is greater then Hi_ilRadioButton and less then or equal to Hi_ilComboBox then the Combo Box control will be used to select the desired ED node value or ED instance (e.g. see exemplary screen segment of FIG. 44).

XML Element Parameters:

CT=5

Value is the value of the selected ED node.

Node Selection Window

Figure 45:
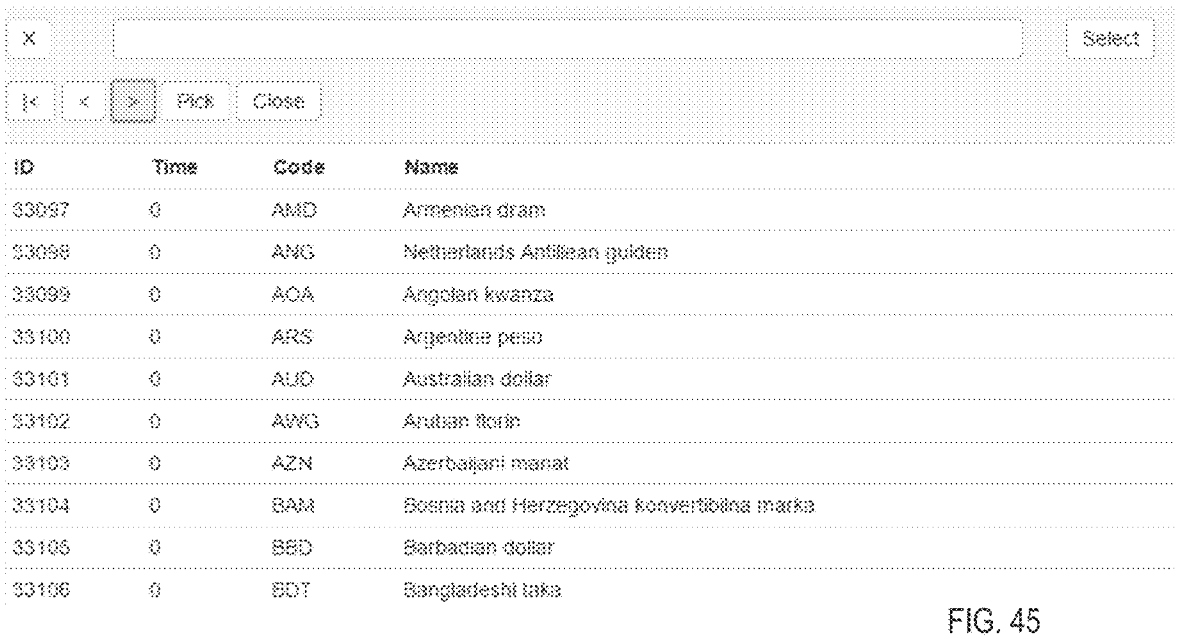

Again, this will follow the same as above with the following difference; if the total number of states of all pointed ED instances is greater then Hi_ilComboBox then the ED Selection control will be used to select the desired ED node instance. The HiLDDE Client should display the ED Selection window (e.g. see exemplary screen segment of FIG. 45). The user can use View button to see all the details of a selected ED, navigate forward or backwards with pages, run queries and use the Pick button to select the desired ED. The ED Selection Window will return the value of the specified node in the picked ED.

XML Element Parameters:

CT=6

Value is an XML Element that contains the CEDIPath and NodeID of the specified node selected ED location.

```
<CP >CEDIPath</CP>
<NI >NodeID</NI>
<NN >NodeName</NN>
<BP >BEDPath</BP>
<SI >SystemID</SI>
<?xml version="1.0" ?>
<!--InParams for SystemID='13'-->
  <ED ID="13">
    <CountryCode ID="4" T="6" CT="3" />
    <CountryName ID="5" T="6" CT="3" />
    <Continent ID="10" T="6" CT="6">
      <CP>x'010006000300'</CP>
      <NI>3</NI>
      <NN>Name</NN>
      <BP>Locations.Continent.</BP>
      <SI>1</SI>
    </Continent>
    <Currencies ID="16" T="7" />
    <Languages ID="22" T="7" />
  </ED>
```

ED Selection Window

Input Node Declaration Syntax:

```
Section <Section Path>
  input
    <Node Path>["filter" ]<Node Name>
```

where <Node Path> is a path to an ED node of system type.

Example

```
Section ULPolicy.Policy.RPCov.CASHVAL.
  input
    ULPolicy.Policy.RPCov.Withdrawal→["*" ] With-
      drawal
```

assuming the WITHDRAWAL is a system type node.

In this case the input variable points to a system variable which is a location where a number of instances of the ED of the same Section are located. The specific instance and state of the ED is unknown. The specific ED has to be selected by the user via HiLDDE Client and its EDID and time will be returned be returned back in the input parameters XML of the Valuate method.

Figure 46:
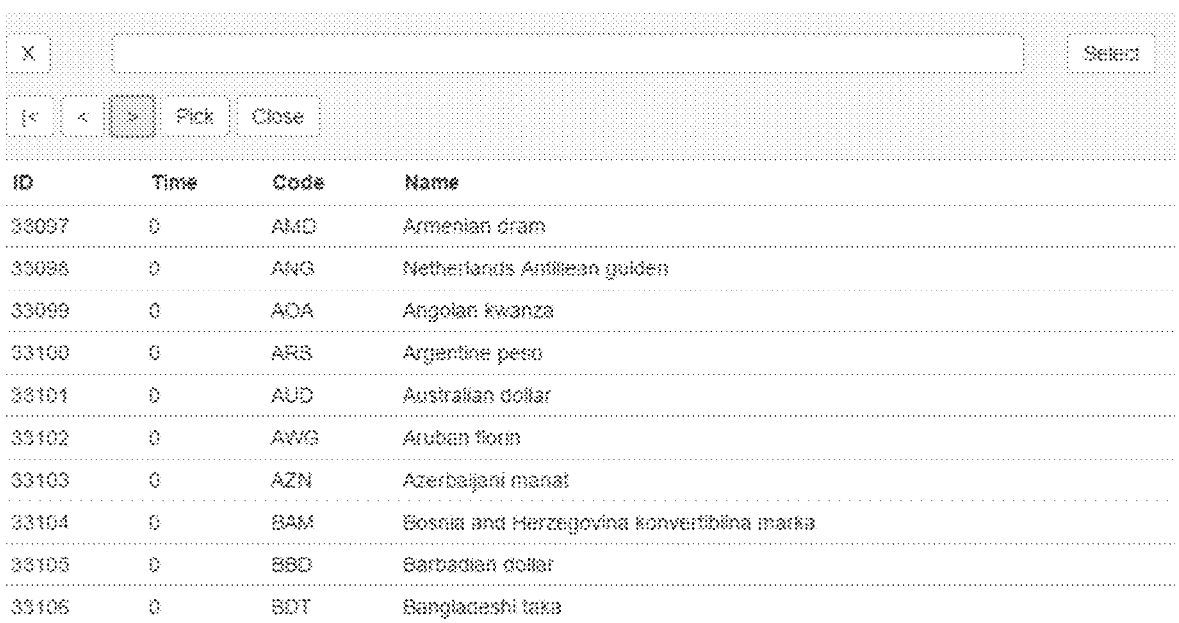

The HiLDDE Client should display the ED Selection window (e.g. see exemplary screen segment of FIG. 46). The user can use View button to see all the details of a selected ED, navigate forward or backwards with pages, run queries and use the Pick button to select the desired ED.

XML Element Parameters:

Scalar Case:

CT=7

Value is an XML Element that contains the CEDIPath of the selected ED location and the SystemID.

```
<?xml version="1.0" ?>
<!-- InParams for SystemID='13'-->
  <ED ID="13">
    <CountryCode ID="4" T="6" CT="3" />
    <CountryName ID="5" T="6" CT="3" />
    <Continent ID="10" T="7" CT="7">
  <CP>x'010006000300'</CP>
  <SI>2</SI>
    </Continent>
    <Currencies ID="16" T="7" />
    <Languages ID="22" T="7" />
  </ED>
```

The Valuate method for this type of control should provide the SystemID, EventDomainID and Time of the selected ED for the specified parameter:

```
<?xml version="1.0" ?>
<!-- InParams for SystemID='13'-->
  <ED ID="13">
    <CountryCode ID="4" T="6" CT="3" />
    <CountryName ID="5" T="6" CT="3" />
    <Continent ID="10" T="7" CT="7">
      <SI>2</SI>
      <EI>33045</EI>
      <Ti>0</Ti>
    </Continent>
    <Currencies ID="16" T="7" CT="11" />
    <Languages ID="22" T="7" CT="11" />
  </ED>
```

EXAMPLES

Example 1

Below is an exemplary application code developed using the HiLDDE language and hosted in the HiLDDE platform, as described herein, in this example implementing a personal music collection management application called MyAlbum. As described above, the language proposed herein and exemplified below provides for relatively pure business logic coding that effectively describes the business process and data invoke by the code without references to any specific implementation technologies, thus rendering the more far more accessible to a wide audience not limited to coding specialists in select technologies. The exemplified programming code is also effectively tierless in that no specific coding is required for any of the traditional implementation tiers such as database, presentation and user Interface. As a result, the code generally readable and easy to understand by a vast audience, and remains relatively short.

Furthermore, the same HiLDDE application that runs on a given server can be consumed at the same time by human interfaces based on fixed Desktop, Web, and Mobile HiLDDE Clients as well as application interfaces based on SOAP and REST web services, MQ and COM+, for example; no additional code is required for the coded application to be run on those interfaces or on the client side.

```
Section MyAlbum.
access public;
{
  // Generates incremental Album IDs
  Section .AlbumID.
  output
    ID;
  {
    integer ID previous ID_p init 0; // ID is declared as state
      variable with initial value 0
    _Save=true;
    ID=ID_p+1;
  }
  // Album data structure (pure data)
  Section .Album.
  input
    integer ID;
  inout
    string title,
    string artist;
  {
  }
  // Albums collection system
  Section .Albums.
  access public;
  output Album;
  {
    // This is the node where Album instances are stored
    public system Album(MyAlbum.Album.);
    // System for adding new Album instances
    Section .Add.
    access public;
    inout
      string title,
      string artist;
    {
      integer ret,ret1,ID;
      system Item(MyAlbum.Album.); // Album instance
      // Generate a new Album ID
      ret1=Valuate(MyAlbum.AlbumID.);
      // Create a new Album instance
      Item=NewED(MyAlbum.Album.,
        ID=MyAlbum.AlbumID.ID,
        artist=artist,
        title=title)|ret1;
```

```
   // Store the new Album instance in the specified node
      path
   ret=SaveED(Item,..Album→,"val");
}
// System for editing existing instances
Section ._Edit.
access public;
inout
   ..Album Item;
{
   integer ret;
   ret=Valuate(..Album→,
      _Save=true,
      _Mode=1,
      ID=.Item→ID,
      artist=.Item→artist,
      title=.Item→title);
}
// System for deleting instances
Section ._Delete.
access public;
input ..Album→Item;
output
      RetMessage;
   {
      integer ret;
      string RetMessage;
      ret=DeleteED(Item);
      RetMessage=Iff(ret==0,"Deleted successfully",
         "Failed to delete");
   }
  }
}
```

As a comparison, below is an example of the MyAlbum application coded using the known Zend framework. As can be clearly observed below, coding for technology dominates coding for business rendering the code difficult for most audiences other than those specifically versed in this technology. For example, specific references are made to specific technologies such as file systems, PHP, HTML, SQL, RDBMS, etc. The Zend framework also invokes tierful coding in that specific coding is required for presentation (HTML,PHP), database (SQL) and business logic layers. Ultimately, the resulting code is relatively long and not easily readable without having the insights of all the technologies involved.

```
    input ..Album-> Item;
    output
      RetMessage;
    {
      integer ret;
      string RetMessage;

      ret = DeleteED(Item);
      RetMessage = Iff(ret == 0,"Deleted successfully","Failed to delete");
    }
  }
}
```

[00729] As a comparison, below is an example of the MyAlbum application coded using the known Zend framework. As can be clearly observed below, coding for technology dominates coding for business rendering the code difficult for most audiences other than those specifically versed in this technology. For example, specific references are made to specific technologies such as file systems, PHP, HTML, SQL, RDBMS, etc. The Zend framework also invokes tierful coding in that specific coding is required for presentation (HTML,PHP), database (SQL) and business logic layers. Ultimately, the resulting code is relatively long and not easily readable without having the insights of all the technologies involved.

Modules

Start by creating a directory called Album under module with the following subdirectories to hold the module's files:

```
zf2-tutorial/
    /module
        /Album
            /config
            /src
                /Album
                    /Controller
                    /Form
                    /Model
            /view
                /album
                    /album
```

Setting up the Album module¶

Create Module.php in the Album module: Create a file called Module.php under zf2-tutorial/module/Album:

```
namespace Album;

use Zend\ModuleManager\Feature\AutoloaderProviderInterface;
use Zend\ModuleManager\Feature\ConfigProviderInterface;

class Module implements AutoloaderProviderInterface, ConfigProviderInterface
{
    public function getAutoloaderConfig()
    {
        return array(
            'Zend\Loader\ClassMapAutoloader' => array(
                __DIR__ . '/autoload_classmap.php',
            ),
            'Zend\Loader\StandardAutoloader' => array(
                'namespaces' => array(
                    __NAMESPACE__ => __DIR__ . '/src/' . __NAMESPACE__,
                ),
            ),
        );
    }

    public function getConfig()
    {
        return include __DIR__ . '/config/module.config.php';
    }
}
```

Autoloading files

Create a file called autoload_classmap.php under zf2-tutorial/module/Album:

```
return array();
```

Configuration

Create a file called module.config.php under zf2-tutorial/module/Album/config:

```
return array(
    'controllers' => array(
        'invokables' => array(
            'Album\Controller\Album' => 'Album\Controller\AlbumController',
        ),
    ),
    'view_manager' => array(
```

```
        'template_path_stack' => array(
            'album' => __DIR__ . '/../view',
        ),
    ),
);
```

Informing the application about our new module

```
return array(
    'modules' => array(
        'Application',

        'Album',                  // <-- Add this line
    ),
    'module_listener_options' => array(
        'config_glob_paths'    => array(
            'config/autoload/{,*.}{global,local}.php',
        ),
        'module_paths' => array(
            './module',
            './vendor',
        ),
    ),
);
```

Routing and controllers¶

The mapping of a URL to a particular action is done using routes that are defined in the module's module.config.php file. We will add a route for our album actions. This is the updated module config file with the new code highlighted.

```
return array(
    'controllers' => array(
        'invokables' => array(
            'Album\Controller\Album' => 'Album\Controller\AlbumController',
        ),
    ),

    // The following section is new and should be added to your file
    'router' => array(
        'routes' => array(
            'album' => array(
                'type'    => 'segment',
                'options' => array(
                    'route'    => '/album[/][:action][/:id]',
                    'constraints' => array(
                        'action' => '[a-zA-Z][a-zA-Z0-9_-]*',
```

```
                'id'     => '[0-9]+',
            ),
            'defaults' => array(
                'controller' => 'Album\Controller\Album',
                'action'     => 'index',
            ),
        ),
    ),
  ),
),

'view_manager' => array(
    'template_path_stack' => array(
        'album' => __DIR__ . '/../view',
    ),
),
);
```

Create the controller

Create our controller class AlbumController.php at zf2-tutorials/module/Album/src/Album/Controller :

```
namespace Album\Controller;

use Zend\Mvc\Controller\AbstractActionController;
use Zend\View\Model\ViewModel;

class AlbumController extends AbstractActionController
{
    public function indexAction()
    {
    }

    public function addAction()
    {
    }

    public function editAction()
    {
    }

    public function deleteAction()
    {
    }
}
```

Initialise the view scripts module/Album/view/album/album/index.phtml
module/Album/view/album/album/add.phtml
module/Album/view/album/album/edit.phtml
module/Album/view/album/album/delete.phtml Database and models The database We are going to use MySQL, via PHP's PDO driver, so create a database called zf2tutorial, and run these SQL statements to create the album table with some data in it.

```
CREATE TABLE album (
  id int(11) NOT NULL auto_increment,
  artist varchar(100) NOT NULL,
  title varchar(100) NOT NULL,
  PRIMARY KEY (id)
);
INSERT INTO album (artist, title)
    VALUES ('The Military Wives', 'In My Dreams');
INSERT INTO album (artist, title)
    VALUES ('Adele', '21');
INSERT INTO album (artist, title)
    VALUES ('Bruce Springsteen', 'Wrecking Ball (Deluxe)');
INSERT INTO album (artist, title)
    VALUES ('Lana Del Rey', 'Born To Die');
INSERT INTO album (artist, title)
    VALUES ('Gotye', 'Making Mirrors');
```

The model files

Let's start by creating a file called Album.php under module/Album/src/Album/Model:

```
namespace Album\Model;

class Album
{
    public $id;
    public $artist;
    public $title;

    public function exchangeArray($data)
    {
        $this->id     = (!empty($data['id'])) ? $data['id'] : null;
        $this->artist = (!empty($data['artist'])) ? $data['artist'] : null;
        $this->title  = (!empty($data['title'])) ? $data['title'] : null;
    }
}
```

Next, we create our AlbumTable.php file in module/Album/src/Album/Model directory like this:

```
namespace Album\Model;

 use Zend\Db\TableGateway\TableGateway;

 class AlbumTable
 {
    protected $tableGateway;

    public function __construct(TableGateway $tableGateway)
    {
       $this->tableGateway = $tableGateway;
    }

    public function fetchAll()
    {
       $resultSet = $this->tableGateway->select();
       return $resultSet;
    }

    public function getAlbum($id)
    {
       $id  = (int) $id;
       $rowset = $this->tableGateway->select(array('id' => $id));
       $row = $rowset->current();
       if (!$row) {
          throw new \Exception("Could not find row $id");
       }
       return $row;
    }

    public function saveAlbum(Album $album)
    {
       $data = array(
          'artist' => $album->artist,
          'title'  => $album->title,
       );

       $id = (int) $album->id;
       if ($id == 0) {
          $this->tableGateway->insert($data);
       } else {
          if ($this->getAlbum($id)) {
             $this->tableGateway->update($data, array('id' => $id));
          } else {
```

```
            throw new \Exception('Album id does not exist');
        }
    }
}

public function deleteAlbum($id)
{
    $this->tableGateway->delete(array('id' => (int) $id));
}
}
```

Using ServiceManager to configure the table gateway and inject into the AlbumTable
Add this method to the bottom of the Module.php file in module/Album.

```
namespace Album;

// Add these import statements:
use Album\Model\Album;
use Album\Model\AlbumTable;
use Zend\Db\ResultSet\ResultSet;
use Zend\Db\TableGateway\TableGateway;


class Module
{
    // getAutoloaderConfig() and getConfig() methods here

    // Add this method:
    public function getServiceConfig()
    {
        return array(
            'factories' => array(
                'Album\Model\AlbumTable' =>  function($sm) {
                    $tableGateway = $sm->get('AlbumTableGateway');
                    $table = new AlbumTable($tableGateway);
                    return $table;
                },
                'AlbumTableGateway' => function ($sm) {
                    $dbAdapter = $sm->get('Zend\Db\Adapter\Adapter');
                    $resultSetPrototype = new ResultSet();
                    $resultSetPrototype->setArrayObjectPrototype(new Album());
                    return new TableGateway('album', $dbAdapter, null, $resultSetPrototype);
                },
            ),
        );
    }
}
```

Modify config/autoload/global.php (in the Zend Skeleton root, not inside the Album module) with following code:

```
return array(
    'db' => array(
        'driver'         => 'Pdo',
        'dsn'            => 'mysql:dbname=zf2tutorial;host=localhost',
        'driver_options' => array(
            PDO::MYSQL_ATTR_INIT_COMMAND => 'SET NAMES \'UTF8\''
        ),
    ),
    'service_manager' => array(
        'factories' => array(
            'Zend\Db\Adapter\Adapter'
                    => 'Zend\Db\Adapter\AdapterServiceFactory',
        ),
    ),
);
```

You should put your database credentials in config/autoload/local.php so that they are not in the git repository

```
return array(
    'db' => array(
        'username' => 'YOUR USERNAME HERE',
        'password' => 'YOUR PASSWORD HERE',
    ),
);
```

Back to the controller

```
// module/Album/src/Album/Controller/AlbumController.php:
    public function getAlbumTable()
    {
        if (!$this->albumTable) {
            $sm = $this->getServiceLocator();
            $this->albumTable = $sm->get('Album\Model\AlbumTable');
        }
        return $this->albumTable;
    }
```

You should also add:

```
protected $albumTable;
```

Listing albums

Fill in indexAction()within AlbumController. Update the AlbumController's indexAction() like this:

```
// module/Album/src/Album/Controller/AlbumController.php:
```

```
// ...
    public function indexAction()
    {
        return new ViewModel(array(
            'albums' => $this->getAlbumTable()->fetchAll(),
        ));
    }
// ...
```

We can now fill in the index.phtml view script:

```
<?php
// module/Album/view/album/album/index.phtml:

$title = 'My albums';
$this->headTitle($title);
?>
<h1><?php echo $this->escapeHtml($title); ?></h1>
<p>
    <a href="<?php echo $this->url('album', array('action'=>'add'));?>">Add new
album</a>
</p>

<table class="table">
<tr>
    <th>Title</th>
    <th>Artist</th>
    <th> </th>
</tr>
<?php foreach ($albums as $album) : ?>
<tr>
    <td><?php echo $this->escapeHtml($album->title);?></td>
    <td><?php echo $this->escapeHtml($album->artist);?></td>
    <td>
        <a href="<?php echo $this->url('album',
            array('action'=>'edit', 'id' => $album->id));?>">Edit</a>
        <a href="<?php echo $this->url('album',
            array('action'=>'delete', 'id' => $album->id));?>">Delete</a>
    </td>
</tr>
<?php endforeach; ?>
</table>
```

Forms and actions

Adding new albums

Create a file called AlbumForm.php in module/Album/src/Album/Form:

```
namespace Album\Form;

 use Zend\Form\Form;

 class AlbumForm extends Form
 {
    public function __construct($name = null)
    {
       // we want to ignore the name passed
       parent::__construct('album');

       $this->add(array(
          'name' => 'id',
          'type' => 'Hidden',
       ));
       $this->add(array(
          'name' => 'title',
          'type' => 'Text',
          'options' => array(
             'label' => 'Title',
          ),
       ));
       $this->add(array(
          'name' => 'artist',
          'type' => 'Text',
          'options' => array(
             'label' => 'Artist',
          ),
       ));
       $this->add(array(
          'name' => 'submit',
          'type' => 'Submit',
          'attributes' => array(
             'value' => 'Go',
             'id' => 'submitbutton',
          ),
       ));
    }
 }
```

Add the input filter to the Album class

```
namespace Album\Model;

 // Add these import statements
use Zend\InputFilter\InputFilter;
```

```
use Zend\InputFilter\InputFilterAwareInterface;
use Zend\InputFilter\InputFilterInterface;

class Album implements InputFilterAwareInterface
{
    public $id;
    public $artist;
    public $title;
    protected $inputFilter;                     // <-- Add this variable

    public function exchangeArray($data)
    {
        $this->id     = (isset($data['id']))     ? $data['id']     : null;
        $this->artist = (isset($data['artist'])) ? $data['artist'] : null;
        $this->title  = (isset($data['title']))  ? $data['title']  : null;
    }

    // Add content to these methods:
    public function setInputFilter(InputFilterInterface $inputFilter)
    {
        throw new \Exception("Not used");
    }

    public function getInputFilter()
    {
        if (!$this->inputFilter) {
            $inputFilter = new InputFilter();

            $inputFilter->add(array(
                'name'     => 'id',
                'required' => true,
                'filters'  => array(
                    array('name' => 'Int'),
                ),
            ));

            $inputFilter->add(array(
                'name'     => 'artist',
                'required' => true,
                'filters'  => array(
                    array('name' => 'StripTags'),
                    array('name' => 'StringTrim'),
                ),
                'validators' => array(
                    array(
                        'name'    => 'StringLength',
```

```
                'options' => array(
                    'encoding' => 'UTF-8',
                    'min'      => 1,
                    'max'      => 100,
                ),
            ),
        ),
    ));

    $inputFilter->add(array(
        'name'     => 'title',
        'required' => true,
        'filters'  => array(
            array('name' => 'StripTags'),
            array('name' => 'StringTrim'),
        ),
        'validators' => array(
            array(
                'name'    => 'StringLength',
                'options' => array(
                    'encoding' => 'UTF-8',
                    'min'      => 1,
                    'max'      => 100,
                ),
            ),
        ),
    ));

    $this->inputFilter = $inputFilter;
  }

  return $this->inputFilter;
 }
}
```

We now need to get the form to display and then process it on submission. This is done within the AlbumController's addAction():
// module/Album/src/Album/Controller/AlbumController.php:

```
//...
use Zend\Mvc\Controller\AbstractActionController;
use Zend\View\Model\ViewModel;
use Album\Model\Album;          // <-- Add this import
use Album\Form\AlbumForm;       // <-- Add this import
//...
```

```
    // Add content to this method:
    public function addAction()
    {
        $form = new AlbumForm();
        $form->get('submit')->setValue('Add');

        $request = $this->getRequest();
        if ($request->isPost()) {
            $album = new Album();
            $form->setInputFilter($album->getInputFilter());
            $form->setData($request->getPost());

            if ($form->isValid()) {
                $album->exchangeArray($form->getData());
                $this->getAlbumTable()->saveAlbum($album);

                // Redirect to list of albums
                return $this->redirect()->toRoute('album');
            }
        }
        return array('form' => $form);
    }
//...
```

We now need to render the form in the add.phtml view script:

```
<?php
// module/Album/view/album/album/add.phtml:

$title = 'Add new album';
$this->headTitle($title);
?>
<h1><?php echo $this->escapeHtml($title); ?></h1>
<?php
$form->setAttribute('action', $this->url('album', array('action' => 'add')));
$form->prepare();

echo $this->form()->openTag($form);
echo $this->formHidden($form->get('id'));
echo $this->formRow($form->get('title'));
echo $this->formRow($form->get('artist'));
echo $this->formSubmit($form->get('submit'));
echo $this->form()->closeTag();
```

Editing an album

This time we use editAction() in the AlbumController:

```
// module/Album/src/Album/Controller/AlbumController.php:
//...

  // Add content to this method:
  public function editAction()
  {
    $id = (int) $this->params()->fromRoute('id', 0);
    if (!$id) {
      return $this->redirect()->toRoute('album', array(
        'action' => 'add'
      ));
    }

    // Get the Album with the specified id.  An exception is thrown
    // if it cannot be found, in which case go to the index page.
    try {
      $album = $this->getAlbumTable()->getAlbum($id);
    }
    catch (\Exception $ex) {
      return $this->redirect()->toRoute('album', array(
        'action' => 'index'
      ));
    }

    $form  = new AlbumForm();
    $form->bind($album);
    $form->get('submit')->setAttribute('value', 'Edit');

    $request = $this->getRequest();
    if ($request->isPost()) {
      $form->setInputFilter($album->getInputFilter());
      $form->setData($request->getPost());

      if ($form->isValid()) {
        $this->getAlbumTable()->saveAlbum($album);

        // Redirect to list of albums
        return $this->redirect()->toRoute('album');
      }
    }

    return array(
      'id' => $id,
      'form' => $form,
    );
```

```
    }
 //...
```

need to write getArrayCopy():

```
// module/Album/src/Album/Model/Album.php:
 // ...
    public function exchangeArray($data)
    {
       $this->id     = (isset($data['id']))     ? $data['id']     : null;
       $this->artist = (isset($data['artist'])) ? $data['artist'] : null;
       $this->title  = (isset($data['title']))  ? $data['title']  : null;
    }


   // Add the following method:
    public function getArrayCopy()
    {
       return get_object_vars($this);
    }
 // ...
```

The view template, edit.phtml, looks very similar to the one for adding an album:

```
<?php
 // module/Album/view/album/album/edit.phtml:

 $title = 'Edit album';
 $this->headTitle($title);
 ?>
 <h1><?php echo $this->escapeHtml($title); ?></h1>

 <?php
 $form = $this->form;
 $form->setAttribute('action', $this->url(
    'album',
    array(
       'action' => 'edit',
       'id'     => $this->id,
    )
 ));
 $form->prepare();

 echo $this->form()->openTag($form);
 echo $this->formHidden($form->get('id'));
 echo $this->formRow($form->get('title'));
 echo $this->formRow($form->get('artist'));
 echo $this->formSubmit($form->get('submit'));
```

```
echo $this->form()->closeTag();
```

Deleting an album
the action code in AlbumController::deleteAction():

```
// module/Album/src/Album/Controller/AlbumController.php:
//...
   // Add content to the following method:
   public function deleteAction()
   {
      $id = (int) $this->params()->fromRoute('id', 0);
      if (!$id) {
         return $this->redirect()->toRoute('album');
      }

      $request = $this->getRequest();
      if ($request->isPost()) {
         $del = $request->getPost('del', 'No');

         if ($del == 'Yes') {
            $id = (int) $request->getPost('id');
            $this->getAlbumTable()->deleteAlbum($id);
         }

         // Redirect to list of albums
         return $this->redirect()->toRoute('album');
      }

      return array(
         'id'    => $id,
         'album' => $this->getAlbumTable()->getAlbum($id)
      );
   }
//...
```

The view script is a simple form:

```
<?php
// module/Album/view/album/album/delete.phtml:

$title = 'Delete album';
$this->headTitle($title);
?>
<h1><?php echo $this->escapeHtml($title); ?></h1>

<p>Are you sure that you want to delete
   '<?php echo $this->escapeHtml($album->title); ?>' by
   '<?php echo $this->escapeHtml($album->artist); ?>'?
```

```
</p>
<?php
$url = $this->url('album', array(
    'action' => 'delete',
    'id'     => $this->id,
));
?>
<form action="<?php echo $url; ?>" method="post">
<div>
    <input type="hidden" name="id" value="<?php echo (int) $album->id; ?>" />
    <input type="submit" name="del" value="Yes" />
    <input type="submit" name="del" value="No" />
</div>
</form>
```

Ensuring that the home page displays the list of albums
Change the controller from Application\Controller\Index to Album\Controller\Album:

```
'home' => array(
    'type' => 'Zend\Mvc\Router\Http\Literal',
    'options' => array(
        'route'    => '/',
        'defaults' => array(
            'controller' => 'Album\Controller\Album', // <-- change here
            'action'     => 'index',
        ),
    ),
),
```

[00730] While the present disclosure describes various exemplary embodiments, the disclosure is not so limited. To the contrary, the disclosure is intended to cover various modifications and equivalent arrangements included within the general scope of the present disclosure.

While the present disclosure describes various exemplary embodiments, the disclosure is not so limited. To the contrary, the disclosure is intended to cover various modifications and equivalent arrangements included within the general scope of the present disclosure.

What is claimed is:

1. A universally programmable platform for interacting with existing technology-specific execution layers, each of the existing technology-specific execution layers utilizing a respective one or more programmable code interface, the platform comprising:

a compiler accepting event-based instruction sets, each of said event-based instruction sets comprising event-based logic and configured to generate event-based data and technology-agnostic executable code, wherein each of said event-based instruction sets are self-contained in a universal event structure to define any data, presentation and application code required to fully execute a given event;

at least one run-time server operable to provide universal runtime application, database and presentation services for interfacing with corresponding existing technology-specific execution layers, wherein each of said run-time services stores respective sets of interfacing instructions in a corresponding one of the programmable code interfaces utilized by a respective one of the existing technology-specific execution layers and corresponding to event-based data and logic in said event-based instruction sets;

wherein said at least one run-time server is configured to generate and store said interfacing instructions automatically for any of the existing technology-specific layers based on the event-based instruction set, said interfacing instructions being implementable by said run-time server to cause the corresponding existing technology-specific execution layer to interact with said event-based logic and event-based data in accordance with the interfacing instructions, and said interfacing instructions being based on an association between the event-based logic and existing server commands stored on the at least one run-time server.

2. The platform of claim 1, wherein each of said event-based instruction sets is selected from the following group: new event-based instruction sets or inherited event-based instruction sets that may selectively inherit characteristics from one or more existing event-based instruction sets.

3. The platform of claim 1, wherein the at least one run-time server is configured to accept additional existing technology-specific execution layer commands based on one or more of new existing technology-specific execution layers and new programmable code interfaces.

4. A method of compiling event-based instruction sets for a universally programmable platform for interfacing with existing technology-specific execution layers, each of the technology-specific execution layers utilizing one or more corresponding programmable code interface, the method comprising:

accepting event-based instruction sets for at least one run-time server, wherein said at least one run-time server is operable to provide universal runtime application, database and presentation services that operatively communicate with the existing technology-specific execution layers, the event-based instruction sets comprising event-based logic and configured to generate event-based data and technology-agnostic executable code, wherein each of said event-based instruction sets are self-contained in a universal event structure to define any data, presentation and application code required to fully execute said event-based instruction sets;

automatically generating interfacing instructions for the existing technology-specific execution layers in the one or more corresponding programmable code interface, the interfacing instructions for causing the existing technology-specific execution layers to carry out the given event-based instruction sets in accordance with any said data, presentation and application code defined thereby, said interfacing instructions being based on associations between the event-based instruction sets and a set of existing technology-specific execution layer commands stored on the at least one run-time server; and storing the generated interfacing instructions on the at least one run-time server.

5. The method of claim 4, wherein each of said event-based instruction sets is selected from the following group: new event-based instruction sets or inherited event-based instruction sets that may selectively inherit characteristics from one or more existing event-based instruction sets.

6. The method of claim 4, wherein the at least one run-time server is configured to accept additional existing technology-specific execution layer commands based on one or more of new existing technology-specific execution layers and new programmable code interfaces.

* * * * *